(12) United States Patent
Roy

(10) Patent No.: US 12,020,342 B2
(45) Date of Patent: *Jun. 25, 2024

(54) MOBILE PAYMENT SYSTEM FOR TRAFFIC PRIORITIZATION IN SELF-DRIVING VEHICLES

(71) Applicant: Matthew Roy, Montreal (CA)

(72) Inventor: Matthew Roy, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,536

(22) Filed: Sep. 2, 2023

(65) Prior Publication Data

US 2023/0410242 A1 Dec. 21, 2023

Related U.S. Application Data

(63) Continuation of application No. 17/244,044, filed on Apr. 29, 2021, now Pat. No. 11,763,410, which is a
(Continued)

(51) Int. Cl.
*G06Q 50/40* (2024.01)
*B60W 10/04* (2006.01)
(Continued)

(52) U.S. Cl.
CPC .............. *G06Q 50/40* (2024.01); *B60W 10/04* (2013.01); *B60W 10/18* (2013.01); *B60W 10/20* (2013.01); *B60W 40/04* (2013.01); *B60W 60/001* (2020.02); *G01C 21/3453* (2013.01); *G01S 19/42* (2013.01); *G06Q 10/047* (2013.01);
(Continued)

(58) Field of Classification Search
CPC .... G06Q 50/40; G06Q 10/047; G06Q 20/108; G06Q 20/3223; G06Q 20/407; G06Q 30/0284; G06Q 40/02; G06Q 50/26; G06Q 30/0283; G06Q 30/06; B60W 10/04; B60W 10/18; B60W 10/20; B60W 40/04; B60W 60/001; B60W 2520/10; B60W 2556/65; G01C 21/3453; G01S 19/42; H04L 9/3213; H04L 9/40; H04L 2209/56; H04L 2209/84; H04W 12/037
See application file for complete search history.

(56) References Cited

U.S. PATENT DOCUMENTS 6,791,472 B1 * 9/2004 Hoffberg ............ H04B 7/18576
340/995.13
8,108,272 B2 * 1/2012 Sorbe .................... G06Q 20/108
705/16

(Continued)

*Primary Examiner* — Yonel Beaulieu

(57) ABSTRACT

A self-driving or autonomous vehicle transmits a vehicle-to-vehicle offer message from a user of a vehicle-connected mobile communication device riding in the self-driving vehicle to a second user of a second mobile communication device riding in a second vehicle to pay for a traffic prioritization relative to the second vehicle. The first mobile communication device receives a reply message and sends a payment to the second mobile communication device or an account associated with the second mobile communication device to obtain the traffic prioritization relative to the other vehicle. For example, the traffic prioritization may enable one vehicle to pass the other vehicle, to take precedence at an intersection or to be given priority to take a parking place or any other traffic-related advantage.

20 Claims, 40 Drawing Sheets

Related U.S. Application Data continuation-in-part of application No. 16/283,767, filed on Feb. 23, 2019, now Pat. No. 11,017,665.

(60) Provisional application No. 62/634,904, filed on Feb. 25, 2018.

(51) Int. Cl.
| | |
|---|---|
| *B60W 10/18* | (2012.01) |
| *B60W 10/20* | (2006.01) |
| *B60W 40/04* | (2006.01) |
| *B60W 60/00* | (2020.01) |
| *G01C 21/34* | (2006.01) |
| *G01S 19/42* | (2010.01) |
| *G06Q 10/047* | (2023.01) |
| *G06Q 20/10* | (2012.01) |
| *G06Q 20/32* | (2012.01) |
| *G06Q 20/40* | (2012.01) |
| *G06Q 30/0283* | (2023.01) |
| *G06Q 40/02* | (2023.01) |
| *G06Q 50/26* | (2012.01) |
| *H04L 9/32* | (2006.01) |
| *H04W 12/037* | (2021.01) |

(52) U.S. Cl.
CPC ....... *G06Q 20/108* (2013.01); *G06Q 20/3223* (2013.01); *G06Q 20/407* (2013.01); *G06Q 30/0284* (2013.01); *G06Q 40/02* (2013.01); *G06Q 50/26* (2013.01); *H04L 9/3213* (2013.01); *H04W 12/037* (2021.01); *B60W 2520/10* (2013.01); *B60W 2556/65* (2020.02)

(56) References Cited

U.S. PATENT DOCUMENTS

| | | | |
|---|---|---|---|
| 10,185,999 B1* | 1/2019 | Konrardy | G06Q 40/08 |
| 10,384,678 B1* | 8/2019 | Konrardy | G08G 1/148 |
| 10,769,954 B1* | 9/2020 | Fields | H04N 7/188 |
| 11,017,665 B1* | 5/2021 | Roy | G08G 1/16 |
| 11,325,586 B2* | 5/2022 | Nakata | B60W 60/001 |
| 11,600,179 B1* | 3/2023 | Roy | G08G 1/14 |
| 11,763,410 B1* | 9/2023 | Roy | B60W 60/001 |
| | | | 701/117 |
| 2013/0297387 A1* | 11/2013 | Michael | G06Q 30/02 |
| | | | 705/13 |
| 2016/0189146 A1* | 6/2016 | Cattone | G06Q 20/3829 |
| | | | 398/128 |
| 2021/0127292 A1* | 4/2021 | Van Duren | H04W 28/0236 |
| 2021/0192867 A1* | 6/2021 | Fang | G07C 5/0816 |
| 2021/0385865 A1* | 12/2021 | Mueck | H04W 74/0816 |
| 2021/0398402 A1* | 12/2021 | Richards | G08B 6/00 |
| 2022/0300977 A1* | 9/2022 | Dashti | G06F 21/577 |
| 2023/0186766 A1* | 6/2023 | Roy | G06Q 20/12 |
| | | | 701/117 |

* cited by examiner

| Location: Boca Raton, FL Time: Wed, March 12, 5 pm | I-95 N | I-95 S | Glades Road | Palmetto Park Road | Yamato Road |
|---|---|---|---|---|---|
| Highest Priority | -$11.07 | -$15.03 | -$2.95 | -$3.85 | -$5.00 |
| High Priority | -$6.95 | -$8.92 | -$1.75 | -$2.01 | -$3.00 |
| Normal | $0.00 | $0.00 | $0.00 | $0.00 | $0.00 |
| Low Priority | +$6.95 | +$8.92 | +$1.75 | +$2.01 | +3.00 |
| Lowest Priority | +$11.07 | +$15.03 | +$2.95 | +$3.85 | +$5.00 |

*FIG. 10*

| Location: Boca Raton, FL Time: Wed, March 12, 5 pm | I-95 N | I-95 S | Glades Road | Palmetto Park Road | Yamato Road |
|---|---|---|---|---|---|
| Highest Priority | -$11.07 | -$15.03 → | -$2.95 | -$3.85 | -$5.00 |
| High Priority | -$6.95 ← | -$8.92 | -$1.75 → | -$2.01 ← | -$3.00 → |
| Normal | $0.00 | $0.00 | $0.00 | $0.00 | $0.00 |
| Low Priority | +$6.95 → | +$8.92 | +$1.75 ← | +$2.01 | +3.00 ← |
| Lowest Priority | +$11.07 | +$15.03 ← | +$2.95 | +$3.85 → | +$5.00 |

*FIG. 11*

| Location: Boca Raton, FL Time: Wed, March 12, 5 pm | I-95 N | I-95 S | Glades Road | Palmetto Park Road | Yamato Road |
|---|---|---|---|---|---|
| Highest Priority | Bid $10.79 Ask $12.05 | Bid $15.40 Ask $14.98 | Bid $3.00 Ask $2.25 | Bid $3.55 Ask $4.03 | Bid $5.14 Ask $4.99 |
| High Priority | Bid $7.28 Ask $6.92 | Bid $9.09 Ask $8.87 | Bid $2.10 Ask $1.18 | Bid $2.01 Ask $2.01 | Bid $3.08 Ask $1.55 |
| Normal | Bid $0.00 Ask $0.00 | Bid $0.00 Ask $0.00 | Bid $0.00 Ask $0.00 | Bid $0.00 Ask $0.00 | Bid $0.00 Ask $0.00 |
| Low Priority | Bid $6.92 Ask $7.28 | Bid $8.87 Ask $9.09 | Bid $1.18 Ask $2.10 | Bid $2.01 Ask $2.01 | Bid $1.55 Ask $3.08 |
| Lowest Priority | Bid $12.05 Ask $10.79 | Bid $14.98 Ask $15.40 | Bid $2.25 Ask $3.00 | Bid $4.03 Ask $3.55 | Bid $4.99 Ask $5.14 |

*FIG. 12*

| Road Segment \ Time | 12:00-12:01 pm | 12:01-12:02 pm | 12:02-12:03 pm | 12:03-12:04 pm | 12:04-12:05 pm |
|---|---|---|---|---|---|
| 1 | Cars {01,02,03,04,05} | Cars {03,04,05,06,07} | Cars {07} | Cars {...} | Cars {...} |
| 2 | Cars {04} | Cars {01,02} | Cars {03,04,05,06} | Cars {05,07} | Cars {...} |
| 3 | Cars {09,10} | Cars {04,10} | Cars {01,02,08} | Cars {06} | Cars {05,07} |
| 4 | Cars {11,12,13} | Cars {04,09} | Cars {03,08,09,10} | Cars {01,02,10} | Cars {06,07} |
| 5 | Cars {14,15,16,17} | Cars {11,12,14} | Cars {04,13} | Cars {01,03,08,09} | Cars {02,03,06,10} |
| 6 | Cars {18,19,20} | Cars {15,16,17,19,20} | Cars {11,12,14,17,19} | Cars {01,04,13,14,20} | Cars {02,04,08,09} |

*FIG. 14*

| Priority Parameters | City Passing | Highway Passing | Stop Signs | Parking | Merging into Traffic |
|---|---|---|---|---|---|
| Morning Rush hour | Very High Priority | Very High Priority | High Priority | High Priority | Very High Priority |
| Evening Rush hour | Very High Priority | High Priority | Medium Priority | Low Priority | High Priority |
| Weekend Daytime | Low Priority | Medium Priority | Low Priority | Very Low Priority | Low Priority |
| Weekend Night time | Low Priority | Low Priority | Very Low Priority | Low Priority | Very Low Priority |
| Holidays | Very Low Priority | Very Low Priority | Low Priority | Very Low Priority | Low Priority |

FIG. 29

| Priority Parameters | City Passing | Highway Passing | Stop Signs | Parking | Merging into Traffic |
|---|---|---|---|---|---|
| Monday a.m. Monday p.m. | +200% +150% | +190% +120% | +120% +80% | +100% +50% | +150% +100% |
| Tuesday a.m. Tuesday p.m. | +200% +150% | +190% +120% | +120% +80% | +100% -100% | +150% +100% |
| Wednesday a.m. Wednesday p.m. | +110% +100% | +110% +100% | +110% +100% | +110% +100% | +110% +100% |
| Thursday a.m. Thursday p.m. | +110% +100% | +110% +100% | +110% +100% | +110% +100% | +110% +100% |
| Friday a.m. Friday p.m. | +100% +100% | +100% +100% | +100% +100% | +100% +100% | +100% +100% |
| Saturday a.m. Saturday p.m. | -50% -80% | -60% -75% | -120% -120% | -30% -40% | -50% -70% |
| Sunday a.m. Sunday p.m. | -100% -100% | -100% -100% | -100% -150% | -100% -120% | -100% -100% |

*FIG. 30*

MOBILE PAYMENT SYSTEM FOR TRAFFIC PRIORITIZATION IN SELF-DRIVING VEHICLES

CROSS-REFERENCE TO RELATED APPLICATIONS

This application is a continuation of U.S. patent application Ser. No. 17/244,044 filed Apr. 29, 2021, issuing on Sep. 19, 2023 as U.S. Pat. No. 11,763,410 which was a continuation-in-part (CIP) of U.S. patent application Ser. No. 16/283,767 entitled "VEHICLE-TO-VEHICLE PAYMENT SYSTEM FOR TRAFFIC PRIORITIZATION IN SELF-DRIVING VEHICLES" filed Feb. 23, 2019, now issued as U.S. Pat. No. 11,017,665, which claims priority from U.S. Provisional Patent Application 62/634,904 filed Feb. 25, 2018, all of which are incorporated herein by reference.

TECHNICAL FIELD

The present invention relates generally to self-driving vehicles and, in particular, to traffic prioritization among autonomous or self-driving vehicles.

BACKGROUND

Autonomous or self-driving vehicles use sensors such as RADAR, LIDAR and/or cameras to provide signals to a processor or controller that generates and outputs steering, acceleration and braking signals to the vehicle. A Global Navigation Satellite System (GNSS) receiver such as a Global Positioning System (GPS) receiver is also used for navigation. As the self-driving vehicle drives autonomously toward a destination, the vehicle will encounter other self-driving vehicles. Self-driving vehicles in a given area of a road mutually sense each other's presence using various sensors for collision avoidance and may communicate, via vehicle-to-vehicle messaging protocols, with each other to avoid collisions.

There is a need for a system and method for giving priority, in certain circumstances, to one autonomous vehicle over another.

SUMMARY

In general, the present invention provides a self-driving vehicle system that includes a self-driving vehicle having a processor coupled to a transceiver to transmit and receive vehicle-to-vehicle (V2V) messages with one or more other autonomous vehicles. The V2V messages include a synchronization, or handshake, message to initiate a communication session with another vehicle. A mobile communication device of a user riding in a first vehicle may transmit an offer message to a mobile communication device of a second user riding in a second car by sending the offer message via a mobile communication interface, e.g. a Bluetooth® interface of the vehicle, which receives and re-transmits the offer message as a V2V message to the second vehicle to be communicated to the second mobile communication device communicatively connected to the second vehicle. The offer message includes an offer to pay or provide a financial compensation to the other vehicle in exchange for a priority of passage or traffic prioritization. The vehicle receives a reply message. The reply message may be an acceptance message or a rejection message. If the acceptance message is received, the vehicle transfers the payment to the other vehicle. Upon transfer of the payment, the vehicle automatically performs an adjustment to its routing to take advantage of the prioritization, e.g. to pass the second vehicle. In some cases, the second vehicle must move first to make room for the requesting vehicle, e.g. change lanes. The requesting may be done in response to user input or automatically (programmatically) based on a set of predetermined user settings.

Accordingly, one inventive aspect of the disclosure is a self-driving vehicle comprising a vehicle chassis, a motor supported by the chassis for providing propulsive power for the vehicle, a braking system, a steering system, a plurality of sensors, a processor configured to receive signals from the sensors and to generate steering, acceleration and braking control signals for controlling the steering system, the motor and the braking system of the vehicle, and a Global Navigation Satellite System (GNSS) receiver for receiving satellite signals and for determining a current location of the self-driving vehicle. The self-driving vehicle includes a mobile communication interface communicatively connected to a first mobile communication device of a first user riding in the self-driving vehicle, the mobile communication interface receiving from the first mobile communication device an offer message from the first user to pay for a traffic prioritization relative to a second self-driving vehicle. The self-driving vehicle further includes a vehicle-to-vehicle data transceiver communicatively connected to the mobile communication interface to transmit the offer message to the second self-driving vehicle to be relayed via a second mobile communication interface to a second mobile communication device of a second user riding in the second self-driving vehicle. The mobile communication interface, via the vehicle-to-vehicle data transceiver, receives a reply message from the second mobile communication device and transmits the reply message to the first mobile communication device to cause the first mobile communication device to make a payment from a first account of the first user to a second account of the second user to obtain the traffic prioritization relative to the second self-driving vehicle. The mobile communication interface receives a payment message from the first mobile communication device and transmits, via the vehicle-to-vehicle data transceiver, the payment message to the second mobile communication device to confirm that the payment has been being made.

Another inventive aspect of the present disclosure is a non-transitory computer-readable medium storing computer-readable instructions in code which when executed by a processor of a mobile communication device cause the mobile communication device to communicatively connect to a mobile communication interface of a self-driving vehicle in which the mobile communication device is located, receive user input defining an offer to pay for a traffic prioritization that prioritizes the self-driving vehicle relative to a second vehicle, automatically generate an offer message in response to the user input, the offer message being a datagram in a predetermined data format. The code causes the mobile communication device to automatically transmit the offer message to the mobile communication interface of the self-driving vehicle for communicating the offer message to a second mobile communication device in the second vehicle, the second mobile communication device being configured to automatically read the datagram in the predetermined data format. The code causes the mobile communication device to automatically receive a reply message in the predetermined data format from the second mobile communication device, automatically determine if the reply message constitutes an acceptance or rejection of the offer, and in response to determining that the reply message indicates the acceptance of the offer, send a payment to the second mobile communication device or to an account associated with the second mobile communication device to pay for the traffic prioritization.

Yet another aspect of the present disclosure is a non-transitory computer-readable medium storing computer-readable instructions in code which when executed by a processor of a mobile communication device cause the mobile communication device to display on a user interface of the mobile communication device a fee-for-transport interface of a fee-for-transport application executing on the mobile communication device to enable a user to summon a self-driving vehicle also executing the fee-for-transport application to transport the user from a starting point to a destination for a fee. The code causes the mobile communication device to receive user input from the user to define the destination, wherein the starting point is either a current location of the mobile communication device or a user-specified pickup location, display pricing options based on a plurality of different levels of traffic prioritization for transport to the destination, wherein the pricing options are also based on either distance or travel time to from the starting point to the destination and receive a user-selected traffic prioritization. The code causes the mobile communication device to communicate a pickup request to the self-driving vehicle, the pickup request including the user-selected traffic prioritization to enable the self-driving vehicle to automatically offer one or more payments to one or more other vehicles to obtain the user-selected traffic prioritization along the route to the destination.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which:

FIG. 10 is an example of a database showing prices for different prioritization levels for different road segments.

FIG. 11 is an example of a database showing prices for different prioritization levels for different road segments and further showing arrows indicating whether the prices are above normal market prices for that particular time and place.

FIG. 12 is an example of a database for bid-ask pricing for different prioritization levels for different road segments.

FIG. 14 is a simplified example of a database showing the predicted locations of the vehicles at various times along each of the segments of the projected path.

FIG. 29 is an example of user-configurable priority settings for different times of day that determine logic for how the vehicle automatically makes offers or accepts offers from other vehicles.

FIG. 30 is an example of a user-configurable multipliers for setting prices for various types of traffic manoeuvres.

It will be noted that throughout the appended drawings, like features are identified by like reference numerals.

DETAILED DESCRIPTION

Disclosed herein are various embodiments of a vehicle-to-vehicle payment system for traffic prioritization in self-driving (autonomous) vehicles. The vehicle, system and method that are disclosed in this specification enable one autonomous vehicle to communicate automatically or in response to user input with another autonomous vehicle to negotiate a traffic priority (i.e. preferential treatment) in exchange for a vehicle-to-vehicle payment or other valuable consideration. As such, one autonomous vehicle (AV) can pay another autonomous vehicle to let it pass, go first at a stop sign, take a parking place, etc. i.e. to grant it priority or precedence relative to the vehicle receiving the payment. In another implementation, an emergency vehicle (e.g. an ambulance, police car, fire truck, etc.) can request and obtain priority from nearby autonomous vehicles in traffic. Other embodiments and aspects are also disclosed.

For the purposes of this specification, the term "self-driving vehicle" is meant to encompass any vehicle such as a car, van, minivan, sports utility vehicle (SUV), crossover-type vehicle, bus, minibus, truck, tractor-trailer, semi-trailer, construction vehicle, work vehicle, tracked vehicle, semi-tracked vehicle, offroad vehicle, electric cart, dune buggy, or the like. Although the primary use of the technology is in relation to land-based vehicles, in particular on-road vehicles, in specific implementations that are disclosed herein, the term "vehicle" is meant to encompass unmanned aerial vehicles (drones) or ships, boats or other watercraft. The terms "autonomous" and "self-driving" in relation to "vehicle" are meant to encompass any vehicle having environment-detecting sensors and a processor, controller, computer, computing device or computer system for autonomously steering, accelerating and braking the vehicle, i.e. self-driving or driving autonomously, without a driver physically touching, interacting with or providing input to the steering wheel, accelerator pedal and brake pedal.

Figure 1:
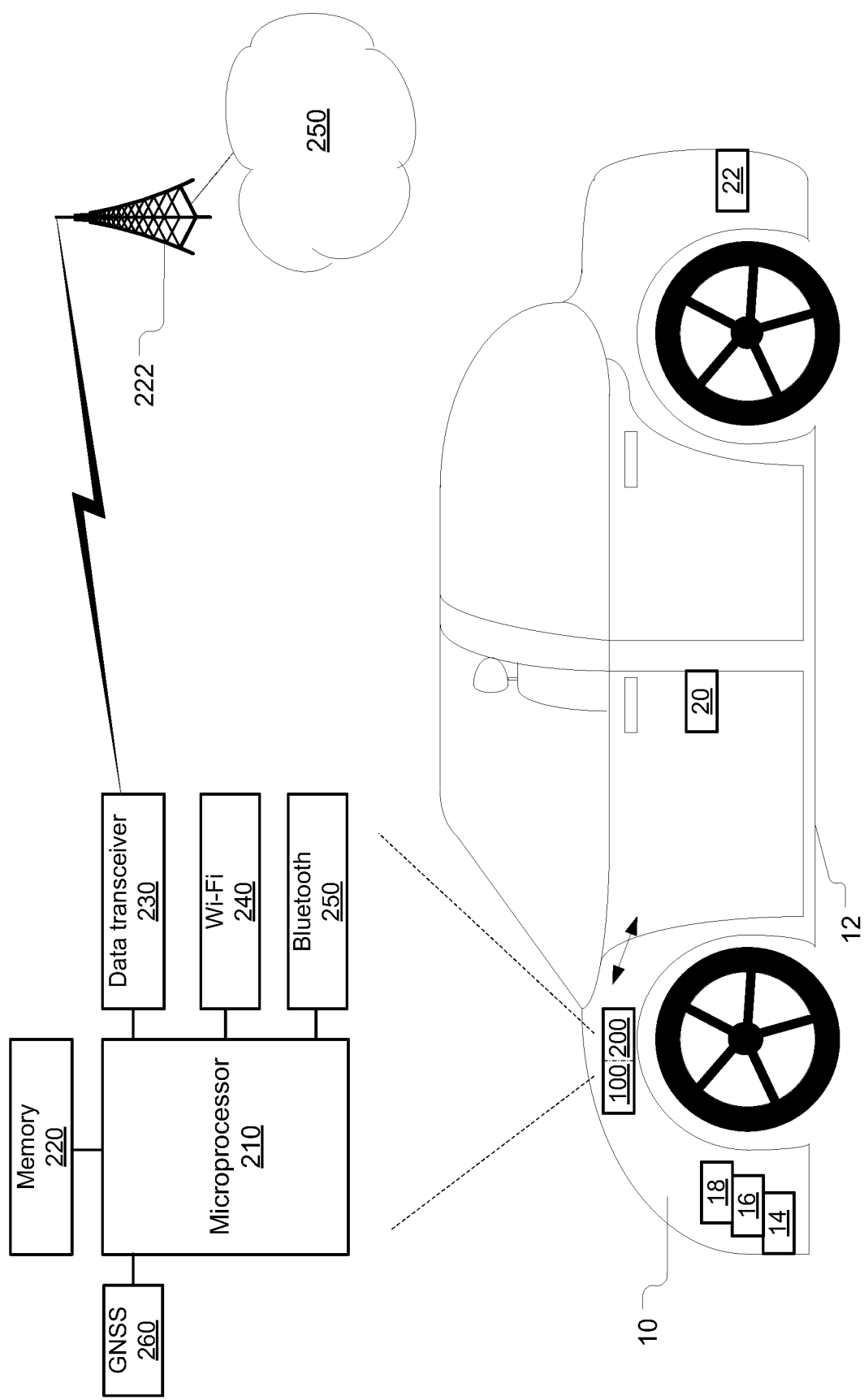
FIG. 1 is a side view of an autonomous ("self-driving") vehicle in accordance with an embodiment of the present invention.

FIG. 1 depicts a self-driving car 10 as one exemplary implementation of a self-driving vehicle or autonomous vehicle (AV). The self-driving vehicle or autonomous vehicle 10 includes, in the illustrated embodiment, a vehicle chassis 12, a motor supported by the chassis for providing propulsive power for the vehicle, a braking system for braking (decelerating) the vehicle and a steering system for steering the vehicle via a steering mechanism which is usually connected to the front wheels. The motor may be an internal combustion engine, e.g. a gas engine or a diesel engine. The motor may alternatively be an electric motor. The motor may be a hybrid-electric powerplant. In a variant, the vehicle may have multiple electric motors for driving different wheels. In another variant, the motor may be a hydrogen fuel cell. The vehicle may include a powertrain to transfer power from the motor to the drive wheels. For some vehicles, the powertrain may include, in addition to the motor (engine), a transmission gearbox, a drive shaft, and a differential. For an electric vehicle implementation, the vehicle includes a rechargeable battery or plurality of rechargeable batteries.

The vehicle of FIG. 1 also includes a plurality of sensors i.e. environment-detecting sensors for collision avoidance. The sensors may include RADAR, LIDAR, cameras and ultrasonic rangefinders. The vehicle depicted by way of example in FIG. 1 includes a first sensor 14, a second sensor 16, a third sensor 18, and a fourth sensor 20. In the illustrated embodiment of FIG. 1, the first sensor 14 is a RADAR sensor, the second sensor 16 is a LIDAR sensor, the third sensor 18 is a camera and the fourth sensor 20 is a side view camera. A fifth sensor 22 is in this illustrated embodiment a rear (backup) camera. Additional sensors may be provided on the vehicle 10, including additional camera, additional LIDAR and RADAR sensors. A different suite of sensors may be used in other variants.

The vehicle 10 may also be a mixed-mode human-drivable and self-drivable vehicle such as a self-driving car, truck, van, etc. that can be optionally driven directly by a human driver sitting in the driver's seat in which case the vehicle has two operating modes: (i) a conventional human driver mode with a human directly driving the vehicle using the steering wheel, brake pedal and accelerator as is conventionally done with non-autonomous vehicles; (ii) a self-driving mode in which the vehicle's processor or computing system drives autonomously without human input, whether a human is seated in the driver's seat or not.

The self-driving vehicle 10 of FIG. 1 further includes a self-driving processor 100 or computing device configured to receive analog or digital signals (data) from the sensors and to generate steering, acceleration and braking control signals for controlling the steering system, the motor and the braking system of the vehicle. The processor 100 may generate a steering control signal, an acceleration control signal and a braking control signal based on the signals received from the sensors. The processor 100 may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a windshield defroster signal, a windshield wiper activation signal, a wiper fluid squirt signal, climate control signal, headlight activation signal, to name but a few.

The vehicle 10 depicted in FIG. 1 also includes a traffic-prioritization processor 200 which may be integrated with the self-driving processor or connected thereto. The processors 100, 200 may be, include, or be part of, any microprocessor, computer, computing device, or microcontroller. In the illustrated embodiment, the self-driving processor 100 and the traffic-prioritization processor 200 are shown as having being implemented as an integrated computing device that has a shared microprocessor 210 and memory 220. Alternatively, the processors 100, 200 may be discrete processors that are communicatively connected or networked together to share data and computational loads. Alternatively, the processors 100, 200 may be separate cores of the same processor, or discrete processors of the same computing device. As will be appreciated, in a variant, there may be multiple processors or computers working together to perform the tasks of the processors 100, 200, e.g. networked together via data buses, communication cables, or wireless links to share computational loads or to perform different tasks.

In the embodiment depicted in FIG. 1, the self-driving processor 100 and the traffic prioritization processor 200 are implemented as a vehicle computing device that has a single microprocessor 210 operatively coupled to a memory 220, e.g. a flash memory and/or random access memory (RAM). The memory may store system data, configuration files and user-related data, rules, parameters and settings. There may be multiple memory devices in the vehicle. In a variant, data may be stored in a cloud-based memory accessible by the vehicle. The vehicle computing device may be part of a vehicle computer system that manages other vehicle functions like engine control, navigation, entertainment, etc.

The self-driving vehicle 10 depicted by way of example in FIG. 1 further includes a data transceiver 230, e.g. a cellular data transceiver, a satellite transceiver or any other radiofrequency data transceiver. The data transceiver may be any suitable wireless data transceiver for transmitting and receiving data wirelessly. In one main embodiment, the data transceiver 230 is a cellular data transceiver. The data transceiver 220 is configured to wirelessly communicate data from the vehicle to the remote control device by attaching communicatively to a base station transceiver 222. Data is transmitted and received over a cellular wireless network using cellular communication protocols and standards for packet data transfer such as GSM, CDMA, GPRS, EDGE, UMTS, LTE, etc. The vehicle may include a Subscriber Identity Module (SIM) card for GSM-type communications or a Re-Usable Identification Module (RUIM) card for CDMA-type communications. The data transceiver may optionally include separate voice and data channels. From the base station transceiver 222 the data is communicated in the illustrated embodiment via the internet 250 to another vehicle or a server or other user equipment, as will be explained below.

The vehicle 10 may also include a Wi-Fi® transceiver 240 and a Bluetooth® transceiver for short-range data communication with other vehicles as will be elaborated below.

The vehicle 10 may also exchange V2V messages using IEEE 802.11p Dedicated Short-Range Communications (DSRC) in the 5.9 GHz band used, or to be used, by intelligent transportation systems (ITS). The DSRC messages are half duplex messages in the 5.850-5.925 GHz range and are short-range (approximately 300 m) and have a high data rate of 6-27 Mbps.

The vehicle 10 may optionally include one or more data communication ports or sockets for wired connections, e.g. USB, HDMI, FireWire (IEEE 1394), etc. or ports or sockets for receiving non-volatile memory cards, e.g. SD (Secure Digital) card, miniSD card or microSD card. These physical data connections may be used to load data onto the memory 220 or to copy data from the memory 220. For example, the data communication ports may be used to upgrade software, to obtain diagnostics for servicing and maintenance, or to upload configuration data to the memory to configure the vehicle for different types of behaviours.

The self-driving vehicle 10 depicted by way of example in FIG. 1 further includes a Global Navigation Satellite System (GNSS) receiver 260 for receiving satellite signals and for determining a current location of the self-driving vehicle. The GNSS receiver may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

As depicted in FIG. 1, in the self-driving (autonomous) vehicle 10, the processor 200 is communicatively coupled to one or more transceivers 230, 240, 250 to transmit and receive vehicle-to-vehicle (V2V) messages to and from one or more other autonomous vehicles in the vicinity of the self-driving vehicle. The messages may be transmitted wirelessly by cellular, Wi-Fi®, Bluetooth®, IEEE 802.11p as a 5.9 GHz DSRC message or any other short-range wireless technology or protocol. The V2V messages in one embodiment include an initial synchronization message, or handshake message, to initiate a communication session with another vehicle based on prior knowledge of the other vehicle's network address or other identifier. The synchronization/handshake message may be a datagram having data bits that are arranged in a recognizable sequence. Alternatively, the V2V messages may be broadcast with a header, pilot signal or preamble data to be recognizable by other vehicles listening within range in the vicinity of the broadcasting vehicle. The V2V messages may be formatted with a preamble field, signal field and a payload component containing the message data according to IEEE 802.11p. The preamble field of IEEE 802.11p has twelve training symbols that describe the frequency channel behaviour and synchronization of the reception. According to the standard, this includes ten Short Training Symbols (STS) and two Long Training Symbols (LTS). Seven of the ten STS are short OFDM symbols for signal detection, automatic gain control (AGC) and diversity selection. Three of these are for coarse frequency offset and timing synchronization. Also, these permit the estimation of the subcarrier frequency and channel estimation. The signal field specifies rate and length information. It has one OFDM symbol assigned to all 52 subcarriers. This symbol is BPSK modulated at 6 Mbps and is encoded at a half rate. The signal field data is interleaved and mapped, and has pilots inserted in subcarriers −21, −7, 7 and 21. The signal field has 24 bits divided into five sub fields, the RATE, RESERVED, LENGTH, PARAITY and TAIL. The RATE field is the first four bits which convey information about the type of modulation and the coding rate used in the rest of the data packet. Other data formats or message formats may be used in other embodiments.

Figure 2:
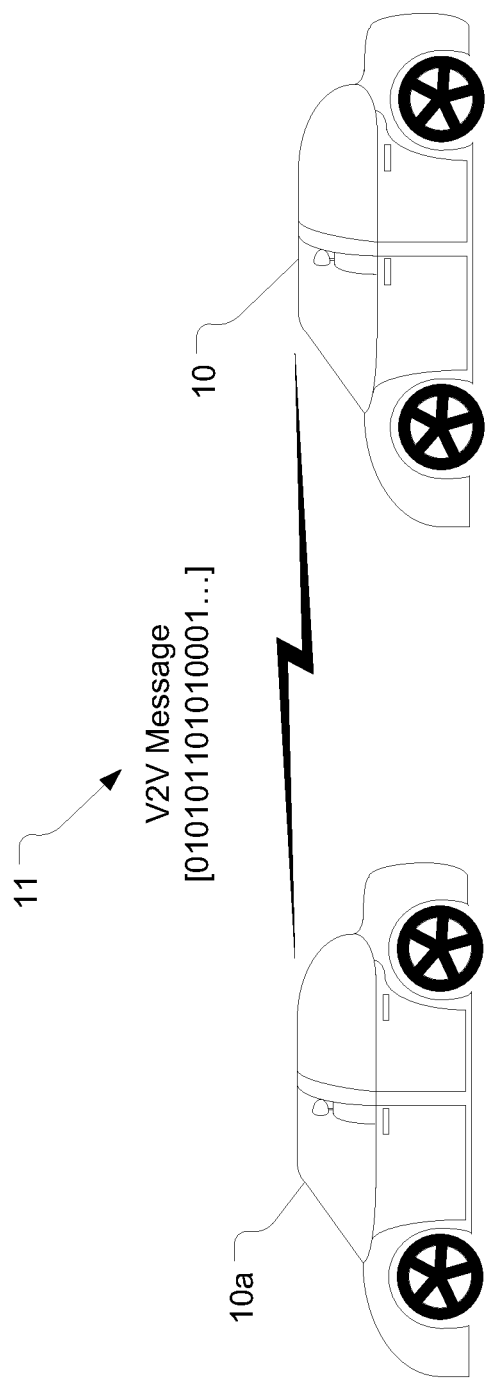
FIG. 2 is a side view of two autonomous vehicles engaged in vehicle-to-vehicle (V2V) messaging to negotiate a payment to reprioritize their relative traffic positions.

As depicted in FIG. 2, a first autonomous vehicle 10 and a second autonomous vehicle 10a communicate by exchanging V2V messages 11 using a short-range wireless connection protocol, e.g. Wi-Fi, Bluetooth or IEEE 802.11p. The messages may be transmitted via an RF signal carrying a bit stream of digital data. The first and second vehicles 10, 10a communicate automatically or in response to user input or user command that trigger the messaging. The V2V messaging enables the two vehicles to automatically negotiate a price or other valuable consideration for giving preferential traffic treatment to one of the two vehicles to the detriment of the other, e.g. letting one vehicle pass the other. In one example, the first AV 10 may pay the second AV 10a to pass. In another example, the first AV 10 may pay the second AV 10a to yield at an intersection, on-ramp, roundabout, parking lot, or in any other situation when the vehicles meet and one of the two can be given precedence over the other.

The V2V messaging may begin with a synchronization message broadcast to vehicles in the vicinity. In one embodiment, the vehicle may use a machine vision algorithm recognize a license plate number and then to look up the license plate in a database, then to transmit the request to a specific number, address, etc. of the vehicle. For example, if the vehicle approach behind a vehicle and wishes to pass the vehicle, the vehicle obtains a camera image of the license plate, looks up the number/address associated with the license plate, and then sends the synchronization message to the vehicle ahead. In another embodiment, vehicles driving in proximity are continually forming and reforming ad hoc mobile wireless networks using a short-range wireless communications technology. The receiving vehicle may accept or reject the handshake message. If the handshake is accepted, the vehicles are synchronized and may then communicate data representing the V2V messages.

Once the two vehicles are communicating, the first vehicle 10 transmits an offer message as a datagram or bitstream to the second vehicle 10a. The offer message or offer datagram may include data bits identifying the sending/offering vehicle, data bits indicating what the request is (allow the requesting vehicle to pass, speed up for a single lane roadway, etc.). The offering datagram may include data bits providing an offer of payment or other financial incentive (e-coupon, sharing wireless data, sharing battery charge for vehicles that charge while driving, or other valuable goods or services). The offer message includes an offer to pay or provide a financial compensation to the other vehicle in exchange for a priority of passage or some other traffic-related adjustment or reprioritization. For the purpose of this specification, the terms prioritization and reprioritization are used generally synonymously to indicate that the vehicle making the payment obtains an advantage or preferential treatment relative to the vehicle receiving the payment. The requesting vehicle 10 (i.e. the first AV) receives a reply message from the receiving vehicle 10a (i.e. the second AV). The reply message may be an acceptance message or a rejection message. Formulation of the reply message may be done automatically or in response to user input. For automatic replies, the receiving vehicle is programmed with a set of rules, parameters or settings that determine how incoming offers are to be processed. For example, a request to pass might require more than $2 dollars to be accepted. Any offer below $2 is automatically rejected. Any offer of $2 or higher is automatically accepted. The receiving vehicle would thus have a rule defining a monetary threshold to automatically accept an offer from a requesting vehicle.

If the acceptance message is received, the first autonomous vehicle 10 transfers the payment to the other (second) vehicle 10a. Upon transfer of the payment, the second vehicle 10a automatically performs an adjustment to its routing, speed, position or behaviour to enable the first vehicle 10 to take advantage of the prioritization, e.g. enable the first vehicle to pass the second vehicle. In some cases, the second vehicle 10a must move first to make room for the requesting vehicle 10, e.g. change lanes. The transmission of the request message may be done in response to user input or automatically (programmatically) based on a set of predetermined user settings. For example, the first AV may be programmed to travel as fast as possible up the maximum speed limit. If the second AV is traveling less than the first AV is attempting the travel, then the first AV will automatically transmit a V2V message requesting that to pass the second AV. The V2V message requesting to pass contains data bits representing a price or payment that the user or occupant(s) of the first AV is or are willing to pay to pass the second AV. The second AV is programmed with its own rules to process the request and to determine whether the offer is acceptable. If so, the second AV replies to the first AV with an acceptance message.

This V2V payment-based traffic reprioritization system and method enables users (i.e. riders, passengers, occupants) of autonomous vehicles to pay to have precedence or priority of passage while others are able to receive payments to yield or grant precedence to others who may in a rush. This V2V payment-based traffic reprioritization system and method may be used in various traffic scenarios and situations, e.g. at stop signs, traffic lights, roundabouts or other traffic situations where two vehicles compete for priority or precedence. A commuter riding in one AV who is not in a rush may thus be able to make money during his or her commute by letting commuters in other vehicles pass or take precedence. The commuter who finds himself or herself in a rush may thus pay to expedite his or her commute.

The V2V payment-based traffic reprioritization system and method enables peer-to-peer negotiation of pricing for the traffic prioritization. The logic, parameters or rules set by each user are executed by respective processors 200 in each vehicle to automatically negotiate a mutually acceptance price for the reprioritization. The prioritization and pricing rules may be time-based rules and/or date-based rules and/or location-based rules, so that the prioritization and pricing rules change based on when and where the autonomous vehicle is operating. For example, the commuter on the weekend might not care about arriving on time and thus be willing to yield to other vehicles in order to earn some extra money. However, on Monday morning, when traveling to work, the commuter in the autonomous vehicle may not be willing to delay his route.

The V2V payment-based traffic reprioritization system and method may be refined to permit counteroffers to be made. For example, the processor 200 of the receiving vehicle may be configured to generate a counteroffer if the offer is not acceptable in terms of inconvenience and/or price. In the counteroffer paradigm, the autonomous vehicle receiving the initial offer is configured to reply with a counteroffer back to the requesting vehicle. Upon receipt of the counteroffer, the requesting vehicle can then accept or reject the counteroffer. Further negotiations, e.g. counter-counteroffers, counter-counter-counteroffers, and so on, can be made in other variants.

To prevent some commuters from trolling the roads by intentionally slowing down their vehicles to frustrate other commuters, the system may have a minimum threshold below which the payment system is automatically deactivated. For example, a given segment of road may have a maximum and a minimum speed within which the AV must be traveling in order to be eligible to receive a payment.

The payment may be made in a national currency, e.g. U.S. dollars, Euros, Canadian dollars, Australian dollars, Japanese Yen, Mexican Pesos, British Pounds, etc. depending on the location of the first and second vehicles at the time the transaction is completed. Payment may be made in bitcoin or other cryptocurrency. Payment may be made with another form of valuable consideration such as e-coupons for gas or battery recharging, food, or other services. Payment may be made in loyalty points redeemable for goods and services (air miles, credit card points), for vouchers for meals at service stations along the road, credits for entertainment (e.g. iTunes), etc.

In one embodiment, the first and second autonomous vehicles 10, 10a can share a cellular wireless connection (allowing one vehicle to piggyback or use the other's cellular or satellite connection) in which case one vehicle can offer to provide cellular or satellite bandwidth to the other vehicle as payment for the traffic reprioritization.

In another embodiment, the exchange can simply be redeemable for reciprocal privileges at a later date. For example, a vehicle who cedes the way to another may accumulate redeemable points to use to request privileges from that or other vehicles when needed or desired. Thus, the system and method may utilize its own internal currency to create credits and debits among users or subscribers. The payment in one embodiment comprises a transfer to the second vehicle of redeemable points that are stored in a database and are redeemable for a subsequent traffic prioritization in favor of the second vehicle.

Autonomous vehicles may automatically or programmatically negotiate with other nearby autonomous vehicles to reprioritize their relative traffic positions, priority or precedence, which is herein referred to generally as a traffic prioritization or reprioritization. One example of a simply reprioritization is a first vehicle passing a second vehicle. As another example, the first and second vehicles can negotiate who should yield at an intersection, at a stop sign, or who should get priority as vehicles merge into a single lane. The first and second vehicles can negotiate automatically between each other, sending V2V messages back and forth, to determine who gets to go first when the vehicles meet at a stop sign, or who gets priority when two vehicles arrive simultaneously at a parking spot or at a drive-through entrance, for example.

In one implementations, a local government authority maintaining the roadways (e.g. a municipality, city, state, nation, etc.) may tax the V2V payments as a means of raising funds to maintain the road infrastructure. In another implementation, some of the payments may be made to a government authority rather to other vehicles. Thus, two autonomous vehicles entering a parking lot may bid dynamically for the parking space. Thus, if there is only a limited number of parking spots, the vehicles can bid for the parking spaces, with the prices thus fluctuating depending on supply and demand. In a hybrid implementation, the vehicle offers both the governmental authority and the other vehicle a payment to get priority.

Figure 3:
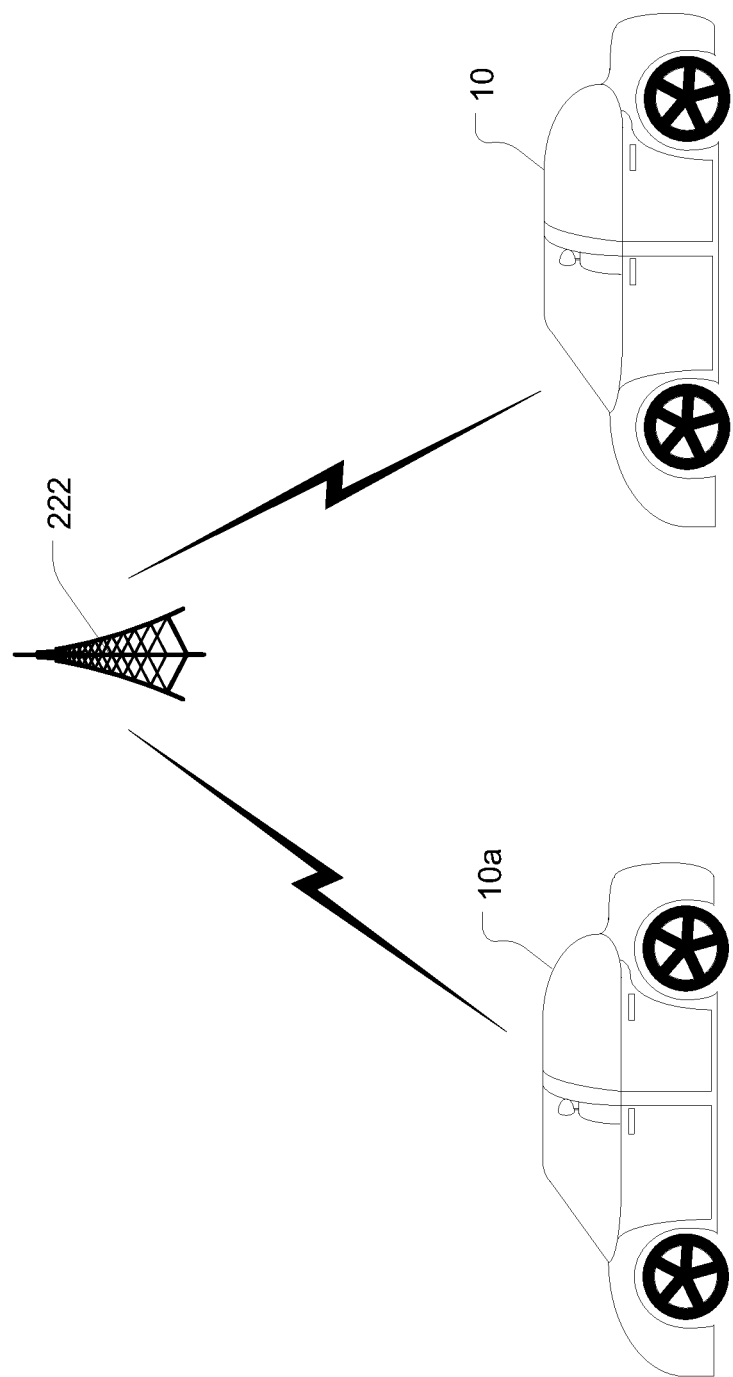
FIG. 3 is a schematic depiction of a system for V2V messaging via a cellular data network.

FIG. 3 is a schematic depiction of a system and method for V2V messaging via a cellular data network. Instead of a direct short-range wireless connection between the vehicles, as was shown in FIG. 2, the system of FIG. 3 uses a cellular data connection to exchange messages between the vehicles. The first vehicle has a first device identifier and the second vehicle has a second identifier, which may be any system or protocol akin to GSM, LTE or 5G handheld mobile devices that enable data messages to be communicated over the cellular network.

Figure 4:
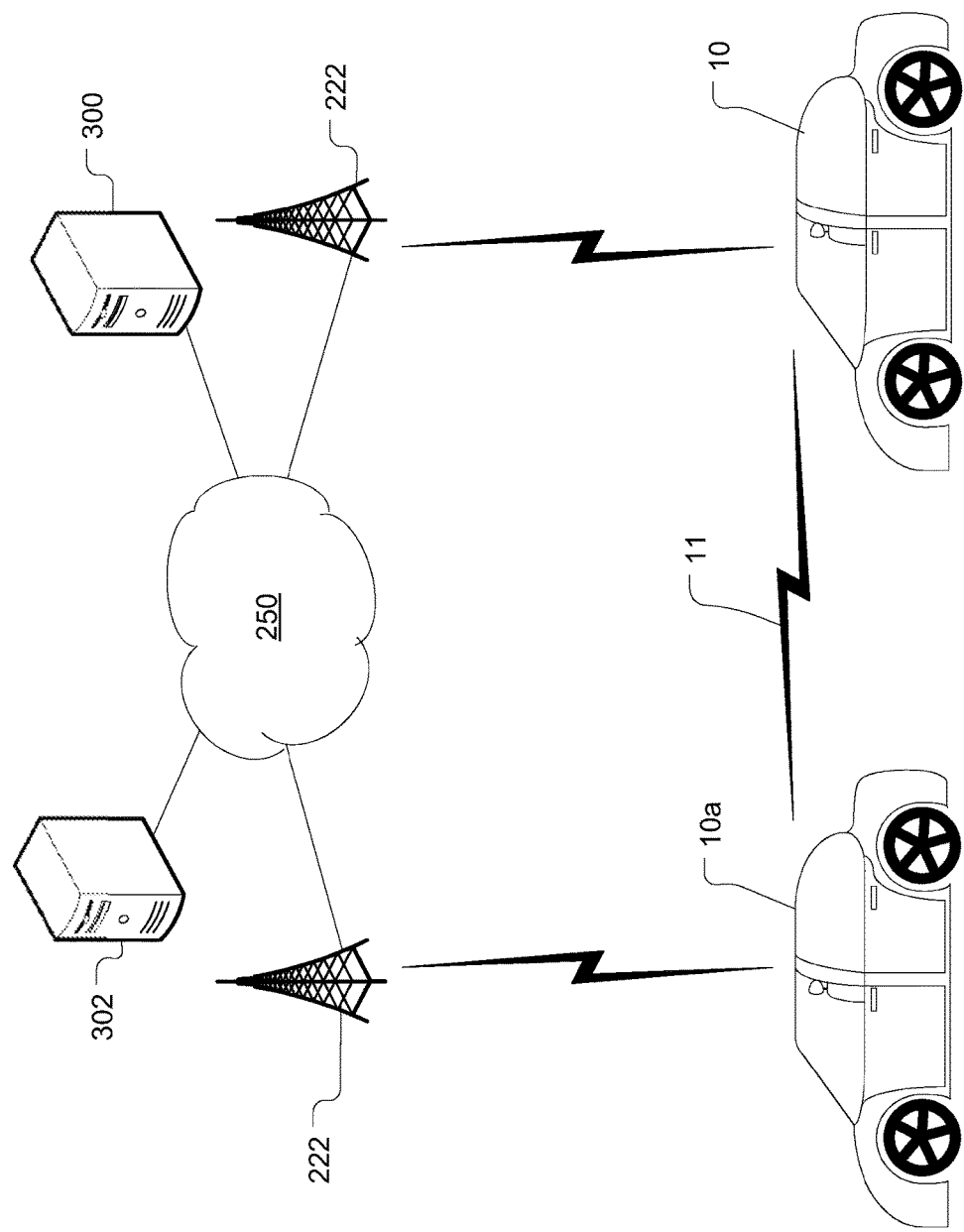
FIG. 4 is a schematic depiction of a system for V2V payments for traffic reprioritization.

FIG. 4 is a schematic depiction of a system and method for V2V payments for traffic reprioritization between two vehicles having direct wireless connectivity. In this example, the first autonomous vehicle 10 exchanged V2V messages 11 with the second autonomous vehicle 10a to negotiate a payment for a traffic reprioritization. Assuming the transaction proceeds because both parties agree to the price, the first vehicle 10 communicates via a base station transceiver 222 of a wireless network via the internet (or other data network) with a first bank server or payment processing server 300 associated with a first user of the first AV 10. The AV 10 transfers a payment electronically (via the internet 250) to the second bank server or payment processing server 302 which then notifies the second AV 10a of the transfer via a wireless communication transmitted by the base station transceiver 222 (or by a different base station transceiver if the second AV 10a uses a different wireless carrier).

Figure 5:
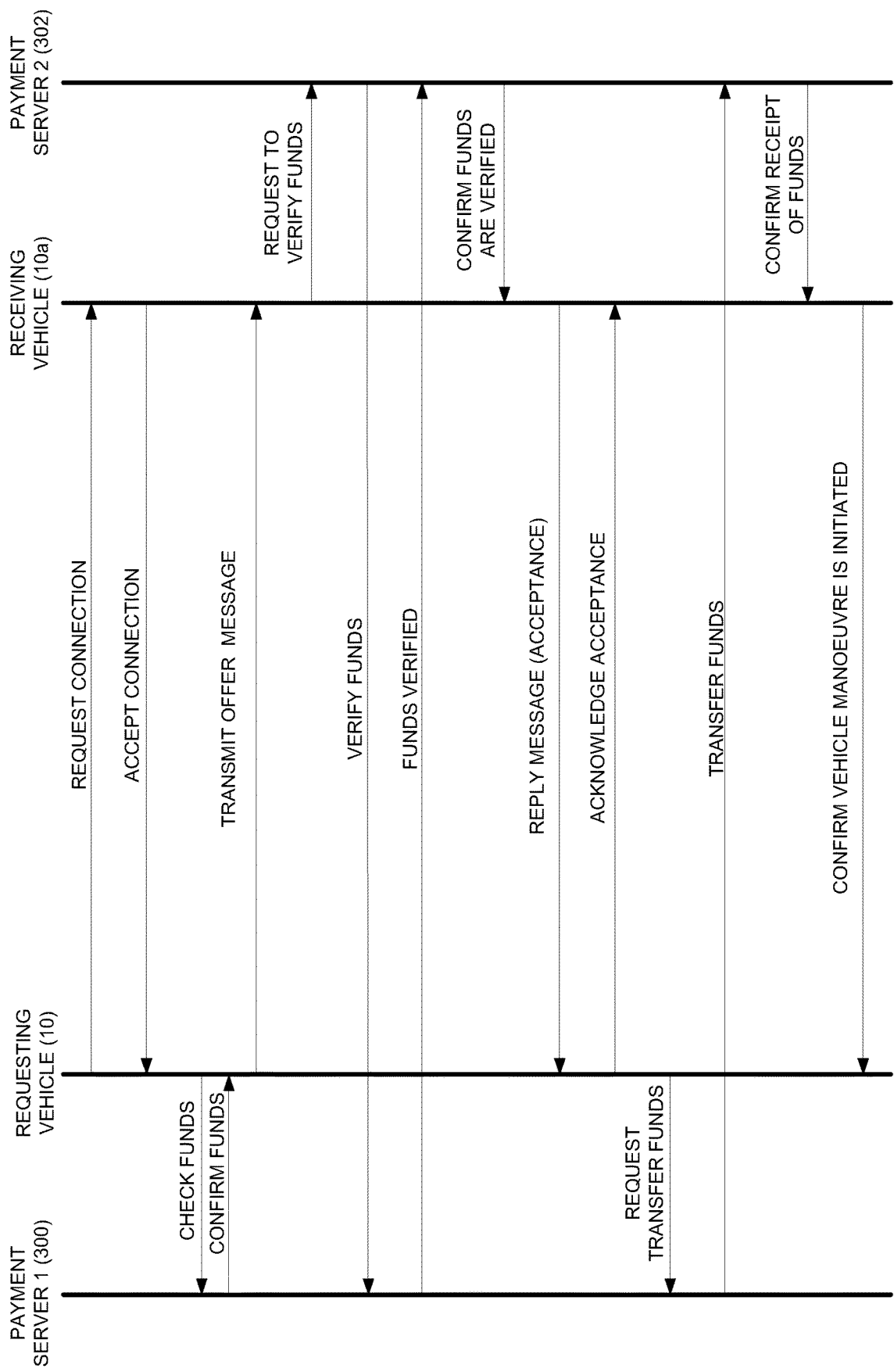
FIG. 5 is a data flow showing V2V messaging for transferring a payment from one autonomous vehicle to another to reprioritize their relative traffic positions.

FIG. 5 is a messaging data flow showing V2V messaging for transferring a payment from one autonomous vehicle to another to reprioritize their relative traffic positions. In FIG. 5, the first AV 10 is associated with a first payment server 300 whereas the second AV 10a is associated with a second payment server 302. Being associated with a payment server means, in most embodiments of the invention, that the user/owner/operator/commuter/passenger/occupant of the AV has a bank account or financial account with a bank, payment processing facility, financial institution, credit card company or equivalent and is thus able to pre-program the AV to perform automatic financial transactions (make payments or receive payments) using money in the bank account or financial account.

As shown by way of example in FIG. 5, the requesting vehicle (first AV) requests a connection or session with the second AV. The second AV accepts (or rejects) the request to create a connection or session. This is known herein as the handshake request. The first AV checks that it has funds to make an offer by communicating with the first payment server. The first payment server confirms (or not) that sufficient funds are available. Upon receipt of this confirmation, the first AV automatically transmits the offer message to the second AV. On receipt of the offer message, the second AV applies its acceptance rules to the offer and automatically accepts or rejects the offer from the first AV but does not communicate the acceptance to the first AV until it has verified that the funds are immediately available for transfer from the first AV. If the offer is accepted by the second AV, the second AV asks its own payment server (payment server 2) to verify that the funds are available from the first AV, i.e. that the first AV can afford to pay the offered amount. The second payment server 302 sends a fund verification request to the first payment server 300. The second payment server 302 receives a fund verification message from the first payment server 300 to confirm that the funds are immediately available to be transferred. The second payment server 302 then sends a fund verification confirmation to the second AV to notify the second AV that the funds are available. Once this confirmation is received, the second AV 10a transmits the acceptance message to the first AV 10. The first AV 10 replies with an acknowledgement message. The first AV 10 then sends a fund transfer request to the first payment server 300. In response to receiving the fund transfer request, the first payment server 300 electronically transfers the funds to the second payment server 302 into the account associated with the second AV. The second payment server 302 then sends a fund receipt notification to the second AV. The second AV, upon receipt of the confirmation that the funds have been transferred, automatically initiates the traffic manoeuvre to give priority or precedence to the first AV.

Figure 6:
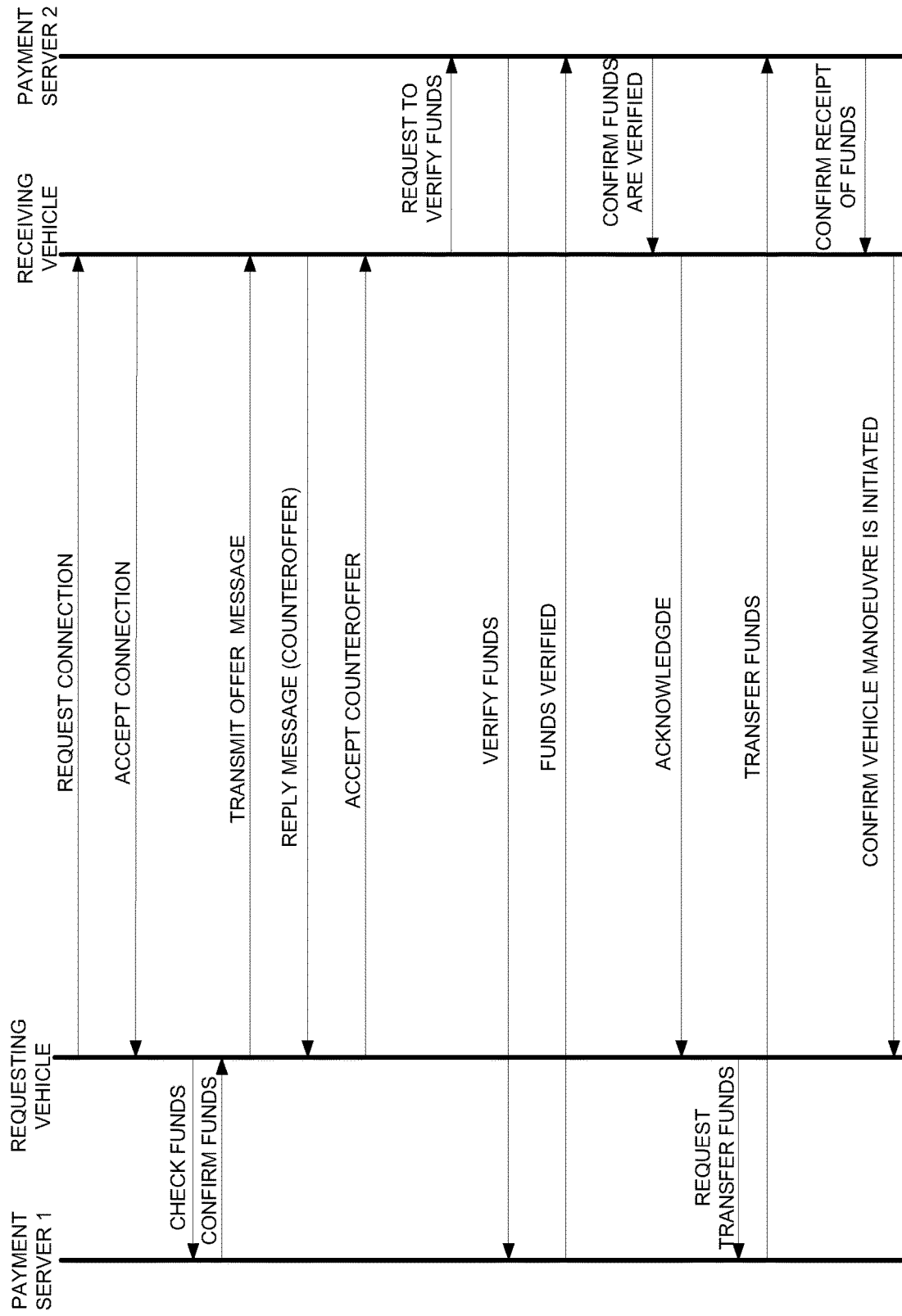
FIG. 6 is another data flow showing V2V messaging for making a counteroffer to reprioritize their relative traffic positions.

FIG. 6 is another data flow showing V2V messaging for making a counteroffer to reprioritize their relative traffic positions. This message data flow is similar to the one presented in FIG. 5 except that the second AV replies with a counteroffer. The reply message containing the counteroffer is processed by rules and logic stored in the processor 200 of the first AV. If the counteroffer is accepted by the first AV, the first AV transmits a counteroffer acceptance message back to the second AV. It will be appreciated that the negotiation could involve multiple messages back and forth. In some cases, the offer message has an expiry time or becomes void if the second AV moves beyond a predetermined amount from its current position relative to the first AV.

Figure 7:
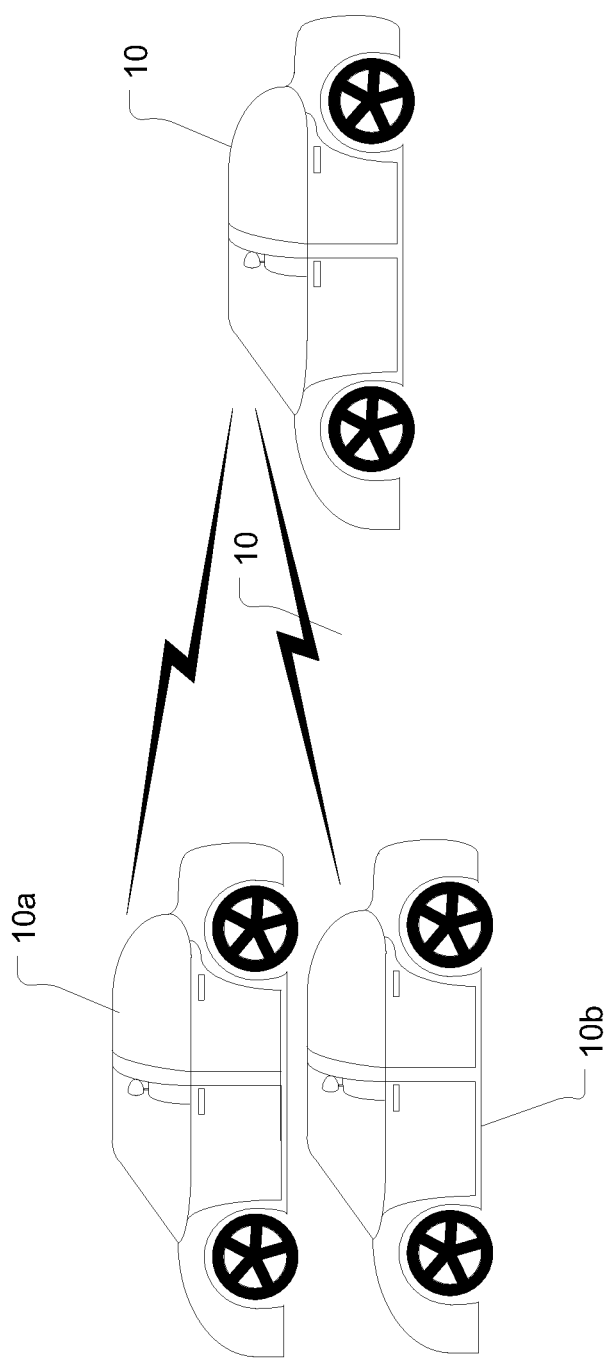
FIG. 7 is a schematic depiction of parallel offer messages being transmitted from a single autonomous vehicle to two other autonomous vehicles.

FIG. 7 is a schematic depiction of parallel offer messages being transmitted (e.g. broadcast) from a single autonomous vehicle to two other autonomous vehicles. In this example, the first AV 10 broadcasts or multicasts request messages to a second AV and a third AV 10b. In this case, the first AV may be configured to transact with either or both of the second AV and the third AV. As an example, consider a scenario in which the second AV and the third AV are traveling side by side in two adjacent lanes preventing the first AV from passing. The first AV may broadcast a request to both the second AV and the third AV to offer a payment in exchange for letting the first AV pass one of the two vehicles. If the second AV replies before the third AV, the first AV performs the transaction with the second AV only. In this case, the offer is a conditional offer. The V2V offer message may contain bits in a data field indicating that the offer is conditional, e.g. first to reply, time-limited, location-limited, etc.

Figure 8:
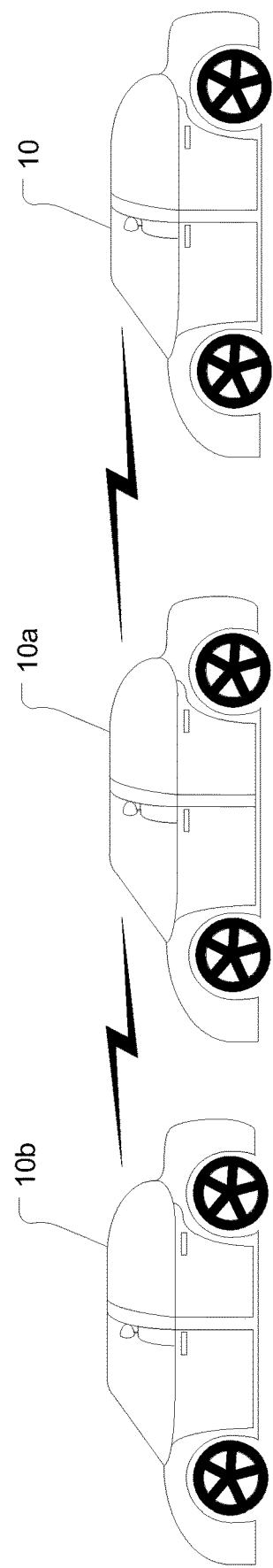
FIG. 8 is a schematic depiction of serial offer messages being transmitted from a first autonomous vehicle to a second autonomous vehicle and then relayed from the second autonomous vehicle to a third autonomous vehicle.

FIG. 8 is a schematic depiction of serial offer messages being transmitted from a first autonomous vehicle (AV) 10 to a second autonomous vehicle (AV) 10a and then relayed from the second autonomous vehicle (AV) 10a to a third autonomous vehicle (AV) In one embodiment, the second AV 10a replies to the request made by the first AV to indicate that it alone cannot take the requested action because of the presence of another vehicle, in this example the third AV 10b. The second AV 10a relays the request from the first AV to the third AV. The third AV replies with an acceptance (or a rejection) which the second AV transmits back to the first AV. Assuming the third AV accepts the offer from the first AV, the second AV transmits its own acceptance to the first AV. The first AV then makes a payment to both the second AV and the third AV, which may be the same amount or different amounts. The second and third AV then cede the way, or give precedence, to the first AV. In another embodiment, the first AV makes conditional offers to both the second AV and third AV which is ahead of the second AV. The offer message contains bits in a data field indicating that the offer is conditional on both the second AV and the third AV accepting; otherwise, the offer is null and void. Provided both the second AV and the third AV accept the offers, the first AV transfers payments to the second AV and to the third AV. The example presented in FIG. 8 is a simple three vehicle scenario. However, it will be appreciated that the concept of conditional offers may be extrapolated to a larger number of vehicles.

In another embodiment, the acceptance by the second vehicle of an offer from the first vehicle may be conditional on the acceptance of the second vehicle's own offer to a third vehicle. In such a case, the acceptance message communicated back to the first vehicle indicates that the acceptance is conditional pending acceptance of another offer made by the second vehicle to the third vehicle. The first vehicle may apply its own time-based rules or location-based rules to withdraw or nullify the offer after a predetermined time has elapsed or if the vehicle's relative positioning has changed more than a predetermined amount. An offer withdrawal message (or offer cancellation message) may be communicated automatically from the first vehicle to the second vehicle.

Figure 9:
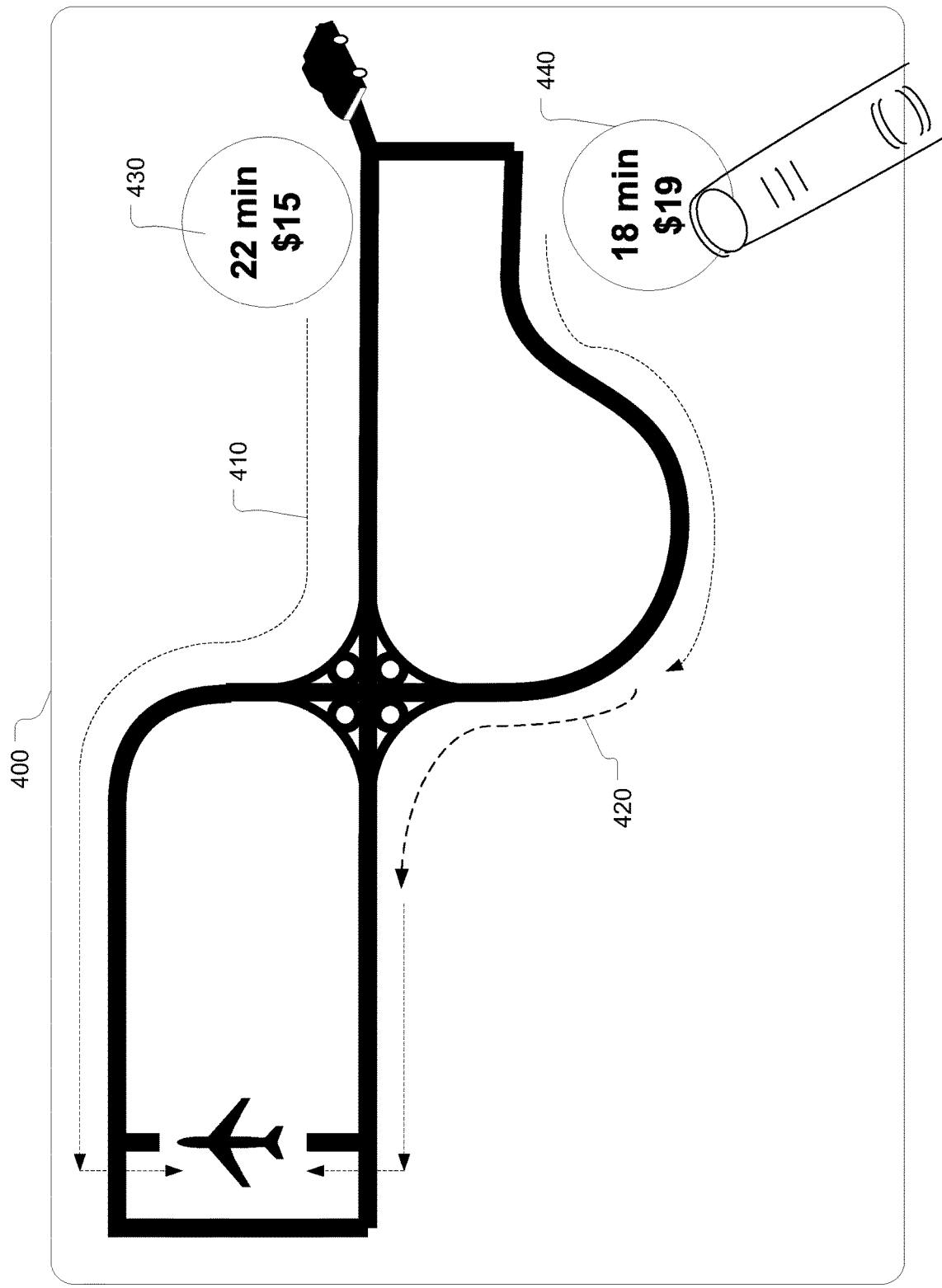
FIG. 9 illustrates an example of a user interface of a navigation system that presents pricing and timing data to enable the user of the autonomous vehicle to select one of two routes based on both pricing and timing, wherein the pricing is computed by historical route pricing data for that time of day.

FIG. 9 illustrates an example of a user interface 400 of a navigation system that is integrated or communicatively coupled with the traffic prioritization processor 200 of the autonomous vehicle. The user interface 400 may displayed on a touch-sensitive display screen in the vehicle. The processor presents pricing and timing data via the user interface 400 to enable the user of the autonomous vehicle to select one of two routes based on both pricing and timing. In one embodiment, the pricing is computed based on historical route pricing data for that time of day. A first route 410 and a second route 420 are shown graphically on a map displayed on the user interface 400. The user interface 400 presents a first user-selectable interface element 430 which presents an estimated price and travel time for the first route ($15 and 22 minutes). The user interface 400 presents a second user-selectable interface element 440 which presents an estimated price and travel time for the second route ($19 and 18 minutes). In this example, if the user is in a rush, he can choose the second route by touching (selecting) the second user-selectable interface element 430. The second route costs $4 more but saves 4 minutes of travel time. All prices and times in this specification and drawings are solely presented as examples and are not meant to limit the scope of the invention.

In the above implementations, the vehicles perform V2V messaging individually between vehicles to negotiate discrete traffic reprioritization events. In another paradigm, a central server, server cluster, server farm or cloud-based manager can act as a central intermediary for all offers and acceptances for vehicles traveling through a given geographical area.

FIG. 10 is an example of a database showing prices for different prioritization levels for different road segments for a geographical area at a particular time of day and day of the week. FIG. 10 shows as an example how the pricing varies for different prioritization levels for different road segments. Instead of peer-to-peer negotiations for each traffic event, this aggregated pricing model may be used in a centrally regulated paradigm in which a central authority server acts as an intermediary for all offers and requests to simplify messaging. The database of FIG. 10 contains specific pricing for a zone or area, e.g. Boca Raton, Florida and for a specific day, e.g. March 12 at 5 p.m. Five levels of prioritization are provided in this example: highest priority, high priority, normal, low priority and lowest priority. Five roadways are presented in this exemplary database: I-95 North, I-95 South, Glades Road, Palmetto Park Road, and Yamato Road. The number of roads and levels of priority are presented solely as an example. For example, a vehicle traveling a predetermined segment along 1-95 North in the Boca Raton area whose passenger wishes to have the highest priority would pay $11.07. High priority would cost $6.95. No reprioritization (i.e. not participating) would cost nothing (zero dollars). Selecting low priority would mean the user would receive $6.95. Selecting the lowest priority would mean the user would receive $11.07. The pricing varies for each of the different roadways as shown. The pricing may dynamically fluctuate in time for a given roadway, road segment, or location based on supply and demand. The aggregate pricing model simplifies the transactions for the autonomous vehicles. The vehicle may display the prices for the user to select a priority level at the beginning of a drive, when entering the vehicle or when programming a route in a navigation system of the vehicle, on demand in response to a user request, when the prices have changed, or based on any other trigger, condition or event.

FIG. 11 shows a variant of the database of FIG. 10 further showing arrows indicating whether the prices are above normal market prices for that particular time and place. The arrows provide pricing to enable the user to make an informed decision.

FIG. 12 is an example of a database for bid-ask pricing for different prioritization levels for different road segments for use in a centrally regulated paradigm in which a central authority server acts as an intermediary, broker or clearinghouse for all offers and requests to simplify messaging. The central authority server receives all payments from prioritized vehicles and distributes the money to the de-prioritized vehicles. The bid is the price being offered for the prioritization. The ask is the price the receiving vehicle is asking to grant the prioritization. In this example, analogous to the example presented in FIG. and FIG. 11, the bid-ask database contains specific pricing for a zone or area, e.g. Boca Raton, Florida and for a specific day, e.g. March 12 at 5 p.m. Five levels of prioritization are provided in this example: highest priority, high priority, normal, low priority and lowest priority. Five roadways are presented in this exemplary database: I-North, I-95 South, Glades Road, Palmetto Park Road, and Yamato Road. The number of roads and levels of priority are presented solely as an example. In this bid-ask pricing model, a vehicle traveling a predetermined segment along 1-95 North in the Boca Raton area can view what it would cost to expedite his travel by requesting high priority or highest priority. Conversely, the user can see how much it would pay to reduce to low priority or lowest priority. Note that there is a pricing asymmetry between the bid and the ask due to differential amounts of users wishing to either speed up their travel or to make money by ceding precedence, i.e. a disequilibrium in the supply and demand. During rush hour, for example, there may be more demand for express routing than on the weekend, meaning that more people are willing to pay than to be paid. Over time, this causes the price to rise. When the number of users wishing to speed up equals the number of users wishing to slow down for a given segment at a given time, the bid and ask converge to the same price point. Thus, in this example, the price to be granted the highest priority along 1-95 North is $10.79. Conversely, along the same segment of roadway, the central authority server would pay the user of the AV $12.05 to accept to be given the lowest priority. To request high priority, the bid price is $7.28 whereas the ask price is $6.92. This means that, at that particular time and place, it would cost $7.28 to be granted high priority whereas it would pay the user $6.92 to accept low priority. The bid-ask pricing road segments may be displayed on a user interface in the autonomous vehicle for selection by the user of the autonomous vehicle.

Figure 13:
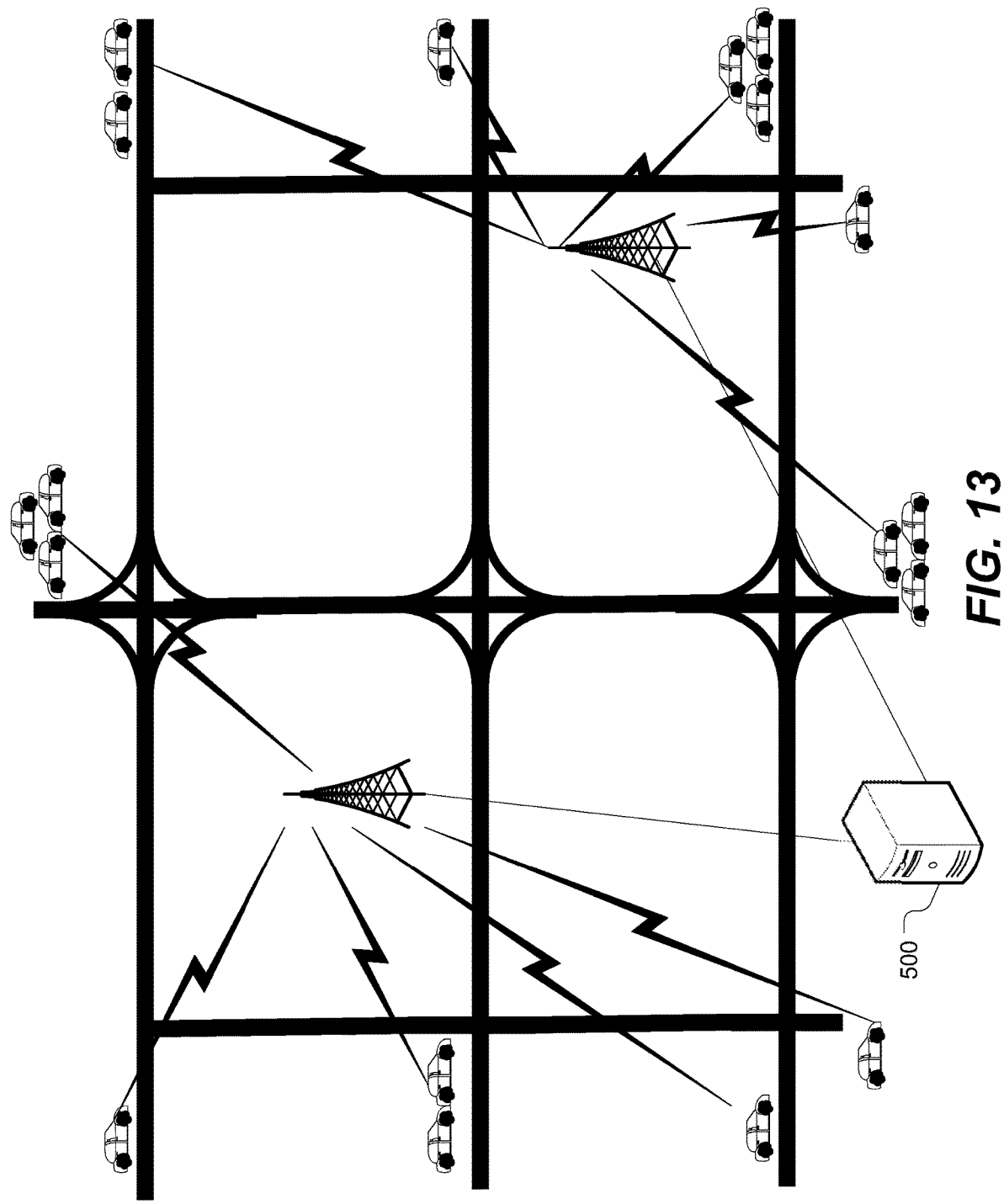
FIG. 13 is a schematic depiction of multiple vehicles entering an area and transmitting their route plans to a central server to enable pricing to be determined for that area.

FIG. 13 is a schematic depiction of multiple autonomous vehicles entering an area via various routes or entry points and transmitting, upon entry into the area or beforehand, their respective route plans to a central server 500 to enable pricing to be determined for that area. The pricing is based in this embodiment on a comparison of all of the potential vehicle-to-vehicle interactions (potential inference between vehicles competing for traffic precedence). V2V interactions occur when two or more vehicles travel close to each other, i.e. within a predetermined distance threshold such that at least one vehicle's progress is at least partially or potentially hindered, inhibited or retarded by another vehicle. Summing each of these V2V interactions establishes congestion indices for each segment of each route, and enables the computation of an estimated delay time and thus of an estimated time of arrival for a given route to a destination. Based on the projected congestion indices, the central server can compute and broadcast travel times with and without prioritization, or with different levels of prioritization, along with respective costs or payouts for each level of prioritization. A cost in this context means an amount the vehicle pays to get higher precedence (lower level prioritization in traffic). A payout in this context means an amount the vehicle receives to accept a lower precedence (lower level prioritization in traffic).

FIG. 14 is a simplified example of a database showing the predicted locations of the vehicles at various times along each of the road segments of the projected path. The central server 500 generates a database, data structure or table that predicts the locations of autonomous vehicles as they traverse an area of interest. The central server 500 predicts, for every vehicle in the area, which segment each vehicle will be traveling along during which timeslot. For example, consider the predicted progress of vehicle 01 as the travels along road segments 1 to 6. During the first timeslot (12:00-12:01 p.m.), vehicle 01 is traveling along road segment 1. As vehicle 01 is traveling along road segment 1, vehicles 02, 03, 04, and 05 are also simultaneously traveling along that same segment of road. The central server 500 can thus estimate the likely congestion based on the number of vehicles. The central server 500 can then determine pricing amongst those vehicles based on their stated preferences (high priority, low priority, etc.) and can furthermore broker payments amongst the vehicles. During the second timeslot (12:01-12:02 p.m.), vehicle 02 is traveling along road segment 2. Only vehicle 02 is nearby vehicle 01 at that time along road segment 2. During the third timeslot (12:02-12:03 p.m.), vehicle 01 is traveling along road segment 3. In addition to vehicle 02, vehicle 08 is also nearby as vehicle 01 travels along road segment 3. During the fourth timeslot (12:03-12:04 p.m.), vehicle 01 is traveling along road segment 4 along with vehicles 02 and 10. During the same fourth timeslot (12:03-12:04 p.m.), vehicle 01 travels along road segments 5 and 6, encountering vehicles 03, 08, and 09 along road segment 5 and vehicles 04, 13, 14 and 20 along road segment 6.

Figure 15:
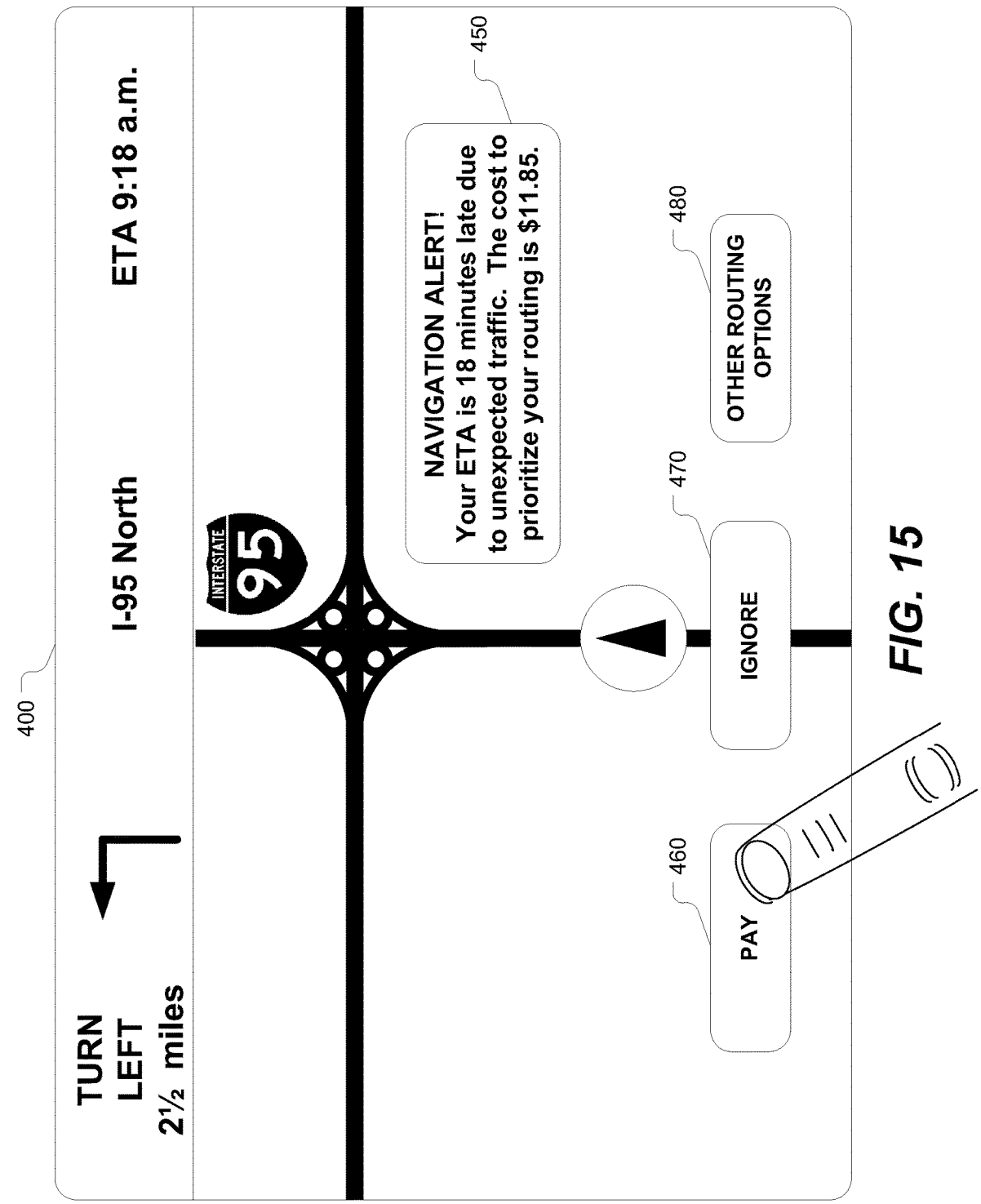
FIG. 15 is a user interface of a navigation system showing an alert indicating that the estimated time of arrival will be later than originally predicted and providing the user to pay an amount to expedite the routing.

FIG. 15 is a user interface 400 of a navigation system of the autonomous vehicle showing an alert 450 indicating that the estimated time of arrival will be later than originally predicted and providing the user with an option to pay an amount to expedite the routing. The amount may be calculated based on the predicted amount of V2V interactions and the expected cost, based on historical data, to be granted priority along the route. The user interface includes a pay button 460, an ignore button 470 and a virtual button to request other routing options 480. The other routing options may present detours and alternate routes with respective travel times and associated costs.

Figure 16:
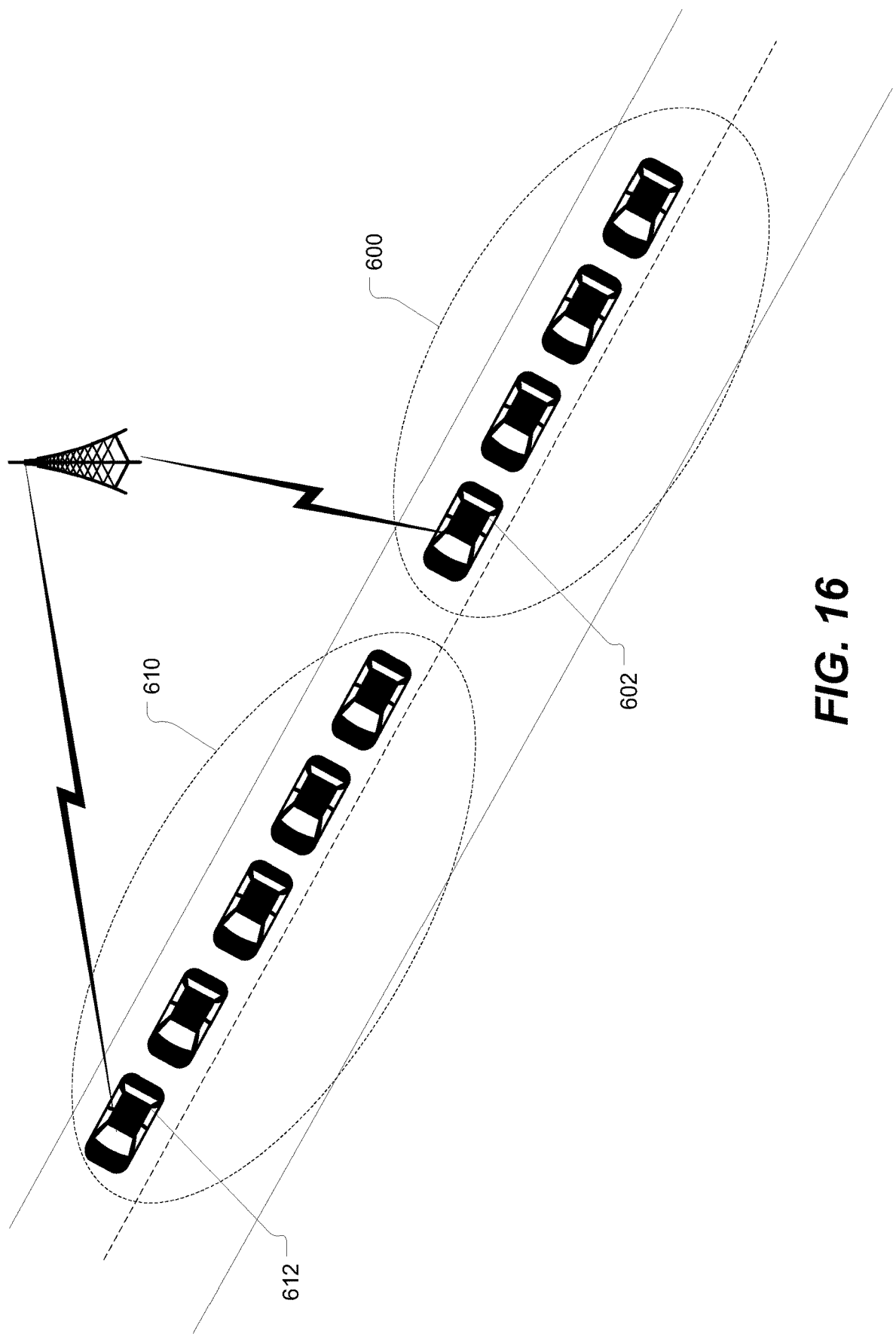
FIG. 16 is an example of a convoy of cars paying a second convoy of cars to pass them.

FIG. 16 is an example of a first convoy 600 of autonomous vehicles paying a second convoy 610 of autonomous vehicles to pass the first convoy 600. Although the reprioritization in this example is passing, the traffic reprioritization for which the first convoys pays the second convoy, may be any other action such as yielding the way, giving precedence at an intersection, etc. The convoys may be motorcades or any other groups of vehicles that are following a leader en route to a common destination. The group of vehicles may be, for example, communicatively linked to each other or to the lead vehicle. In this example, a first lead vehicle 602 of the first convoy 600 communicates with a second lead vehicle 612 of the second convoy 610 to negotiate the payment for the privilege of passing. In this example, all of the vehicles behind the first lead vehicle in the first convoy are automatically following the first lead vehicle whereas all of the cars behind the second lead vehicle in the second convoy are also automatically following the second lead vehicle.

Figure 17:
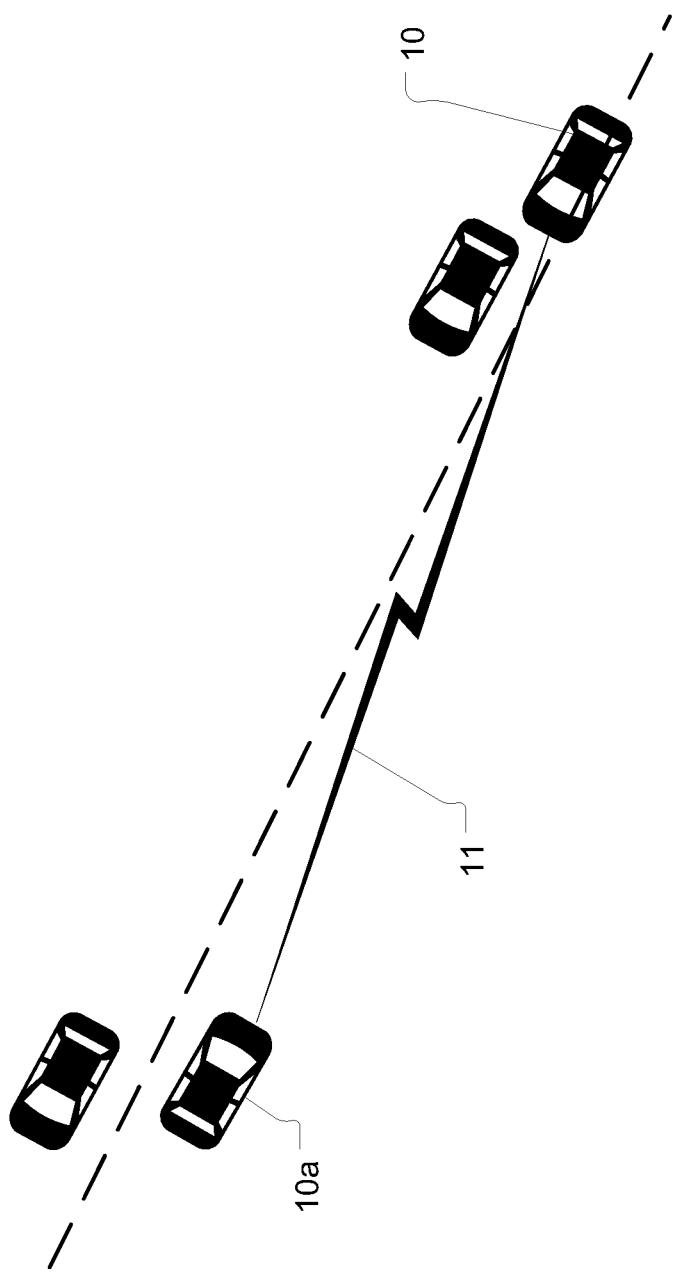
FIG. 17 is an example of a requesting car negotiating with an oncoming car to request that the oncoming car slow down to enable the requesting car to pass another vehicle by temporarily entering the lane of the oncoming car.

FIG. 17 is an example of a requesting car 10 negotiating via V2V messages 11 with an oncoming car 10*a* to request that the oncoming car 10*a* slow down to enable the requesting car 10 to pass another vehicle directly ahead of it by temporarily entering the lane of the oncoming car 10*a*. In a variant, the requesting car 10 also notifies and/or negotiates with the vehicle directly ahead of it to ensure that this vehicle does not accelerate, change lanes or perform some action that would affect the safe passing by the requesting car.

Figure 18:
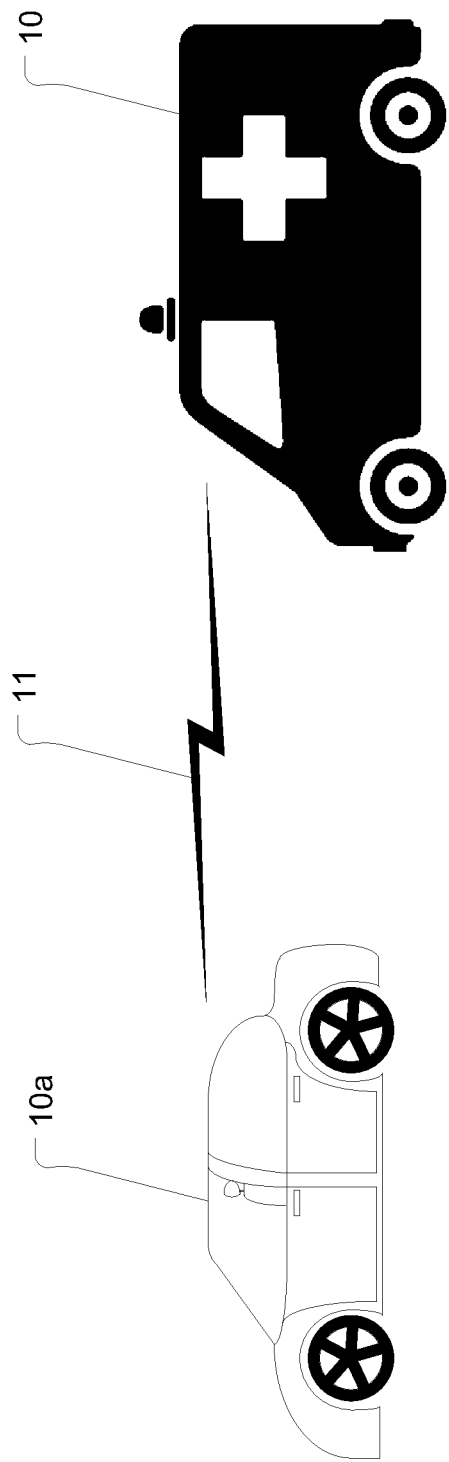
FIG. 18 is an example of an emergency vehicle, e.g. an ambulance, exchanging V2V messages with a vehicle.

FIG. 18 is an example of an emergency vehicle 10, e.g. an ambulance, exchanging V2V messages 11 with another vehicle 10*a* that is hampering the progress of the emergency vehicle. In a first paradigm, the emergency vehicle makes the request without offering any payment because the vehicle is an emergency vehicle. The autonomous vehicle 10*a* receiving the request from the emergency vehicle is programmed to automatically cede the way to any emergency vehicle (ambulance, fire truck, police car, etc.) without requiring any payment. A special code may be transmitted wirelessly by emergency vehicles, e.g. when their sirens are activated or in other circumstances, that is automatically recognizable by autonomous vehicles. In a second paradigm, the emergency vehicle makes a small nominal payment that is paid for by the state or, for example, by the ambulance company.

Figure 19:
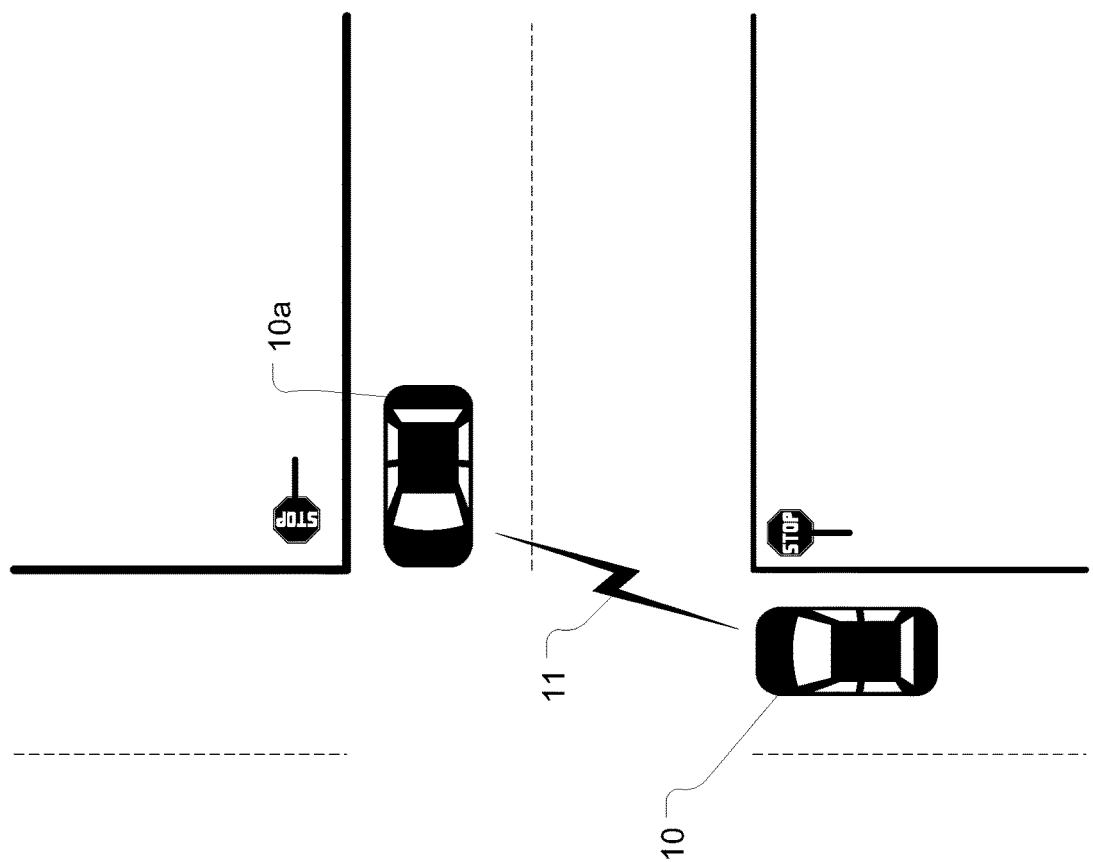
FIG. 19 is an example of V2V messaging between two autonomous vehicles at or approaching respective stop signs.

FIG. 19 is an example of V2V messaging between two autonomous vehicles at, or approaching, respective stop signs at an intersection. As depicted in FIG. 19, a requesting vehicle 10 initiates V2V messaging 11 with a receiving vehicle 10*a* to request priority or precedence at the intersection. Although the rules of the road in many jurisdictions dictate that the vehicle must give precedence to the vehicle to the right when arriving simultaneously at an intersection, the requesting vehicle 10 may offer to the receiving vehicle 10*a* a payment to be granted precedence at the intersection. In one implementation, the vehicle 10 detects the arrival of the other vehicle 10*a* and predicts that the two vehicles will arrive substantially simultaneously at the intersection. The vehicle checks whether the user has specified a priority level for events such as meeting at intersections. If the user has prescribed a precedence-seeking behaviour for the traffic event (e.g. meeting at an intersection), the requesting vehicle 10 then transmits a V2V message to the receiving vehicle 10*a* requesting that it be given precedence and offering a payment to the receiving vehicle for this preferential treatment.

Figure 20:
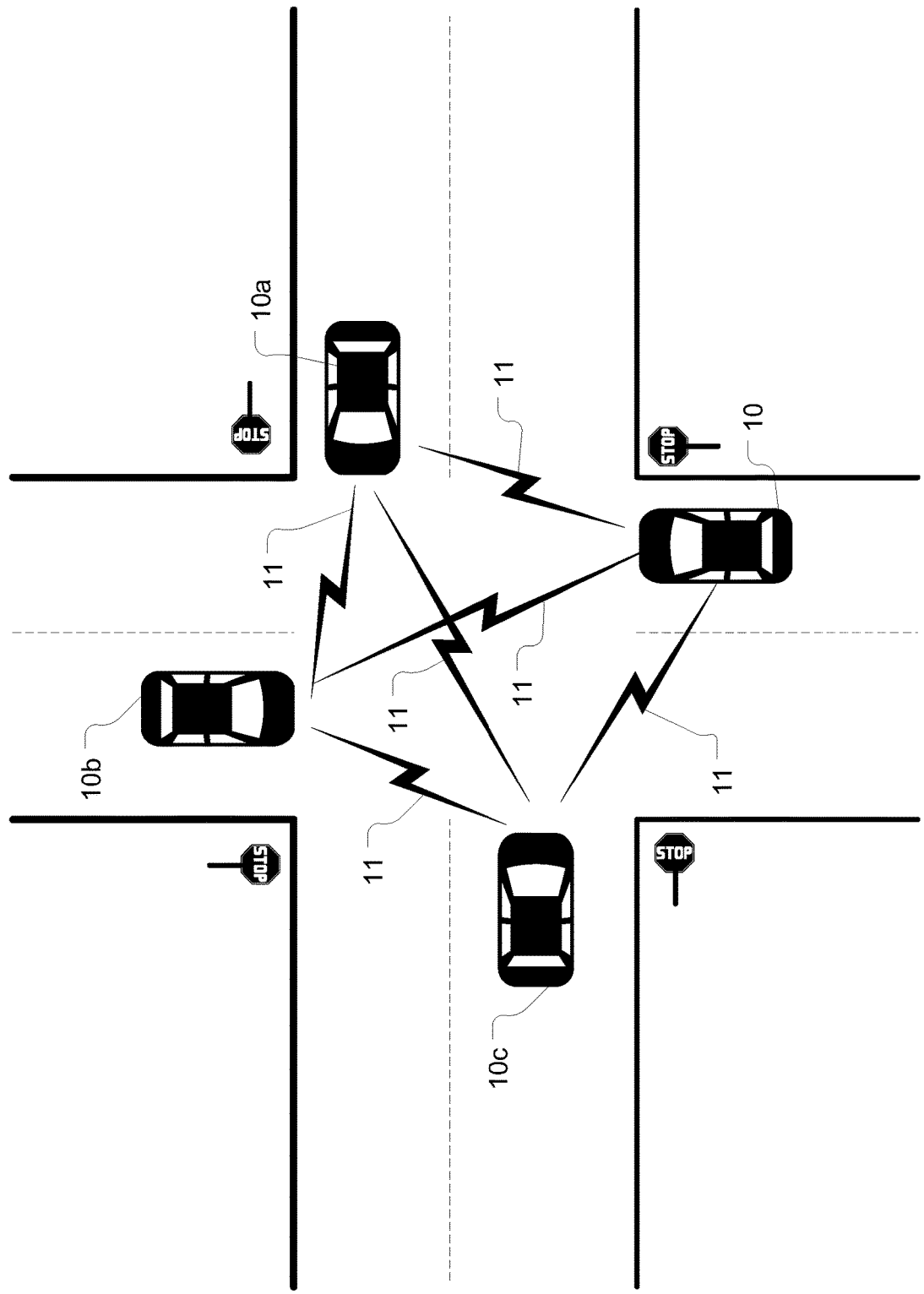
FIG. 20 is an example of V2V messaging among four autonomous vehicles at or approaching a four-way stop.

FIG. 20 is an example of V2V messaging among four autonomous vehicles 10, 10*b*, 10*c* at, or approaching, a four-way stop. In this scenario, V2V messages 11 may be exchanged between each pair or combination of vehicles. For example, a first vehicle 10 communicates with a second vehicle 10*a*, a third vehicle 10*b* and a fourth vehicle 10*c*. Concurrently, or at least substantially overlapping in time, the second vehicle communicates with the first, third and fourth vehicles while the third vehicle 10*b* communicates with the first, second and fourth vehicles and the fourth vehicle communicates with the first, second and third vehicles. The offers and acceptances may be conditional on the collateral offers and acceptances made with other vehicles at the intersection. The vehicles thus negotiate their respective traffic priorities automatically (without user intervention). The vehicles negotiate the amounts to be paid for the priorities and then complete the transactions.

Figure 21:
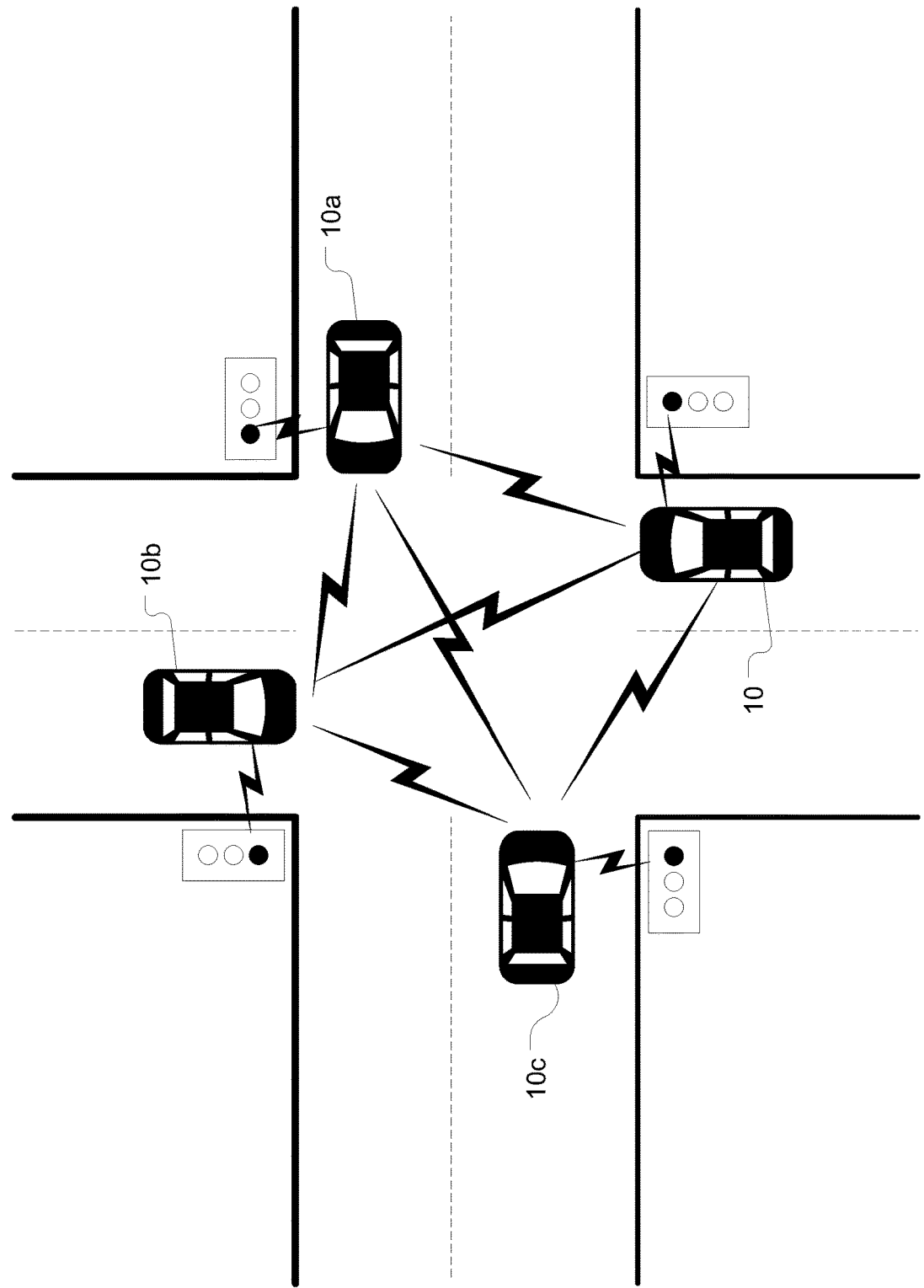
FIG. 21 is an example of V2V messaging among four autonomous vehicles at or approaching an intersection with traffic lights in which the vehicles are further configured to send signals that interact with the timing of the traffic lights.

FIG. 21 is an example of V2V messaging among four autonomous vehicles 10, 10*b* and 10*c* at, or approaching, an intersection with traffic lights in which the vehicles are further configured to send signals that interact with the timing of the traffic lights. In this scenario, it is assumed that the traffic lights are intelligent traffic lights capable of receiving wireless signals from nearby vehicles and to adapt the timing of their lights in response to the signals from the vehicles. For example, an intelligent traffic light reacts to one or more requests from nearby vehicles to switch from a red light to a green light. Using V2V messaging, the autonomous vehicles automatically negotiate priorities for the vehicles at the intersection and then transfer payments to complete the transactions. Once the transactions are completed, the autonomous vehicles signal the intelligent traffic light to change. In another scenario, the traffic lights are conventional (as opposed to intelligent) traffic lights. The vehicles at or nearing the traffic lights can negotiate precedence to make a right turn on a red light with vehicles traveling on the crossing road onto which the red turn is being made.

Figure 22:
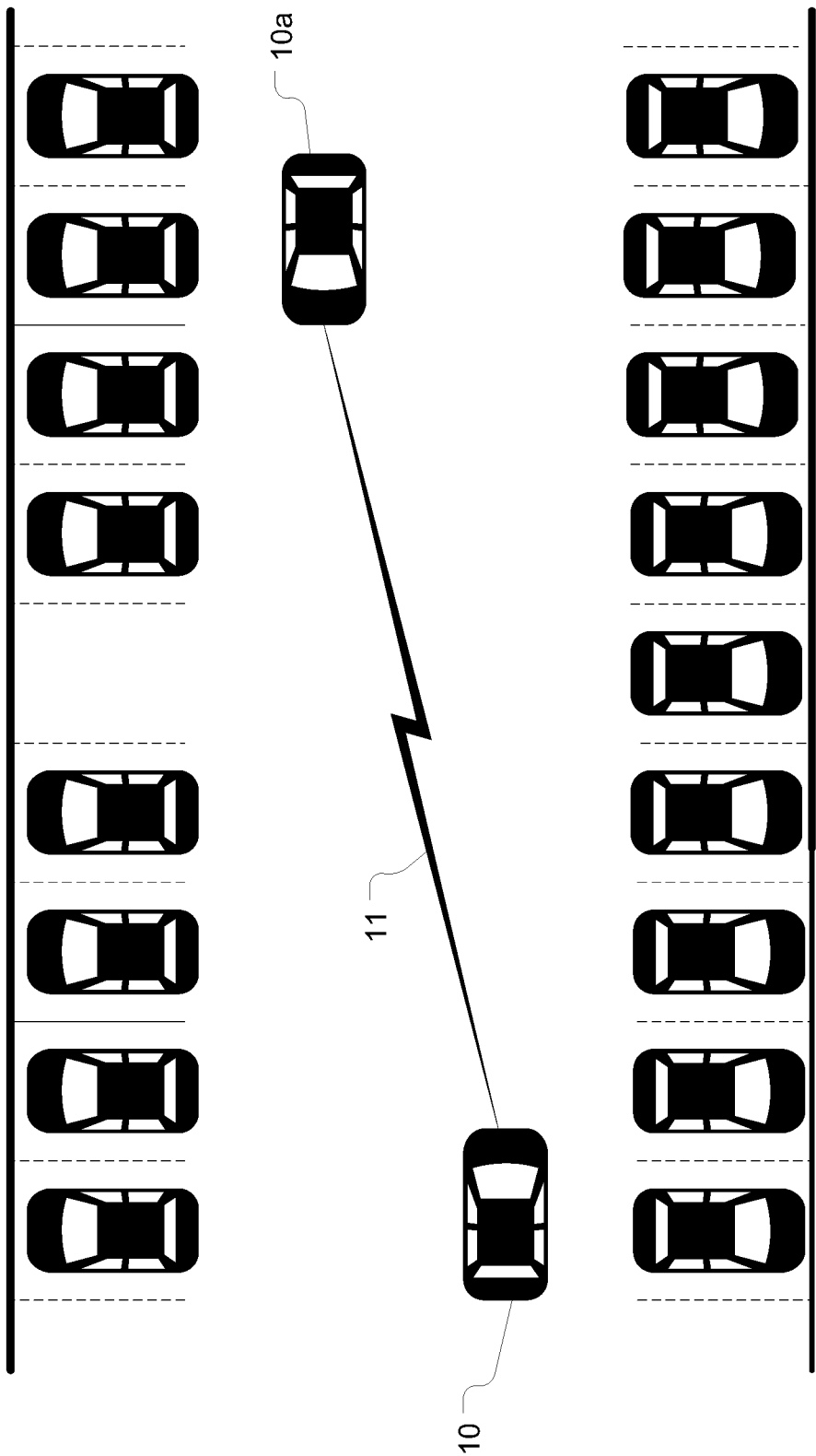
FIG. 22 is an example of V2V messaging between two autonomous vehicles that are approaching a common parking place.

FIG. 22 is an example of V2V messaging between two autonomous vehicles that are approaching a common parking place. In this example, the requesting vehicle 10 communicates via V2V messages 11 with the receiving vehicle 10a to request precedence over the receiving vehicle in relation to the parking spot, i.e. to let the requesting vehicle take the last remaining parking spot. Detecting the parking spot may be done using a camera onboard the requesting vehicle or other means.

Figure 23:
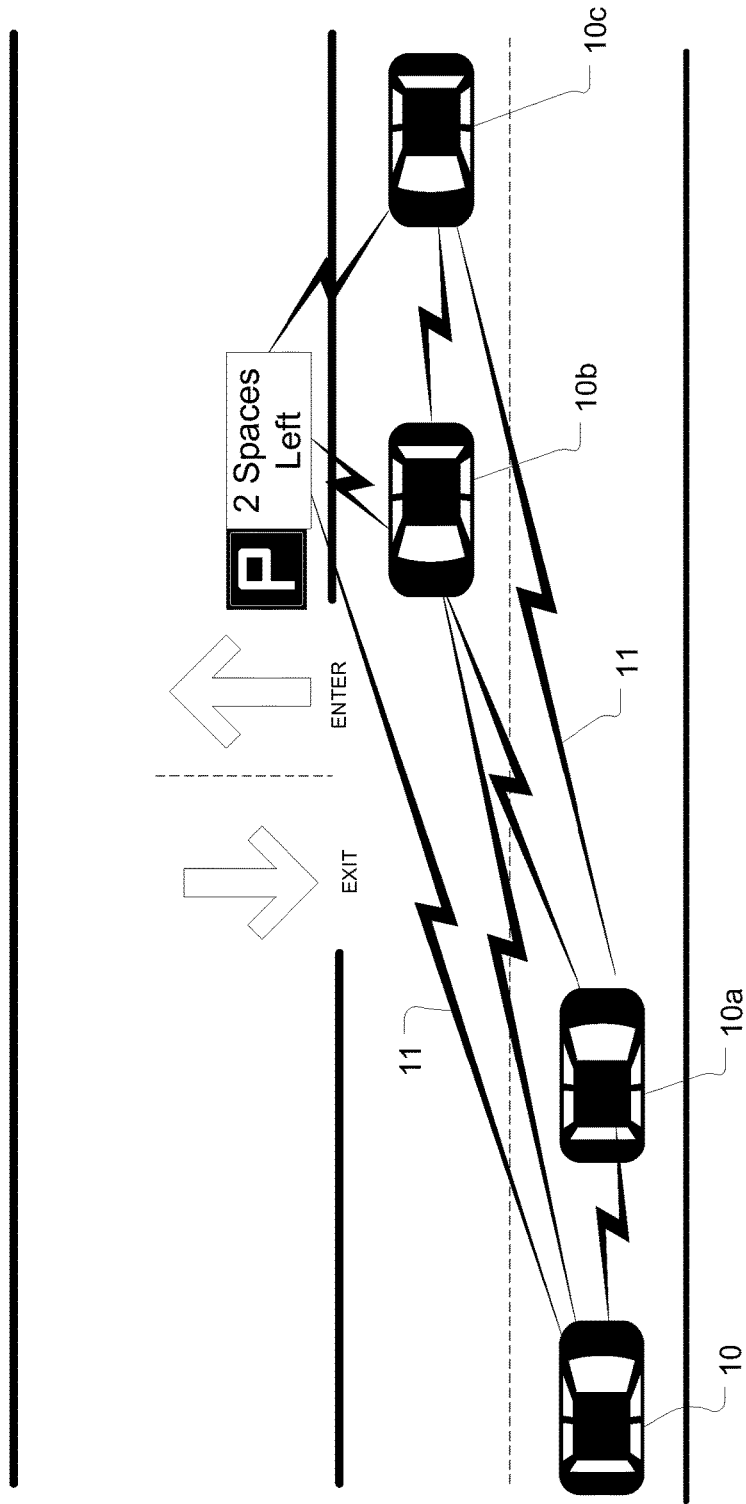
FIG. 23 is an example of V2V messaging amongst multiple autonomous vehicles that are approaching a parking lot with limited spaces available.

FIG. 23 is an example of V2V messaging amongst multiple autonomous vehicles that are approaching a parking lot with limited spaces available. In this example, four autonomous vehicles 10, 10a, 10b, 10c exchange V2V messages 11 amongst each other to negotiate precedence (priority access) to the parking lot. The requesting vehicles transmit offers and receive acceptances, rejections or counteroffers from the receiving vehicles. The offers, acceptances, rejections and counteroffers are, in most embodiments, automatically generated and transmitted based on predetermined user settings, e.g. priority levels set by the user. The priority levels may be set based on time and/or location, e.g. per day, per hour, per route, per event type, for cities, neighbourhoods, points of interest, places, types of places, for user-defined areas or for any other definable locations. The priority levels may also have default settings that the user programs for the vehicle.

Figure 24:
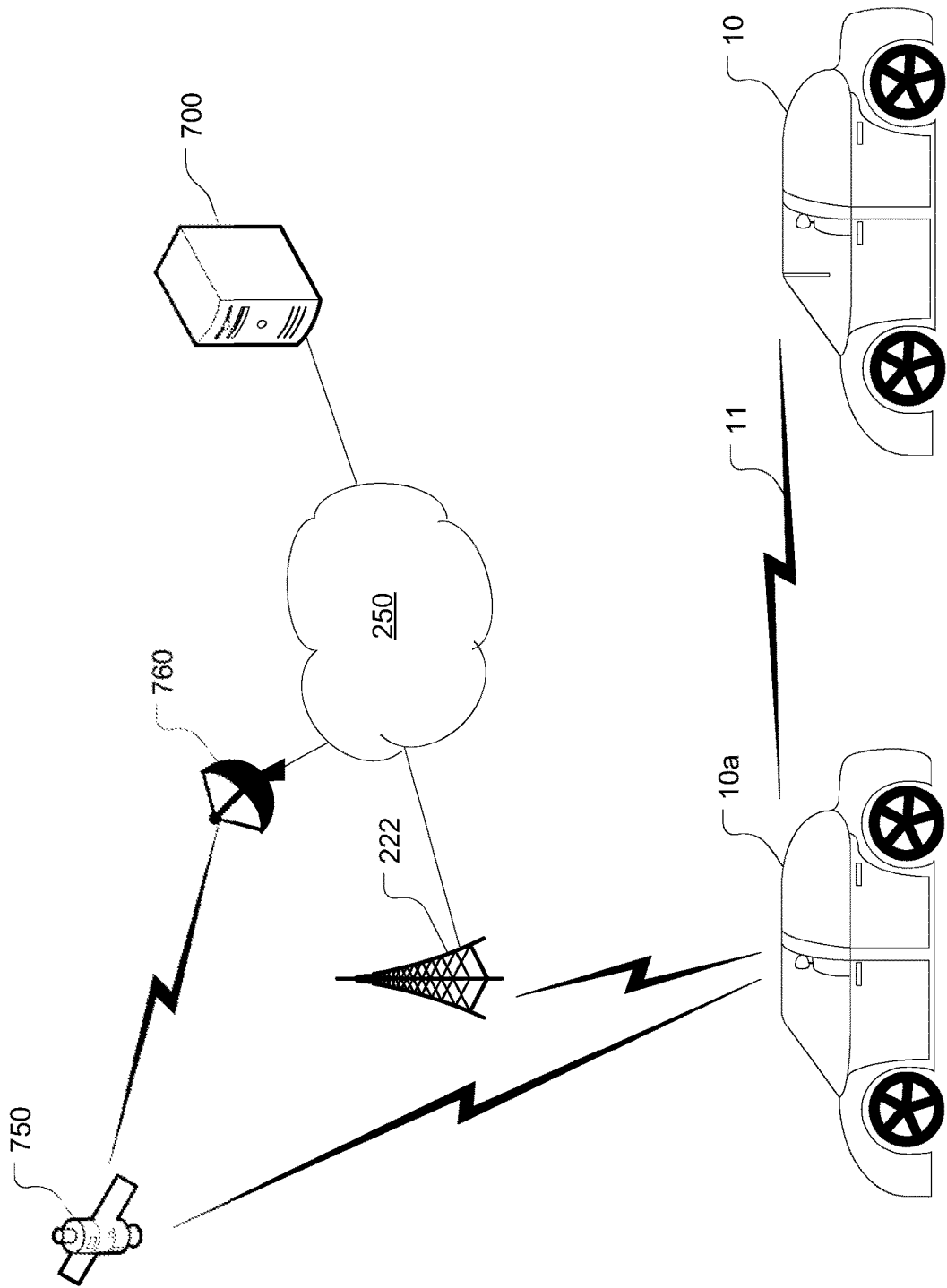
FIG. 24 is an example of an autonomous vehicle using another vehicle as a wireless hotspot in exchange for traffic reprioritization.

FIG. 24 is an example of a first autonomous vehicle 10 wirelessly tethered to a second autonomous vehicle 10a and using the second autonomous vehicle 10a as a wireless hotspot (or as a router or relay) in exchange for traffic reprioritization. In this example scenario, the second vehicle 10a has already passed the first vehicle 10 and, in exchange for being allowed to pass, the second vehicle 10a offers to the first vehicle 10 a wireless data connection to the second vehicle 10a for the limited time when the two vehicles are within wireless range of each other. The download may be is limited in time and/or in data size and/or bandwidth. The first vehicle 10 may download digital content (music, movies, or other digital content) via the second vehicle's cellular or satellite connection. In the system shown in FIG. 24, the digital content is downloaded from a digital content server 700 connected by a network device to the internet 250. The first vehicle can communicate with the server 700 by a cellular connection via the base stations transceiver 222 or by a satellite connection via a satellite 750 and ground station 760 connected to the internet 250.

Figure 25:
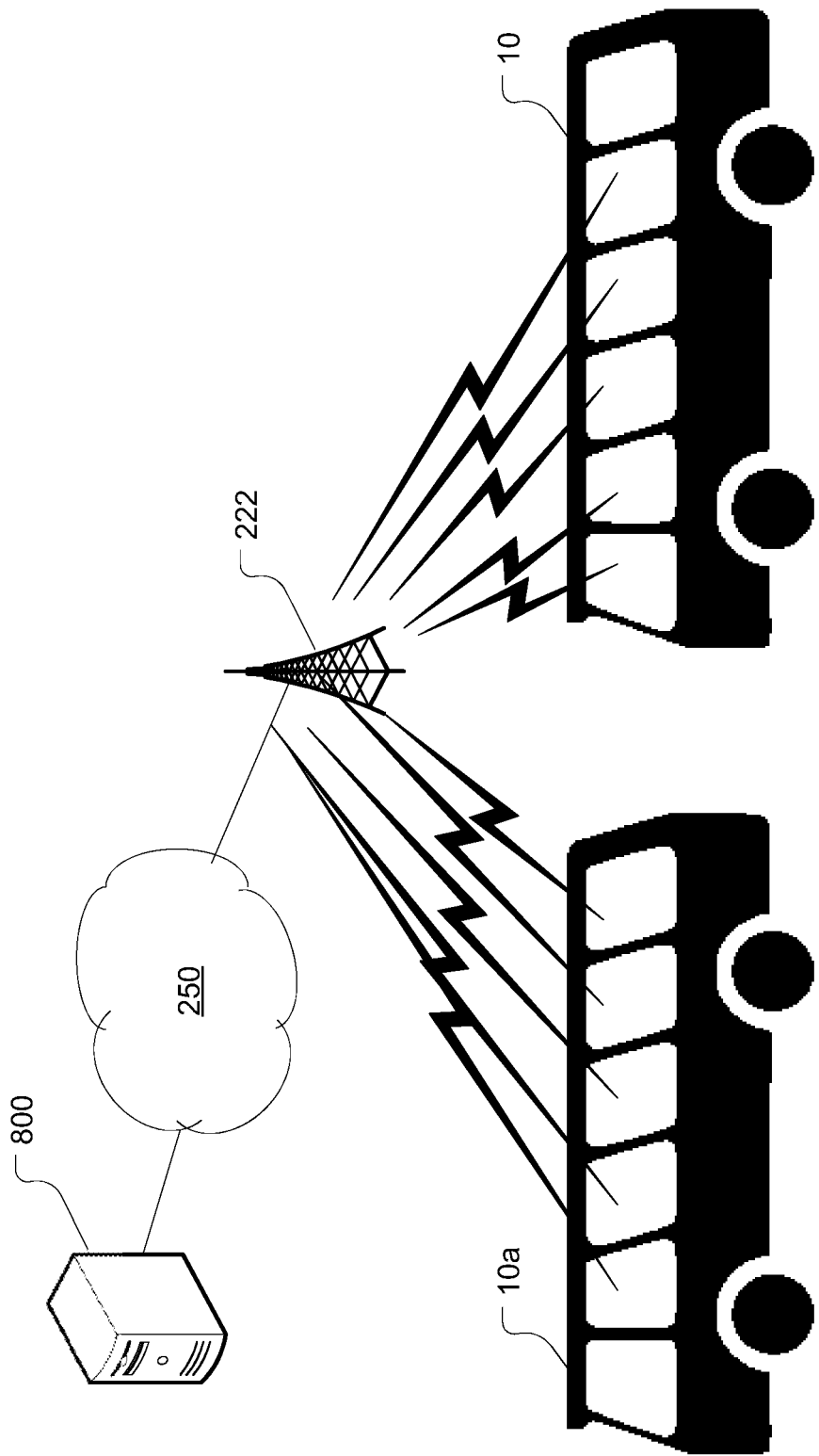
FIG. 25 is an example of multiple users riding a first autonomous bus providing an aggregated request to multiple users riding a second autonomous bus.

FIG. 25 is an example of multiple users (e.g. a first set of passengers) riding a first autonomous bus 10 providing an aggregated request to multiple users (e.g. a second set of passengers) riding a second autonomous bus 10a. In this case, the first set of passengers send individual requests via personal wireless communications device or mobile handheld devices (smart phones, cell phones, tablets, laptops, etc.) to a group request server 800 via a base station transceiver 222. The group request server is configured to sum, combine or aggregate these individual requests into a group request which is then conveyed to the second autonomous bus for broadcasting to the passengers or conveyed directly to the passengers on the second autonomous bus. The monetary value of the group request is divided equally and offered to each of the second set of passengers via their respective mobile devices. If the majority of the second set of passengers accept the offer, the first and second buses are reprioritized. In a variant, reprioritization of the buses occurs only by two-thirds majority or by another prescribed proportion. Alternatively, reprioritization can occur only if acceptance of the offer is unanimous. In another embodiment, the first bus may automatically negotiate with the second bus (without any intervention by the riders or passengers).

Figure 26:
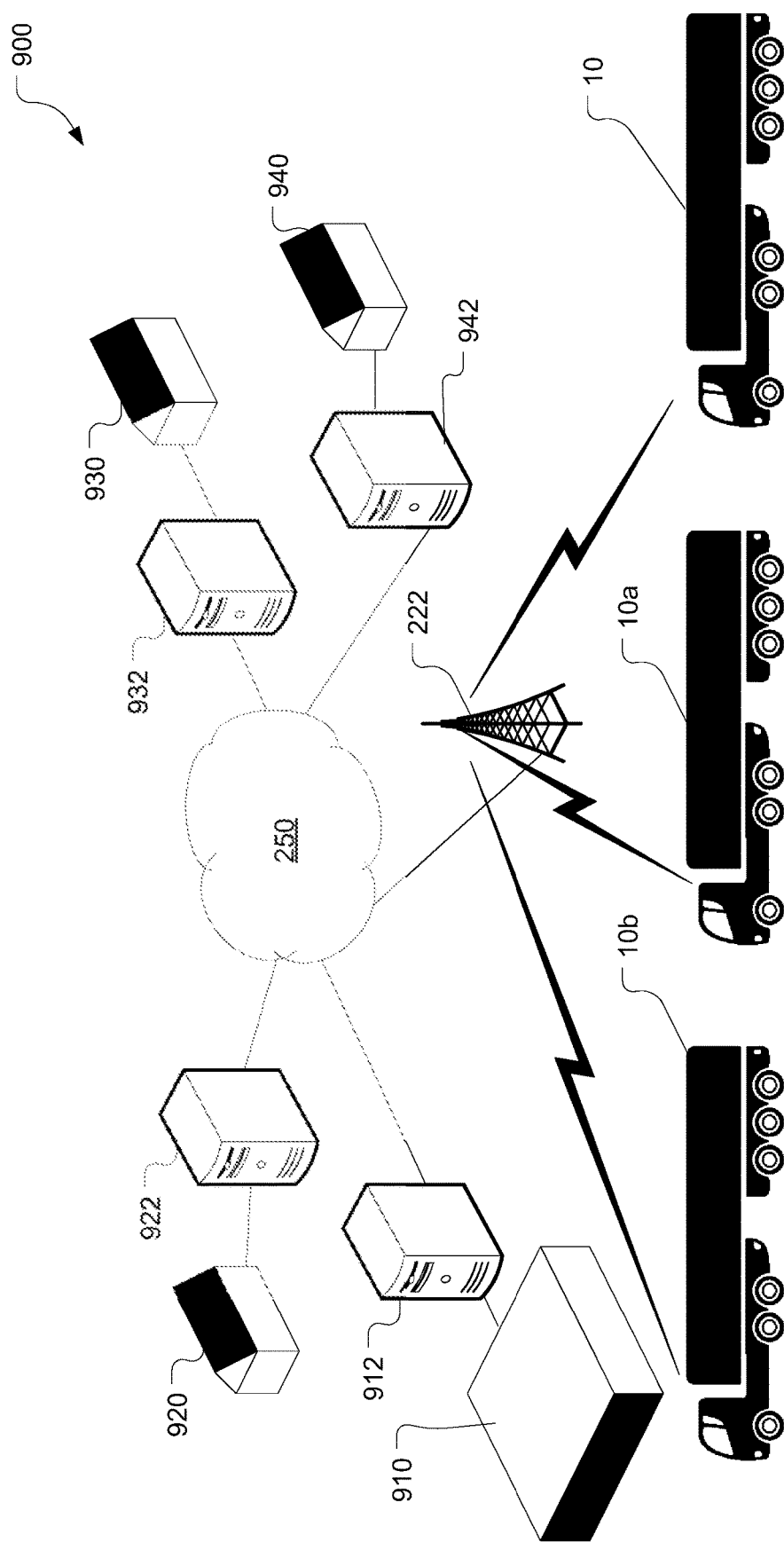
FIG. 26 is an example of a truck delivery system in which three suppliers of goods automatically negotiate amongst each other, for example using artificial intelligence, to determine automatic payments to be made amongst the suppliers to prioritize the access of their respective autonomous trucks to a loading dock of a warehouse or store.

FIG. 26 is an example of a truck delivery system 900 in which three suppliers of goods automatically negotiate amongst each other, for example using algorithms, programmed rules or artificial intelligence, to determine automatic payments to be made amongst the suppliers to prioritize the access of their respective autonomous trucks (transport trucks, cargo vans, etc.) to a loading dock of a warehouse or store 910. In the system 900 depicted in FIG. 26, a first factory/distributor/supplier 920 receives via a first supply management server 922 an order request from a stock management server 912 of the store 910 indicating that more goods are needed to replenish dwindling or empty stocks. The first supply management server 922 communicates automatically with a second supply management server 932 operated by a second factory/distributor/supplier 930 and optionally also with a third supply management server 942 operated by a third factory/distributor/supplier 940 to automatically negotiate reprioritization of first, second and third autonomous trucks 10, 10a, 10b en route to the store. In this example, the first truck 10 transports goods of the first factory/distributor/supplier 920, the second truck 10a transports goods of the second factory/distributor/supplier 930, and the third truck 10b transports goods of the third factory/distributor/supplier 940. The servers 922, 932, 942 of the three factory/distributor/suppliers 920, 930, 940 are configured to negotiate automatically amongst each other, using algorithms, rules and/or AI, a payment or payments to reprioritize the truck delivery times. Once a reprioritization transaction has been completed, the autonomous trucks 10, 10a, 10b are then signalled by the servers 922, 932 and 942 and reprioritized. Upon receipt of the signals, the trucks may perform their reprioritization manoeuvres or they may first communicate their intended actions to the other trucks and/or other vehicles in the vicinity prior to effecting the reprioritization action or manoeuvre.

Figure 27:
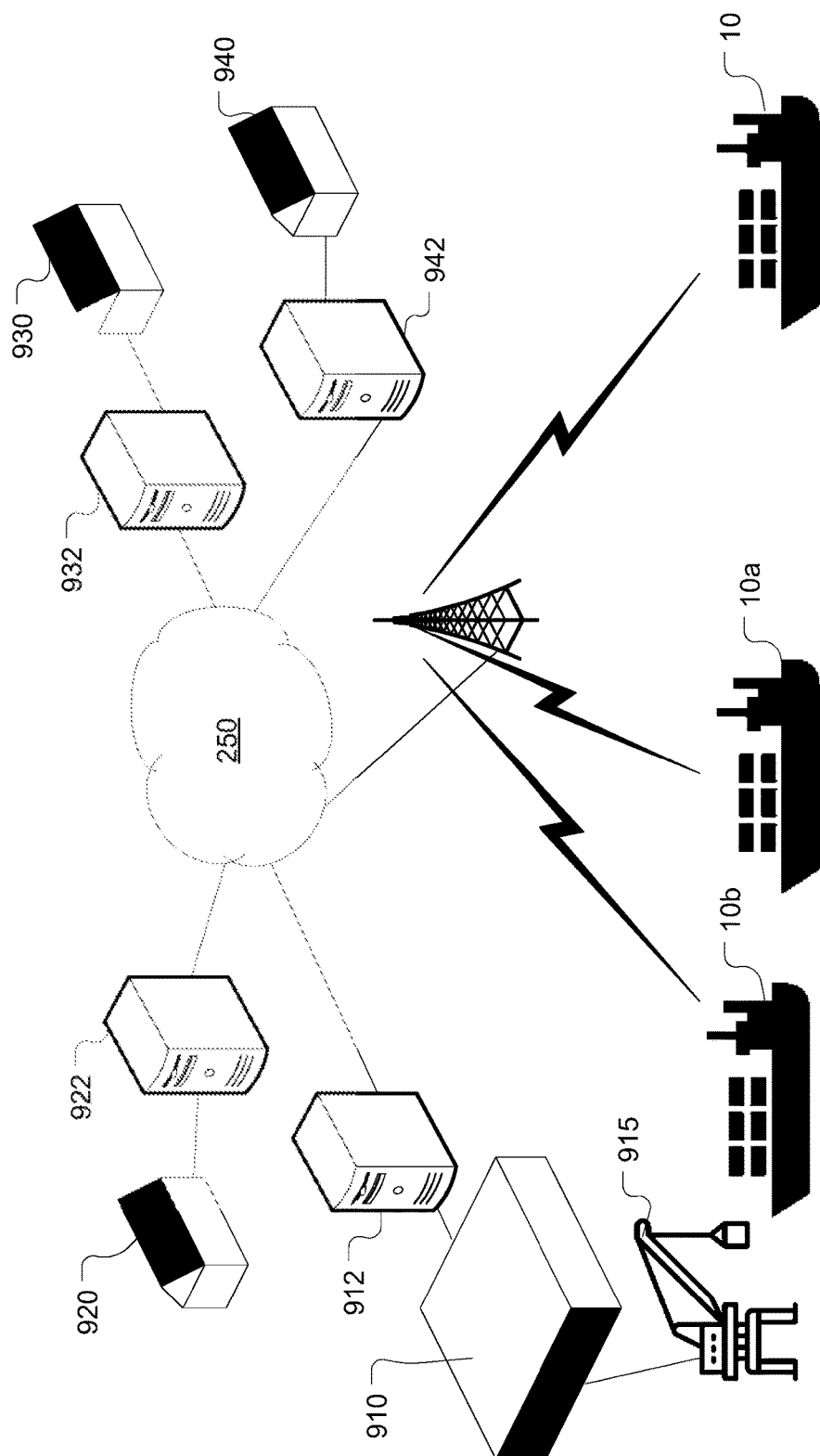
FIG. 27 is an example of a ship delivery system in which three suppliers of goods automatically negotiate amongst each other, for example using artificial intelligence, to determine automatic payments to be made amongst the suppliers to prioritize the access of their respective autonomous ships to a dockside crane or berth.

FIG. 27 is an example of a ship delivery system 900 (analogous to the truck delivery system) in which three suppliers of goods, containers or other cargo automatically negotiate amongst each other, for example using algorithms, rules and/or artificial intelligence, to determine automatic payments to be made amongst the suppliers to prioritize the access of their respective autonomous ships to a dockside crane 915 or quayside berth in a harbour or port. In the example system of FIG. 27, the first ship 10 transports goods of the first factory/distributor/supplier 920, the second ship 10a transports goods of the second factory/distributor/supplier 930, and the third ship 10b transports goods of the third factory/distributor/supplier 940. The respective servers 922, 932, 942 of the three factory/distributor/suppliers 920, 930, 940 are configured to negotiate automatically amongst each other via data messages through the internet 250 to pay to be granted priority access to the crane 915 or berth. Once the transaction is complete, the ships are notified by the servers and they are reprioritized accordingly.

Figure 28:
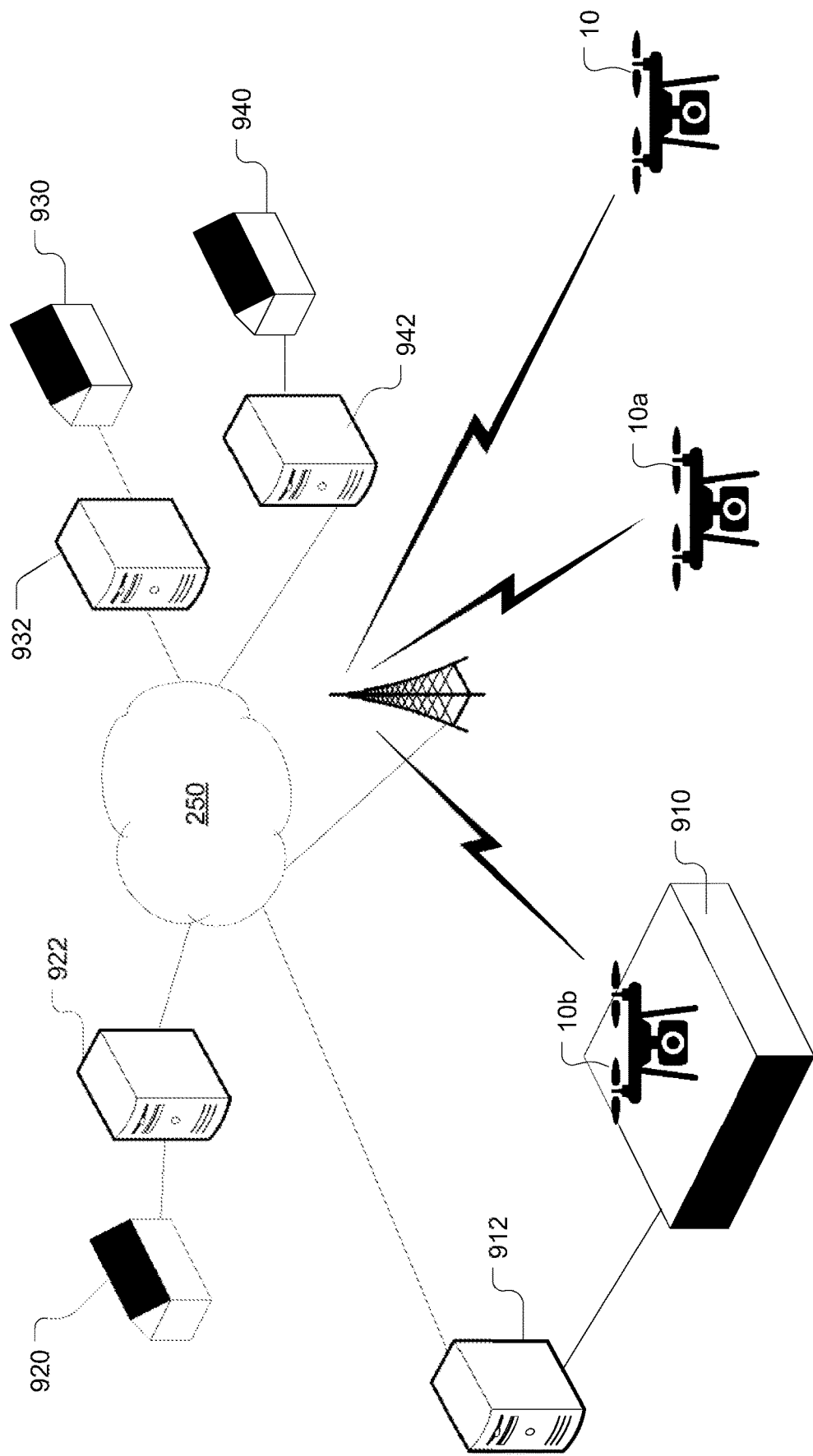
FIG. 28 is an example of a drone delivery system in which three suppliers of goods automatically negotiate amongst each other, for example using artificial intelligence, to determine automatic payments to be made amongst the suppliers to prioritize the access of their respective drones to a landing pad.

FIG. 28 is an example of a drone delivery system 900 analogous to the truck delivery system and the ship delivery system in which three suppliers of goods (i.e. 920, 930, 940) automatically negotiate amongst each other, for example using algorithms, rules and/or artificial intelligence, to determine automatic payments to be made amongst the suppliers 920, 930, 940 to prioritize the access of their respective drones 10, 10a, 10b to a landing pad or other designated landing area. In one use case, the drones deliver goods to a store 910 having a landing pad. In another use case, the drones 10, 10*a*, 10*b* deliver goods to a house, residence, apartment building, condominium complex, gated community, resort, cottage, sports facility, restaurant, café or other business, etc. which has a landing pad or designated landing zone. In yet another use case, there is no designated landing pad or landing zone but the drones recognize that there is limited landing space and thus negotiate access to the limited landing space as if it were a landing pad or designated landing zone. Analogous to the preceding examples with the trucks and ships, the drone delivery system communicate reprioritization signals to the drones 10, 10*a*, 10*b* to cause them to stagger in time their arrivals at the store 910 or other delivery site. The drones that are delayed may hover nearby or be rerouted to make other deliveries, or may land nearby to await their turn. In another implementation, one drone that is granted precedence may provide a charge to another drone as a form of payment.

FIG. 29 is an example of user-configurable priority settings for different times of day that determine logic for how the vehicle automatically makes offers or accepts offers from other vehicles. In these exemplary settings, there are five levels of priority: very high, high, medium (normal), low and very low. Very high means that the user wishes to pay a significant amount to get prioritized treatment. High means that the user wishes to pay a modest amount to get prioritized treatment. Medium/normal means that the user does not wish to pay or be paid for any reprioritization. Low priority signifies that the user is willing to be paid a modest amount to give traffic priority to another vehicle. Very low priority signifies that the user requires to be paid a significant amount to give traffic priority to another vehicle. In the case of qualitative settings such as these, there would be a quantitative association table to indicate numerically what each priority level means in terms of pricing. In this example, the five timeslots are morning rush hour, evening rush hour, weekend daytime, weekend night time, and holidays. Other timeslots may be used. In one implementation, the timeslots may be user-defined by selecting from various menus of options to customize the timeslots that are most pertinent to the user.

FIG. 30 is an example of a user-configurable multipliers for setting prices for various types of traffic manoeuvres. In the example of FIG. 30, the vehicle setting enables the user to specify a multiplier (in this case expressed as a percentage, either positive or negative) that is multiplied by the current price to determine what the vehicle is willing to offer or accept. A multiplier of +100% means that the vehicle is programmed to offer market price. A multiplier of −100% means the vehicle is programmed to accept market price. A multiplier of +150% means that the vehicle is programmed to make an offer (or accept a counteroffer) equal to 1.5 times the market price. A multiplier of −150% means that the vehicle is programmed to only accept an offer equal or greater to 1.5 times the market price. The market price may be determined by historical data for a given place and time. The user-configurable parameters are provided for different traffic manoeuvres or events. In this exemplary database, the traffic events are city passing, highway passing, prioritizing who goes first at a stop sign, prioritizing who gets a parking place, and merging into traffic (e.g. entering a highway from an onramp, changing lanes, etc.). These five are presented solely as an example. Fourteen time slots (for each day of the week both morning and afternoon) are presented in this example; however, it will be understood that this may be divided into any other suitable set of time slots, e.g. hourly.

In another inventive aspect, which uses one or more inventive concepts disclosed above, the offer to pay for a traffic prioritization is sent by a mobile communication device of a first user riding in a self-driving vehicle to a second mobile communication device of a second user riding in a second vehicle. This may be accomplished by sending the offer message from the mobile communication device to a mobile communication interface of the self-driving vehicle which is communicatively connected to a vehicle-to-vehicle (V2V) data transceiver that, in turn, transmits the offer message to the second vehicle which communicates the offer message to the second mobile communication device via a second mobile communication interface of the second vehicle. The mobile communication device may be communicatively connected to (e.g. paired with) a mobile communication interface of the vehicle using a short-range wireless or wired communication protocol, e.g. Bluetooth® interface, USB, or other. In this aspect, a user riding in the self-driving vehicle may pay a second user riding in a second vehicle to be given priority in traffic by communicating with the second user via vehicle-connected mobile communication devices, e.g. cell phone, smart phone, tablet, laptop, smart watch, wearable communication device, or any other wireless communication device or handheld personal electronic device.

Figure 31:
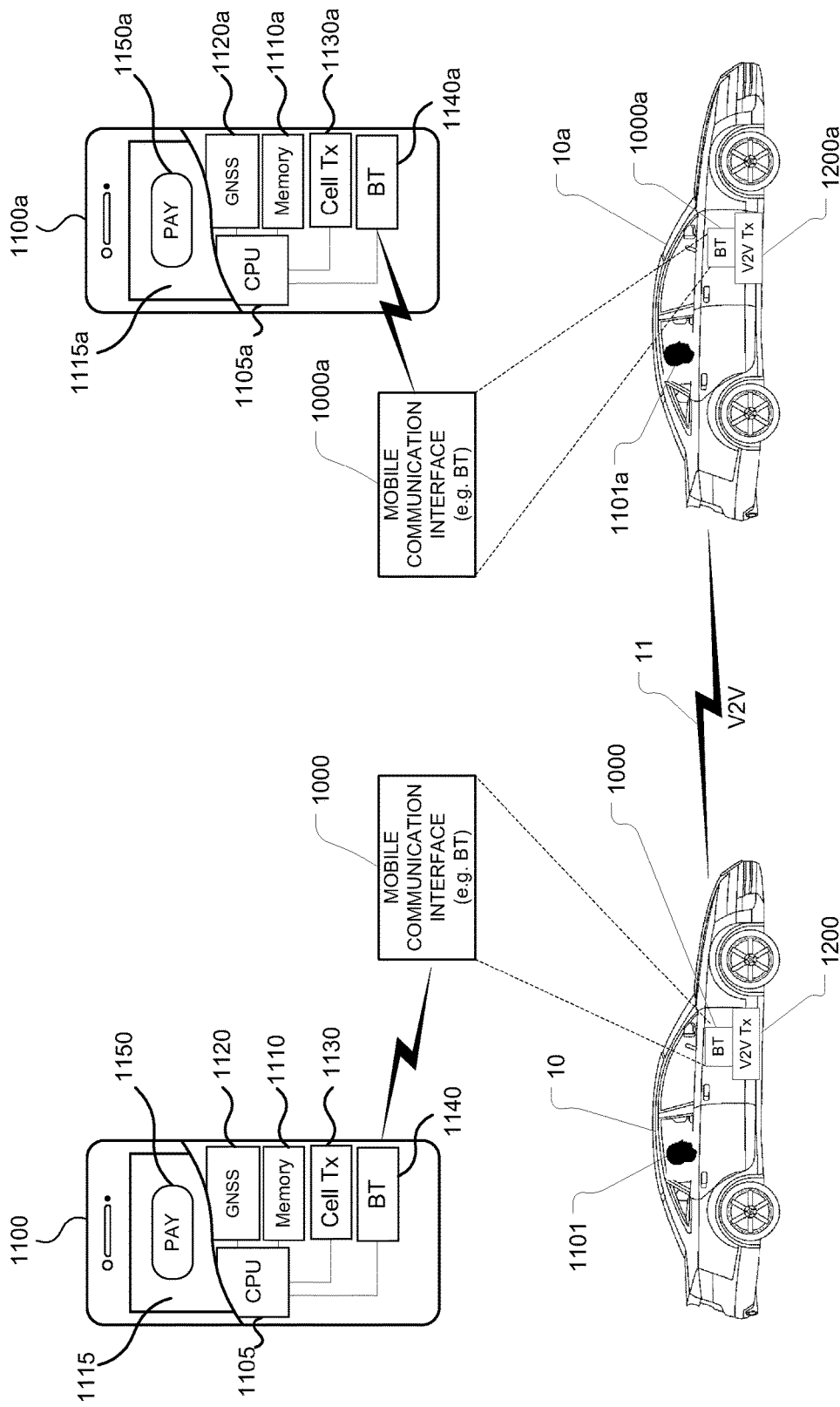
FIG. 31 depicts a mobile payment system in which a first user riding in a first self-driving vehicle uses a first mobile communication device to send a payment to a second mobile communication device of a second user riding in a second self-driving vehicle.

In the embodiment depicted in FIG. 31, a self-driving vehicle 10 includes (as described above) a vehicle chassis, a motor supported by the chassis for providing propulsive power for the vehicle, a braking system, a steering system, a plurality of sensors, a processor configured to receive signals from the sensors and to generate steering, acceleration and braking control signals for controlling the steering system, the motor and the braking system of the vehicle, and a Global Navigation Satellite System (GNSS) receiver for receiving satellite signals and for determining a current location of the self-driving vehicle. In the embodiment of FIG. 31, the self-driving vehicle 10 includes a mobile communication interface 1000 communicatively connected to a first mobile communication device 1100 of a first user 1101 riding in the self-driving vehicle 10. mobile communication device 1100 may be a smart phone, cell phone, tablet, smart watch, wearable smart device, laptop or another other personal electronic device that has data communication capability. The mobile communication interface 1100 receives from the first mobile communication device 1100 an offer message from the first user 1101 to pay for a traffic prioritization relative to a second self-driving vehicle 10*a*. The first mobile communication device 1100 includes, in this illustrated embodiment, a mobile device processor or central processing unit (CPU) 1105, a mobile device memory 1110, a mobile device display screen 1115 (e.g. a touch-sensitive display), a mobile device GNSS chip 1120, a mobile device cellular transceiver 1130, and a mobile device data interface 1140, e.g. a Bluetooth® interface or other wireless or wired data interface for communicating with the mobile communication interface 1100 of the vehicle 10. The mobile device display screen 1115 cooperates with the CPU 1105 to display a user interface enabling the user 1101 to send an offer message to pay a second user in a second vehicle for a traffic prioritization. The user may send the offer message by touching a user interface element 1150 ("Pay") on the display screen 1115 or by issuing a verbal command that a speech-recognition module of the mobile communication device is able to recognize.

The self-driving vehicle 10 includes a vehicle-to-vehicle data transceiver 1200 communicatively connected to the (first) mobile communication interface 1000 that receives the offer message and then transmits, relays or forwards the offer message to a second vehicle-to-vehicle data transceiver 1200*a* of a second self-driving vehicle 10*a* to be relayed via a second mobile communication interface 1000*a* to a second mobile communication device 1100*a* of a second user 1101*a* riding in the second self-driving vehicle 10*a*. The mobile communication interface 1000 of the first vehicle 10 receives, via the vehicle-to-vehicle data transceiver 1200, a reply message from the second mobile communication device 1100*a* and transmits the reply message to the first mobile communication device 1100 to cause the first mobile communication device 1100 to make a payment from a first account of the first user 1101 to a second account of the second user 1101*a* to obtain the traffic prioritization relative to the second self-driving vehicle 10*a*. The mobile communication interface 1000 receives a payment message from the first mobile communication device 1100 and transmits, via the vehicle-to-vehicle data transceiver 1200, the payment message to the second mobile communication device 1100*a* to confirm that the payment has been being made. As depicted in FIG. 31, the second mobile communication device 1100*a* is similar to the first mobile communication device although it will be appreciated that the second mobile communication device may be a different type of mobile communication device such as a tablet, smart watch, etc. In the embodiment of FIG. 31, the second mobile communication device 1100*a* includes a mobile device processor or central processing unit (CPU) 1105*a*, a mobile device memory 1110*a*, a mobile device display screen 1115*a* (e.g. a touch-sensitive display), a mobile device GNSS chip 1120*a*, a mobile device cellular transceiver 1130*a*, and a mobile device data interface 1140*a*, e.g. a Bluetooth® interface or other wireless or wired data interface for communicating with the mobile communication interface 1100*a* of the vehicle 10*a*. The mobile device display screen 1115*a* cooperates with the CPU 1105*a* to display a user interface enabling the user 1101*a* to send an offer message to pay a second user in a second vehicle for a traffic prioritization. The user may send the offer message by touching a user interface element 1150*a* ("Pay") on the display screen 1115*a* or by issuing a verbal command that a speech-recognition module of the mobile communication device is able to recognize.

In one embodiment, the V2V data transceiver 1200 of the first vehicle 10 and the mobile communication interface 1000 of the first vehicle 10 receive a counteroffer from the second mobile communication device 1100*a* (sent via the second vehicle 10*a*, i.e. via the mobile communication interface 1000*a* and the V2V data transceiver 1200*a* of the second vehicle 10*a*).

The mobile communication interface 1000 of the first vehicle 10 relays the counteroffer from the second user 1101*a* to the first mobile communication device 1100 to accept or reject the counteroffer. The first mobile communication device 1100 is configured to either present the counteroffer to the user 1101 and receive user input from the user 1101 to accept or reject the counteroffer or to automatically accept or reject the counteroffer based on a user setting or preference stored in the memory 1110 of the mobile communication device 1100.

In one specific implementation, the mobile communication interface 1000 is a Bluetooth® interface and the vehicle-to-vehicle data transceiver 1200 is a dedicated vehicle-to-vehicle short-range communications (DSRC) transceiver operating in a 5.7-5.9 GHz band. The mobile communication interface 1000 may be another short-range wireless protocol (Wi-Fi, Zigbee, etc.) or a wired communication link, e.g. USB connection. Other communication protocols and frequencies may be used.

Figure 32:
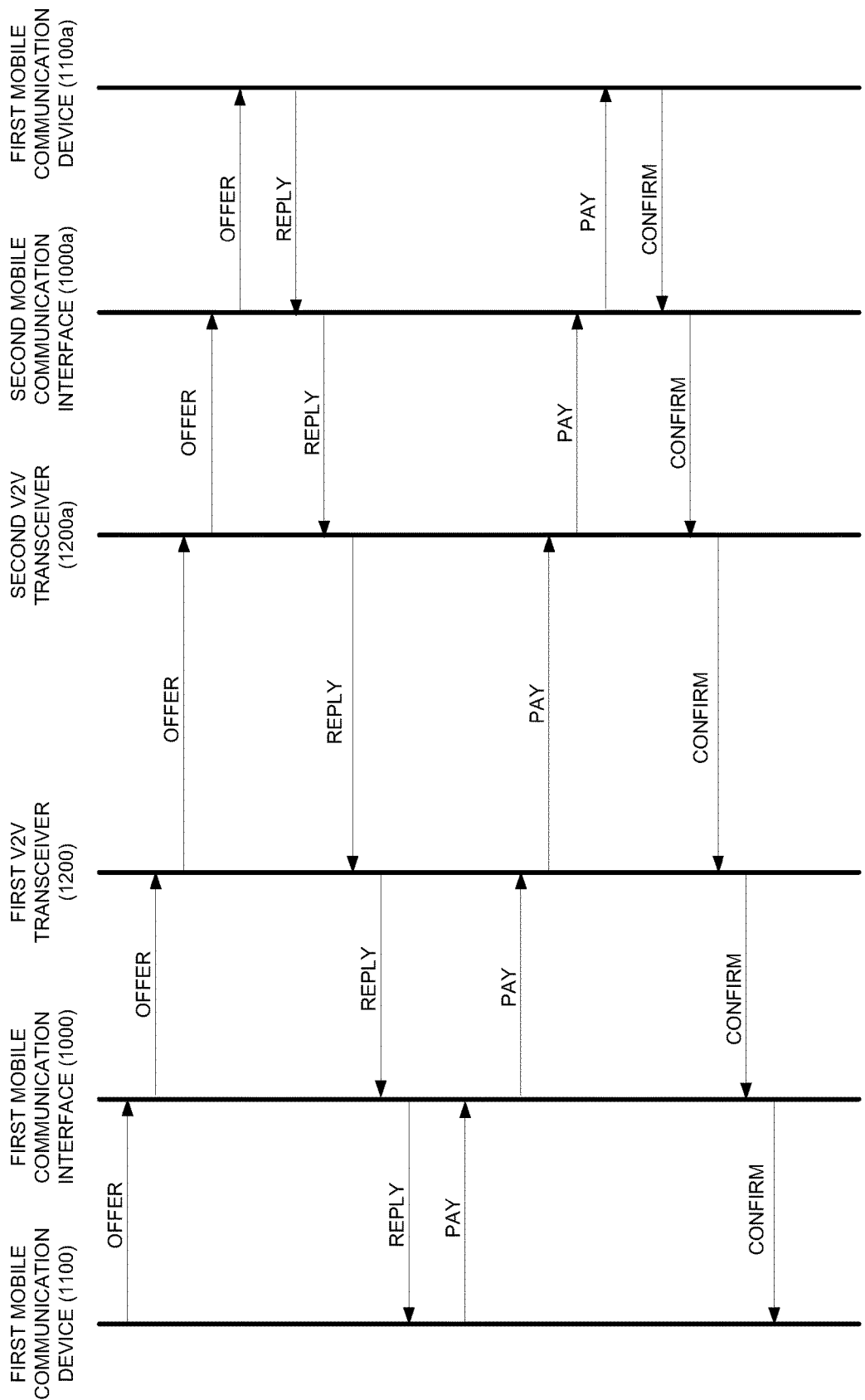
FIG. 32 is a data flow showing messaging for transferring a payment from a first mobile communication device to a second mobile communication device to reprioritize their relative traffic positions.
Figure 33:
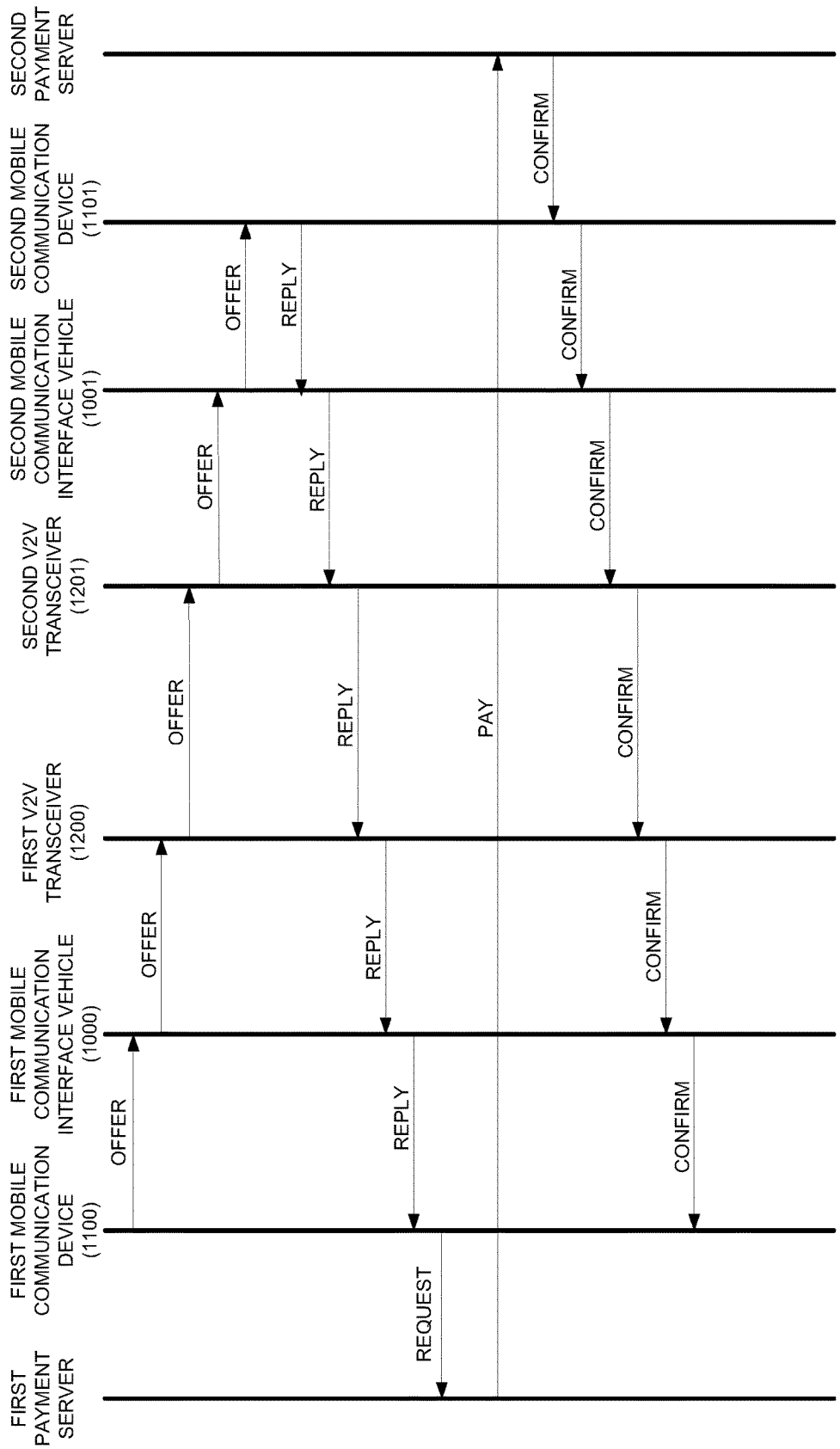
FIG. 33 is another data flow showing messaging for transferring a payment between first and second payment servers when the first user of the first mobile communication device pays the second user of the second mobile communication devices to reprioritize their relative traffic positions.

Reference is now made to FIGS. 32 and 33 which depict messaging data flows for two example embodiments of the mobile payment system described above. These examples show how a first user riding in a first self-driving vehicle can offer to pay a second user riding in a second self-driving vehicle for a traffic prioritization and then how the second user can accept or reject this offer and finally how the first can then pay the second user if the offer is accepted. In one embodiment, as shown by way of example in FIG. 32, the first mobile communication device 1100 sends an offer message to the first mobile communication interface 1000 of the first vehicle. The first mobile communication interface is connected to a communication hub or router in the first vehicle that routes, forwards, or relays the offer message to the V2V data transceiver 1200. At the hub, the offer message may be decoded and then re-encoded in another format to be sent to the V2V data transceiver. The V2V data transceiver 1200 of the first vehicle 10 transmits the offer message to the V2V data transceiver 1200*a* of the second vehicle via a standard V2V message. The transmission may involve an initial connection request and handshake to establish V2V communication between the vehicles. Alternatively, there may already be a V2V communication link established between the vehicles. At the second vehicle, the V2V transceiver 1200*a* sends the offer message to its own communication hub in the second vehicle 10*a* where the message is decoded and re-encoded or routed/forwarded to the mobile communication interface 1000*a* of the second vehicle 10*a*. The mobile communication interface 1000*a*, which is paired otherwise communicatively connected to the second mobile communication device 1100*a*, then communicates the offer message to the second mobile communication device 1100*a*. The user 1101*a* of the second mobile communication device 1100*a* is notified of the offer (using any visual, audible or vibratory notification). The offer may have a time limit after which the offer expires. The offer may be revocable. The second user 1101*a* accepts or rejects the offer contained in the offer message. The user 1101*a* may alternatively make a counteroffer. In a variant, the second mobile communication device 1100*a* may be configured to automatically accept or reject offers based on user settings or preferences. The second mobile communication device 1100*a* may also be configured to automatically send a counteroffer based on parameters predetermined by the second user.

In this example, for the sake of illustration, it is assumed that the second user 1101*a* accepts the offer from the first user 1101. As further depicted in FIG. 32, the second mobile communication device 1100 sends a reply to the second mobile communication interface 1000*a* which transmits the reply to the V2V data transceiver 1200*a*. The V2V data transceiver 1200*a* of the second vehicle 10*a* transmits the reply to the corresponding V2V data transceiver 1200 of the first vehicle 10. The V2V data transceiver 1200 of the first vehicle 10 sends the reply to the first mobile communication interface 1000 of the first vehicle 10 which then transmits the reply to the first mobile communication device 1100 of the first user. The acceptance or rejection (or counteroffer) may be displayed or audibly presented to the first user. Since in this example, the second user has accepted the offer made by the first user, the first user completes the transaction by paying the second user. This is done in this example by sending a payment message from the first mobile communication device 1100 of the first user 1101 to the second mobile communication device 1100*a* of the second user 1101*a*. The payment message may be a direct payment or instructions, a code, authorization, etc. to obtain the payment, or the payment message may provide confirmation that a payment has been made from a first account associated with the first user to a second account associated with the second user. For the sake of illustration, this figure depicts a payment message being sent directly from the first mobile communication device 1100 to the second mobile communication device 1100a. As shown, the first mobile communication 1100 sends the payment message from the first user 1101 to the first mobile communication interface 1000 which communicates the payment message to the first V2V data transceiver 1200 for transmission of the payment to the second V2V data transceiver 1200a. The second V2V data transceiver 1200a communicates the payment message to the second mobile communication interface 1000a for transmitting to the second mobile communication device 1100a associated with the second user 1101a. Once payment is received, and optionally verified, a confirmation message is sent back from the second mobile communication device 1100a via the second mobile communication interface 1000a and the second V2V data transceiver 1200a. The first V2V data transceiver 1200 receives the confirmation message from the second V2V data transceiver 1200a and transmits this to the first mobile communication interface 1000 for communicating to the first mobile communication device 1100 which optionally notifies the first user 1101 that the payment has been successfully made and that the second vehicle 10a will maneuver, as soon as traffic regulations and surrounding traffic conditions permit, to give priority in traffic to the first vehicle 10.

In the embodiment of FIG. 33, the mobile payment system for traffic prioritization further involves a first payment server (providing, e.g. an electronic interface for a first bank account associated with the first user) and a second payment server (providing, e.g. an electronic interface for a second bank account associated with the second user). In this embodiment, the offer and reply messaging occurs as described above. However, when the first mobile communication device receive the reply accepting the offer, the first mobile communication device sends a request to the first payment server to make a payment from the first account to the second account. The first payment server sends a payment message to the second payment server to make the payment to the second account. This may accomplished using the technologies of U.S. Pat. No. 8,369,828 entitled "Mobile-to-mobile Payment System and Method" or U.S. Pat. No. 8,504,450 entitled "Mobile Remittances/Payments" which are hereby incorporated by reference. The payment may be of any value and may even be a very small amount, i.e. a micropayment. Various types of mobile payment systems may be used for the payment, For example, this is may be a bank-to-bank direct transfer, electronic fund transfer, cloud-based mobile payment (e.g. PayPal), credit card payment, debit card payment, a mobile wallet payment (e.g. Apple Pay, Google Pay, Samsung Pay), SMS/USSD-based transactional payment or any other exchange of money, currency, cryptocurrency, credits, vouchers, coupons, redeemable points, etc. that have a value ascribed to them by both the first and second users. Once the second payment server receives the payment, the second payment server confirms the payment by sending a confirmation message to the second mobile communication device. The second communication device can then send a confirmation message via the second mobile communication interface and the V2V data transceiver of the second vehicle to the V2V data transceiver of the first vehicle which transmits the confirmation message via the first mobile communication interface to the first mobile communication device.

Figure 34:
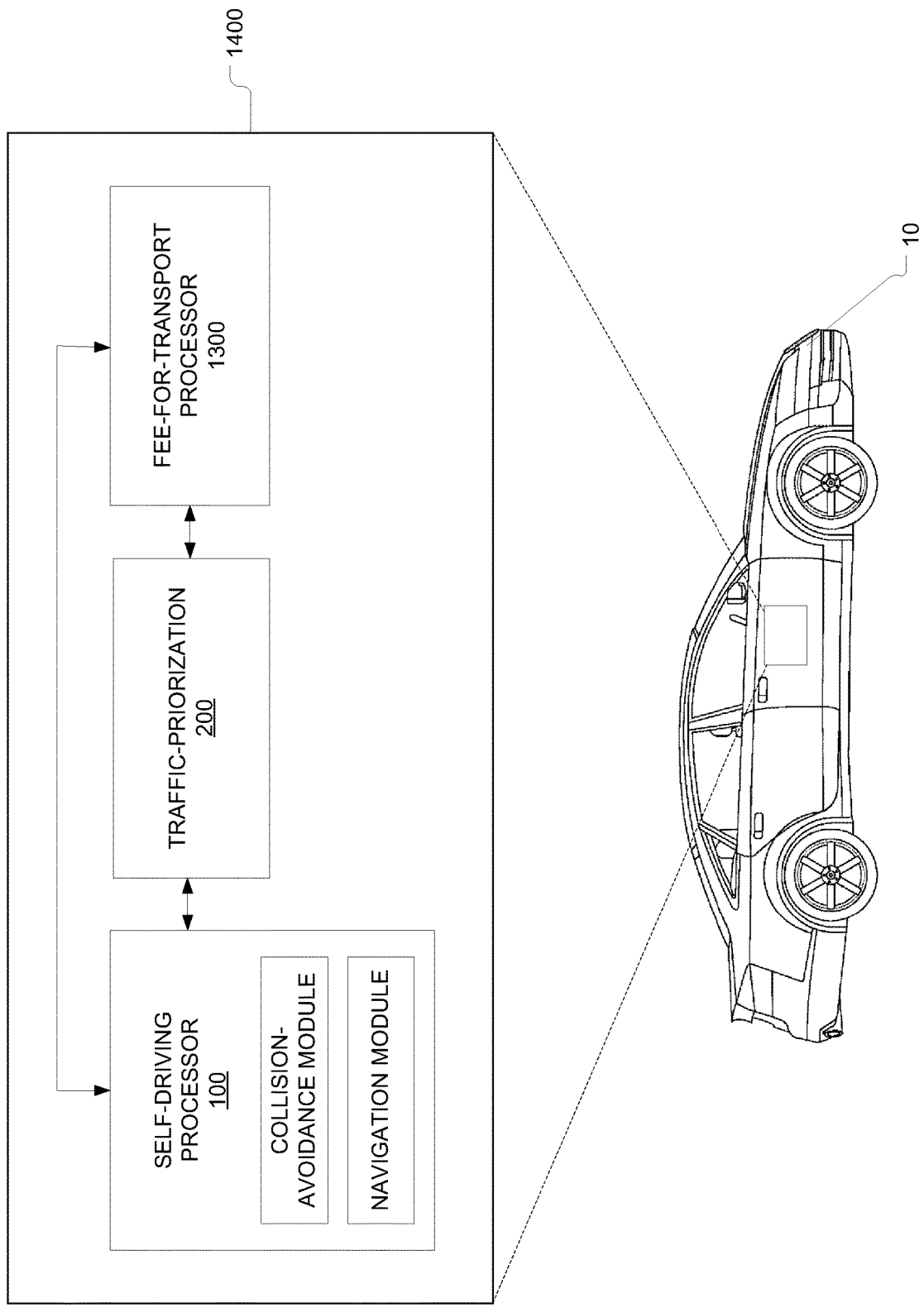
FIG. 34 depicts a self-driving vehicle having a vehicle computer system that includes a self-driving processor, a traffic-prioritization processor and a fee-for-transport processor.

The self-driving vehicle 10 may be a personal vehicle used for personal travel of the user or it may be a commercial vehicle such as a taxi, limousine, or ride-sharing vehicle (Uber, Lyft, etc.) comprising a fee-for-transport processor 1300 that computes and charges a fee to transport a user from a starting point along a route to a destination. The fee may be determined based on distance or travel time and, in this embodiment, is further based on a user-specified traffic prioritization received from the first mobile communication device 1100. For the purposes of this specification, a fee-for-transport processor may be a general-purpose processor used to execute a fee-for-transport application. The fee-for-transport processor 1300 may be integrated with the self-driving processor 100 and/or with the traffic-prioritization processor 200. Alternatively, the fee-for-transport processor may be communicatively connected to, and cooperative with, the self-driving processor 100 and/or with the traffic-prioritization processor 200. For example, in the embodiment depicted in FIG. 34, the fee-for-transport processor 1300 receives and manages trip requests from riders, computes fees for trips, estimates pickup times and arrival times, sends location updates, and collects fees from riders. The fee-for-transport 1300 upon receiving a trip request cooperates with the self-driving processor 100 to drive autonomously to the pickup location and to drive autonomously with the rider to the destination. The self-driving processor 100 may have a navigation module for navigating to the pickup location and then navigating from the pickup location to the destination. The self-driving processor 100 may also include a collision-avoidance module for avoiding other vehicles, curbs, pedestrians, cyclists, obstacles, etc. that uses the sensors described earlier. The fee-for-transport 1300 also cooperates with the traffic prioritization processor 200 by receiving prioritization requests from the user (rider or prospective rider awaiting pickup) and then making offers to pay other vehicles to be given priority in traffic as described now in greater detail below. The processors 100, 200, 1300 may be connected or integrated into a vehicle computer system 1400 having one or more processors to perform these functions and tasks in any suitable arrangement. Optionally, the vehicle computer system 1400 may have a single processor to perform the functions of processors 100, 200, 1300.

In one embodiment, the fee-for-transport processor 1300 communicates to the first mobile communication device 1100 a plurality of pricing options for the route based on different levels of traffic prioritization. For example, the fee-for-transport processor 1300 may present a range of prices (fees) for transporting the user to the destination that vary according to how much prioritization is given to the vehicle and thus how much time it will take to reach the destination. The pricing options present more expensive fees to travel the route more quickly and less expensive fees to travel the route more slowly. The total fee is thus the sum of the base fee for transport which is based on distance or travel time and perhaps also time of day (or using a dynamic supply and demand algorithm) and the extra fee for traffic prioritization. In addition to factors such as distance, time of day, historical traffic data, real-time traffic data, and weather, the fee-for-transport processor 1300 estimates how much faster it can travel if it pays other vehicles for traffic prioritizations along the route. The fee-for-transport processor 1300 may estimate the traffic to be expected along the route from real-time traffic data and/or historical traffic data to estimate how many vehicles it will probably encounter and what impact those vehicles are likely to have on the travel time to its destination. The fee-for-transport processor 1300 may estimate based on historical prioritization data the probabilities of offers being accepted at various price points so that it can estimate how much it will probably cost to prioritize its travel to the destination. For example, the processor 1300 may estimate that given the time of day (e.g. rush hour), it will probably encounter about 40 vehicles over the route of which about 20 will impact its travel time. The travel time is impacted by various traffic conditions and interactions with other vehicles such as other vehicles traveling slowly enough to impede optimal travel speeds to the destination, and encounters/interactions at intersections, stop signs, yield signs, traffic circles, etc. For example, the processor 1300 may estimate that 75% of those estimated 20 vehicles, i.e. approximately 15 vehicles, are likely to accept offers to prioritize. The processor 1300 then estimates, for example, that payments averaging $1.50 will be accepted by those 15 vehicles, meaning that the estimated total cost to prioritize its travel to the destination would probably be around $22.50.

Optionally, the fee-for-transport processor 1300 computes the travel times for the route for each of the different levels of traffic prioritization. For example, the processor 1300 may determine and present to the user that the route may be traveled normally (with no payments) in 20 minutes, but in 18 minutes with $10 payments and in only 15 minutes with $16 of payments. The fee-for-transport processor 1300 may also determine and present to the user that the route may be traveled more slowly by accepting payments from others. For example, the fee-for-transport processor 1300 may determine and present to the user that the route may be traveled in 23 minutes by accepting $5 in payments or in 26 minutes by accepting $8 in payments. The user who is not in a rush may thus choose to earn payments to reduce travel costs by granting priority to other vehicles along the route. Conversely, the user who is in a rush may wish to pay extra for the trip to arrive sooner at the destination. This creates a marketplace for passengers, commuters and riders to exchange payments (e.g. micropayments) for priority in traffic.

The travel times are, in one embodiment, computed using real-time traffic data for the route and historical prioritization data for the route for the time of day. The historical prioritization data in one embodiment is indicative of probabilities of traffic prioritization requests being accepted for the route at the time of day. The historical prioritization data may be shared amongst vehicles to obtain a very large set of data that indicates probabilities by day of the week, time of day, geographical location, etc.

Optionally, the fee-for-transport processor 1300 receives a user selection by the user of one of the different levels of traffic prioritization from the first mobile communication device 1100, e.g. by receiving user input via a user interface of the first mobile communication device 1100. The fee-for-transport processor 1300 then automatically offers payments to other vehicles along the route to obtain traffic prioritizations and, when offers are accepted, automatically disburses payments to the other vehicles. For example, the processor may present normal priority, high priority, highest priority, low priority and lowest priority options to the user. Once the user has selected the traffic prioritization, the vehicle automatically offers payments or accepts payments to be prioritized or deprioritized in traffic. For example, in the case of a user requesting high prioritization, the processor 1300 allocates a portion of the total fee to prioritization payments and makes offers to pay to other vehicles to obtain priority relative to those vehicles until all of the fee is used. Optionally, the user may be prompted to pay more if the estimated time of arrival is later than originally predicted which may arise if an unexpectedly large number of offers are rejected by other vehicles. In another embodiment, the user may specify a desired arrival time and the fee-for-transport processor 1300 computes the total cost for prioritization payments and presents this to the user to accept or decline. In a variant, the user may specify an amount he or she is willing to spend to prioritize the trip, e.g. $10, $20, $50, etc. Once the amount is expended, the prioritization offers cease.

Another inventive aspect is a non-transitory computer-readable medium storing computer-readable instructions in code which when executed by a processor 1105 of a mobile communication device 1100 cause the mobile communication device 1100 to offer to pay a second user 1101a in a second vehicle 10a for a traffic prioritization, to receive a reply from the second user 1101a, and then to pay the second user 1101a. The non-transitory computer-readable medium may be a computer memory (e.g. memory 1110) storing a software application that runs on a mobile communication device 1100.

Figure 35:
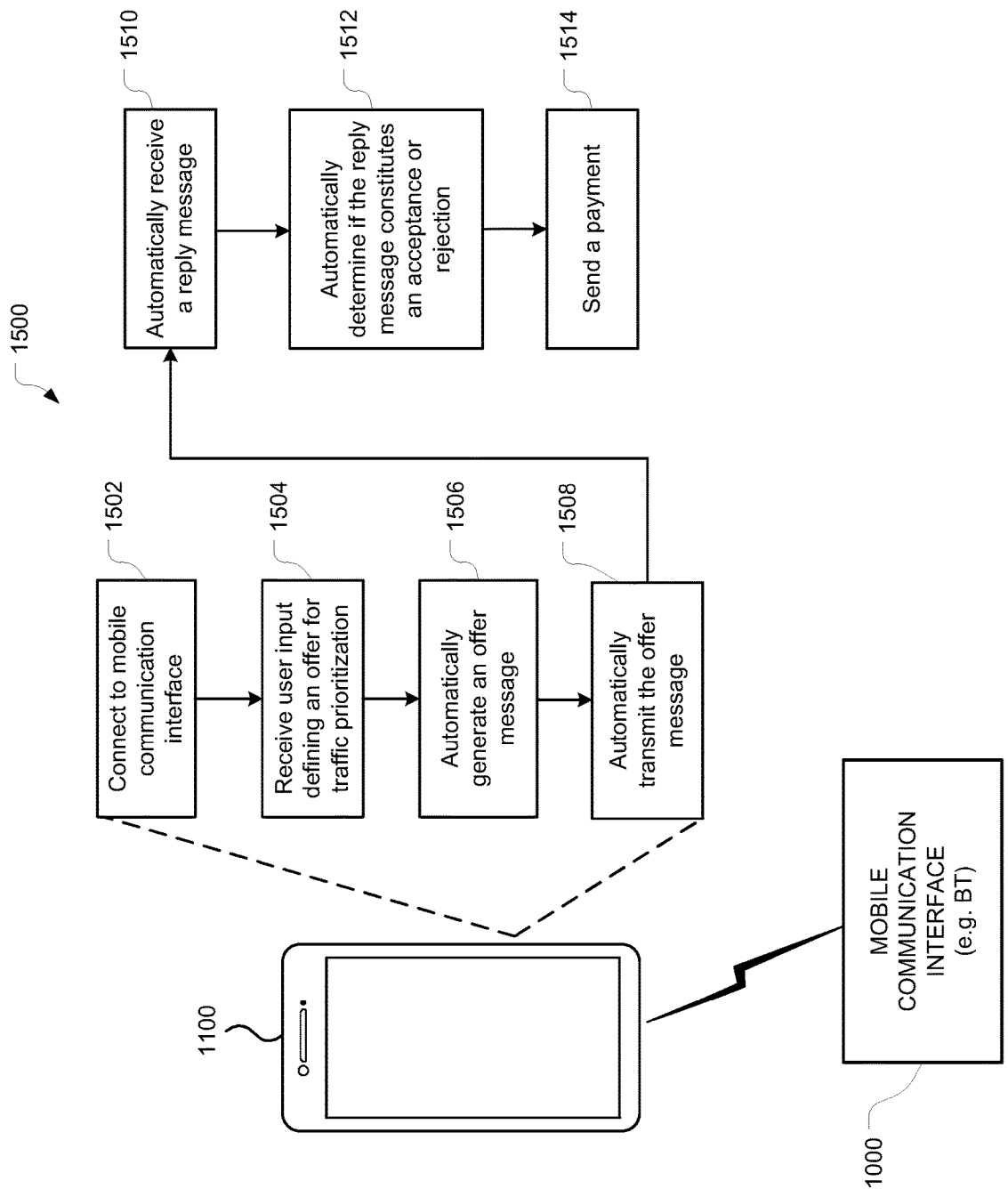
FIG. 35 schematically depicts a mobile communication device performing a method of sending a payment to another mobile communication device for a traffic prioritization.

As depicted in FIG. 35, the mobile communication device 1100 performs a method 1500 of paying for a traffic prioritization. As depicted in FIG. 35, the non-transitory computer-readable medium stores instructions in code which when executed by the processor 1105 of the mobile communication device 1100 cause the mobile communication device 1100 to communicatively connect (step 1502) to a mobile communication interface 1000 of a self-driving vehicle 10 in which the mobile communication device 1100 is located and receive user input (step 1504) defining an offer to pay for a traffic prioritization that prioritizes the self-driving vehicle 10 relative to a second vehicle 10a. The code causes the mobile communication device 1100 to automatically generate an offer message (step 1506) in response to the user input. The offer message may be a datagram in a predetermined data format, e.g. packetized data having a header and body with predefined data fields that is automatically recognizable as an offer message by a recipient device. The code also causes the mobile communication device 1100 to automatically transmit the offer message (step 1508) to the mobile communication interface 1000 of the self-driving vehicle 10 for communicating the offer message to a second mobile communication device 1100a in the second vehicle 10a, the second mobile communication device 1100a being configured to automatically read the message by being programmed to recognize the data fields of the predetermined data format. The code furthermore causes the mobile communication device 1100 to automatically receive a reply message (step 1510) in a predetermined data format from the second mobile communication device 1100a, to automatically determine (step 1512) if the reply message constitutes an acceptance or rejection of the offer and in response to determining that the reply message indicates the acceptance of the offer, send a payment (step 1514) to the second mobile communication device 1100a or to an account associated with the second mobile communication device 1100a to pay for the traffic prioritization. Payment messages may be encrypted.

The non-transitory computer-readable medium may further comprise code that causes the mobile communication device 1100 to receive a confirmation message in a predetermined data format to confirm receipt of the payment.

The non-transitory computer-readable medium may further comprise code that causes the mobile communication device 1100 to receive an acknowledgement message in a predetermined data format that the second vehicle 10a will maneuver as soon as traffic regulations and traffic conditions permit to grant priority to the self-driving vehicle 10.

The non-transitory computer-readable medium may further comprise code that causes the mobile communication device 1100 to output an alert that an estimated time of arrival at a destination will be later than originally predicted and presenting a user interface element to pay to prioritize the self-driving vehicle 10 in traffic.

The non-transitory computer-readable medium may further comprise code that causes the mobile communication device 1100 to receive a third-party request to expedite travel, the third-party request including a third-party payment to prioritize the self-driving vehicle 10 in traffic. The code is configured to automatically generate and transmit a third-party offer message using the third-party payment to the second mobile communication device 1100a.

Another inventive aspect of the disclosure is a non-transitory computer-readable medium that enables a user 1101 riding (or intending to ride) in a self-driving vehicle 10 that is providing (or will provide) a fee-for-transport service to request a traffic-prioritized routing to a destination for an elevated fee that includes an extra fee for prioritization above the base fee for an unprioritized trip. The mobile communication device 1100 performs a method 1600 of paying for a traffic-prioritized fee-for-transport service as depicted by way of example in FIG. 36.

Figure 36:
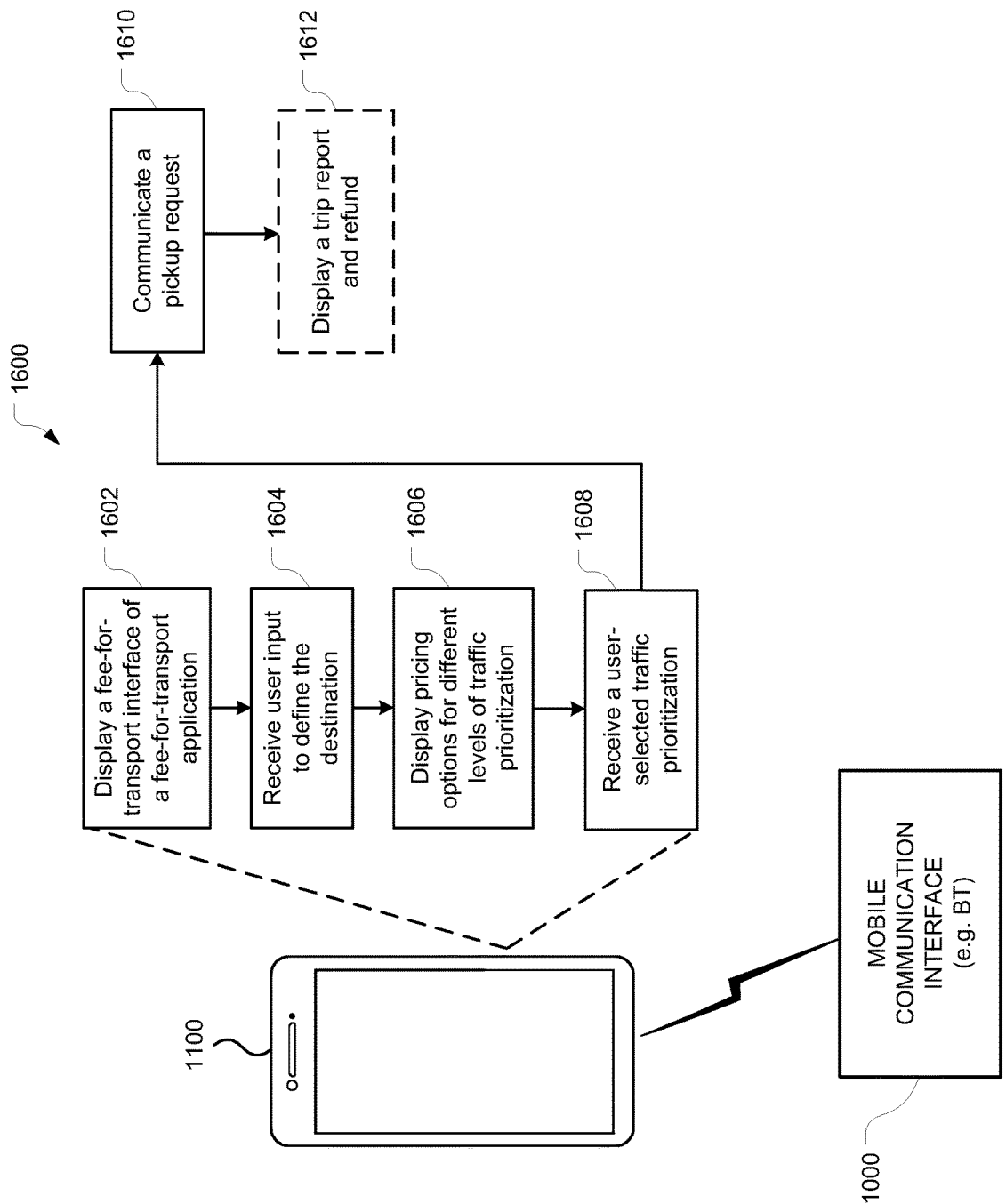
FIG. 36 schematically depicts a mobile communication device executing a fee-for-transport application that performs a method of presenting various levels of traffic prioritization for a route.

As shown in FIG. 36, a non-transitory computer-readable medium storing computer-readable instructions in code which when executed by a processor 1105 of a mobile communication device 1100 cause the mobile communication device 1100 to display (step 1602) on a user interface of the mobile communication device 1100 a fee-for-transport interface of a fee-for-transport application (e.g. an Uber app, Lyft app, taxi app, etc.) executing on the mobile communication device 1100 to enable a user to summon a self-driving vehicle 10 also executing the fee-for-transport application (or a related or counterpart application) to transport the user 1101 from a starting point to a destination for a fee. The code causes the mobile communication device 1100 to receive user input (step 1604) from the user 1101 to define the destination, wherein the starting point is either a current location of the mobile communication device or a user-specified pickup location, and to display pricing options (step 1606) based on a plurality of different levels of traffic prioritization for transport to the destination, wherein the pricing options are also based on either distance or travel time from the starting point to the destination. The code causes the mobile communication device 1100 to receive a user-selected traffic prioritization (step 1608) and communicate a pickup request (step 1610) to the self-driving vehicle 10. The pickup request includes the pickup location and a user-selected traffic prioritization. The user-selected traffic prioritization corresponds to a fee that includes a base fee for the trip plus an extra fee or amount to be paid to other vehicles to prioritize the trip. The amount paid for prioritization (or that is agreed to be paid on completion of the trip) enables the self-driving vehicle to automatically offer one or more payments to one or more other vehicles to obtain the user-selected traffic prioritization along the route to the destination.

The non-transitory computer-readable medium may have code that causes the mobile communication device 1100 to optionally display a trip report (step 1612) upon arrival at the destination. The trip report may include the fee for the trip, an option to rate/review the trip, and may include an indication that the self-driving vehicle 10 has determined that a portion of the fee allocated for prioritization payments has been unused, and that the portion of the fee that was unused has been refunded, or will be refunded, to an account associated with a user 1101 of the first mobile communication device 1100. Alternatively, the user 1101 may be presented with an option to retain the unused portion as a credit for a subsequent trip. An interim trip report may be presented during the trip. In another embodiment, the vehicle may have a payment manager executing on a traffic-prioritization processor for making the offers, receiving acceptances, rejections and counteroffers, making payments, and tracking how much money has been paid and how much is left to pay for the trip. If the payment manager observes that more rejections are received than expected, it may increase the offer amounts. If the payment manager observes that the trip is nearing completion and there is still a lot of money available to disburse, it may increase the frequency of offers and/or the amounts offered so as to increase the likelihood of obtaining prioritizations to expedite the last part of the trip.

Emergency-based prioritizations may be obtained without payment in one implementation by obtaining such prioritizations from a governmental authority such as a police authority, law enforcement authority or hospital or health authority.

Figure 37:
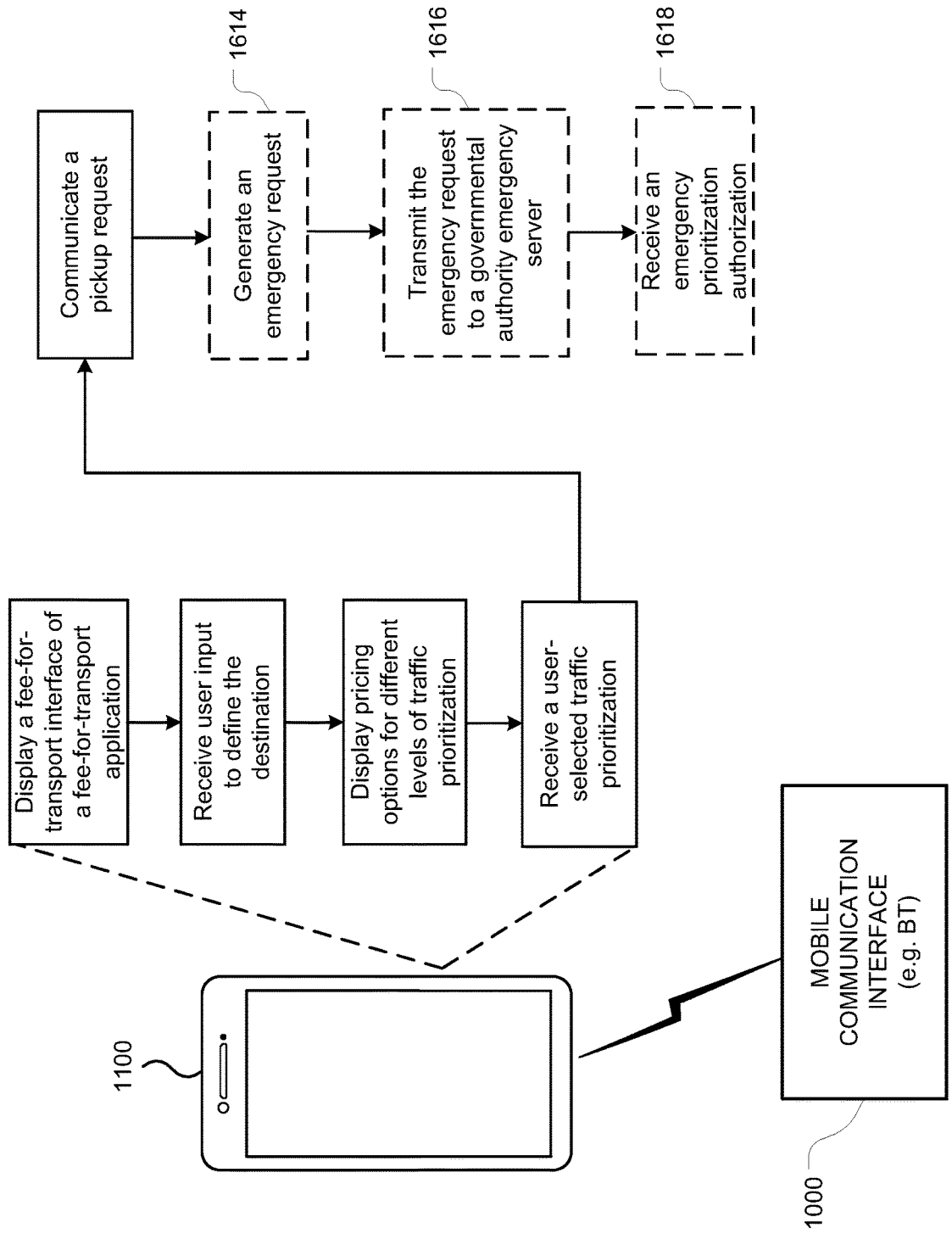
FIG. 37 schematically depicts a mobile communication device performing a method of sending an emergency request to obtain an emergency prioritization authorization from a governmental authority emergency server.

As depicted in FIG. 37, the non-transitory computer-readable medium has code that causes the mobile communication device 1100 to generate an emergency request (step 1614) in response to detecting a 911 call being made by the mobile communication device 1100 to signify an emergency. The emergency request is a message requesting that the self-driving vehicle 10 be prioritized in traffic due to the emergency. The mobile communication device then transmits the emergency request (step 1616) to a governmental authority emergency server to request emergency prioritization and receives an emergency prioritization authorization (1618) from the governmental authority emergency server. In one embodiment, the emergency prioritization authorization comprises a first cryptographic token to be broadcast by the self-driving vehicle 10 to other vehicles to obtain priority in traffic and a second cryptographic token that is recognizable by law enforcement entities permitting the self-driving vehicle 10 to exceed a speed limit due to the emergency. The vehicle 10 may broadcast the tokens using a V2V transponder such as the one disclosed in U.S. Pat. No. 10,231,187 which is hereby incorporated by reference. The governmental authority emergency server may concurrently send the tokens to other vehicles and law enforcement entities in the vicinity of the vehicle 10 being prioritized by cellular link or satellite link. The governmental authority emergency server may receive the location of the vehicle 10 in the emergency request and then broadcast the tokens by cellular communications to all vehicles and law enforcement entities within a geographical region near the vehicle or along the route where the vehicle is traveling.

The non-transitory computer-readable medium may have code that causes the mobile communication device 1100 to determine an emergency destination to replace the destination originally specified by the user, re-route the self-driving vehicle 10 to the emergency destination and constrain the cryptographic token to be valid only for a new route to the emergency destination. In this embodiment, the emergency destination may be a hospital, health center, police station, etc. The tokens may be revoked if the vehicle does not change its routing to head toward the emergency destination. The tokens may also be time-limited.

The non-transitory computer-readable medium may have code that causes the mobile communication device 1100 to detect an emergency using a sensor in, or communicatively connected to, the mobile communication device. The mobile communication device may be a smart watch, wearable smart device, or any such device that has a sensor. The sensor may be a biometric sensor capable of sensing a biological characteristic of the user such as, for example, heart-rate, blood pressure, blood oxygen level, etc. The mobile communication device may include multiple sensors. The sensor(s) may also detect a vehicle accident, commission of a crime, violence incident, or the like by monitoring the movements and sounds of the user. The sensors may be an accelerometer and microphone for measuring sudden movements and words, noise, speech tone, yelling, etc. that suggests that the user is in distress.

In response to detecting the emergency, the code causes the mobile communication device 1100 to generate an emergency request requesting that the self-driving vehicle be prioritized in traffic, transmit the emergency request to a governmental authority emergency server to request emergency prioritization, and receive an emergency prioritization authorization from the governmental authority emergency server. As noted above, the emergency prioritization authorization may comprise one or both of a first cryptographic token to be broadcast by the self-driving vehicle to other vehicles to obtain priority in traffic and a second cryptographic token recognizable by law enforcement entities permitting the self-driving vehicle to exceed a speed limit due to the emergency.

Figure 38:
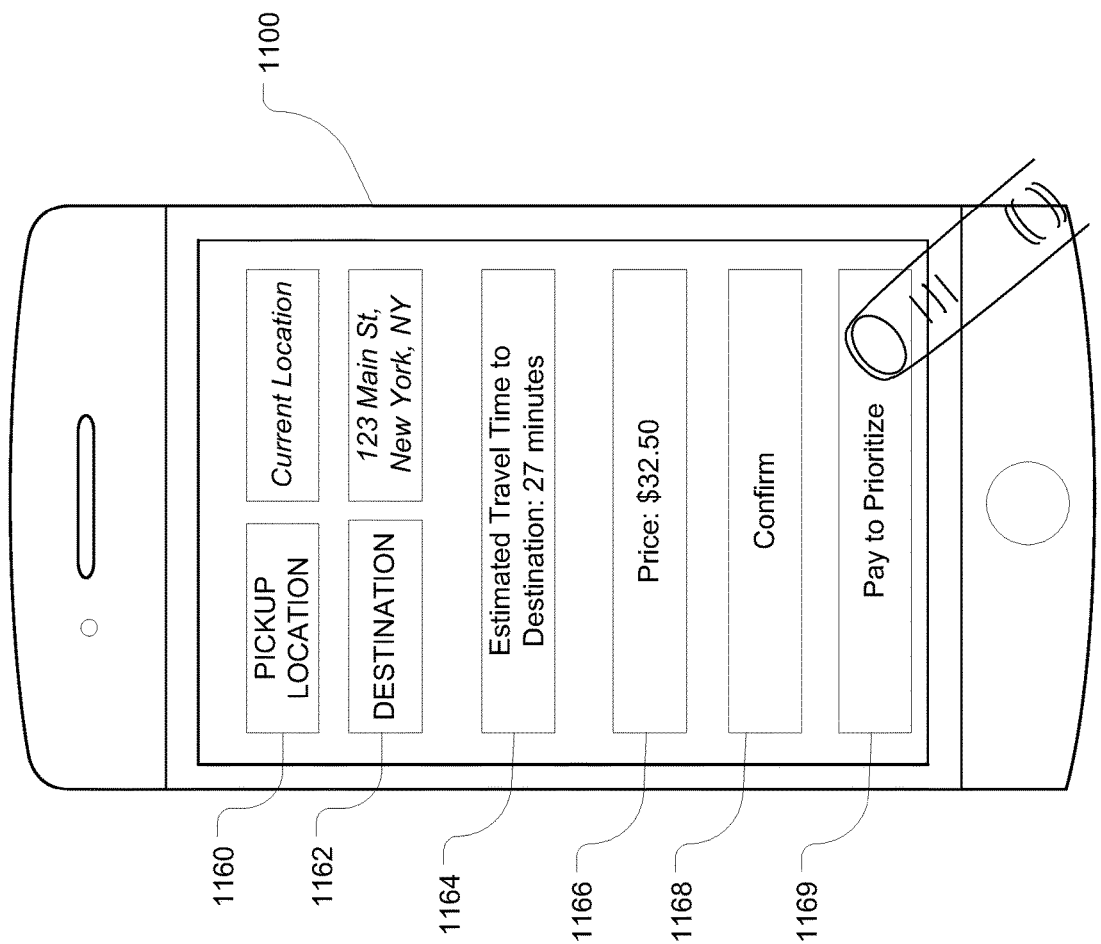
FIG. 38 depicts a mobile communication device executing a fee-for-transport application presenting on a user interface a user interface element to pay to prioritize a trip.

FIG. 38 depicts a mobile communication device 1100 having a user interface presenting a fee-for-transport application having a user interface element (e.g. a data field) for specifying a pickup location 1160 and a destination 1162. The pickup location may default to the current location as determined by the mobile communication device 1100 or the user may type in an address or point of interest. The user may type a destination in the destination data field as an address or point of interest, select from recent destinations, or select a location on a map. The fee-for-transport application displays the estimated travel time 1164 to the destination and/or the estimated time of arrival. The fee-for-transport application displays the price 1166 for the trip. A user interface element 1168 is provided to confirm the trip, i.e. to summon the vehicle for the trip. A further user interface element 1169 is provided to pay to prioritize the trip. When the user interface element 1169 is selected, the mobile device communication may offer various options to the user for prioritizing the trip as explained below.

Figure 39:
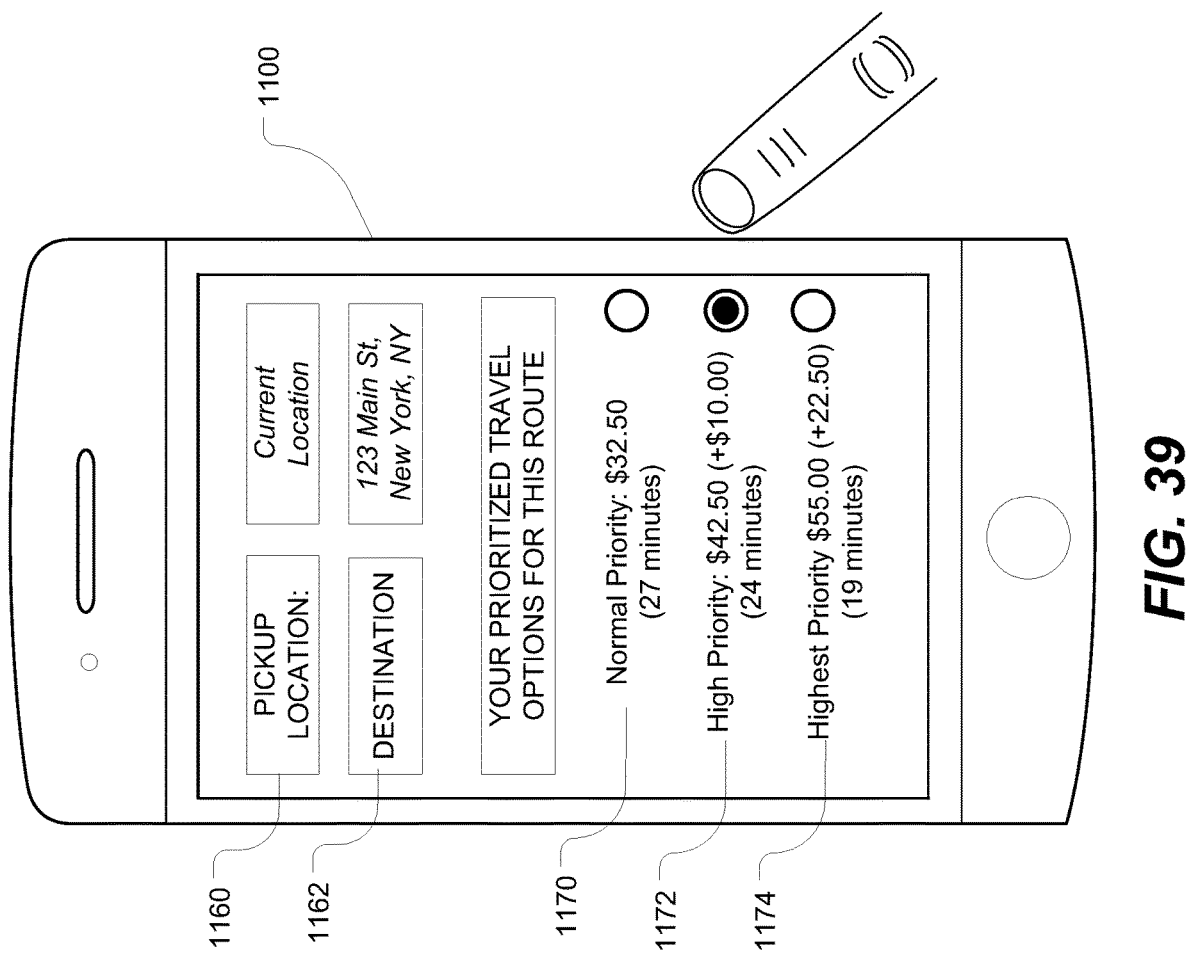
FIG. 39 depicts a mobile communication device executing a fee-for-transport application presenting on a user interface different levels of traffic prioritization available for a trip.

As depicted by way of example in FIG. 39, the mobile communication device 1100 presents various pricing options for different levels of traffic prioritization from which the user may select. In this example, there are three different levels: normal priority (no prioritization) 1170, high priority 1172 and highest priority 1174. For each level, the user interface displays the base fee for the trip plus the extra fee to prioritize the trip. For each level, the estimated travel time is shown (or alternatively the estimated time of arrival). This enables the user to decide how much the user wishes to spend to prioritize the trip. The user may select one of the prioritization levels as the desired prioritization level for the trip using a radio button as shown or using a toggle, check-box, menu or any other suitable user interface element. The mobile communication device communicates the user-selected prioritization level to the vehicle. The vehicle allocates the prioritization surcharge to be disbursed to other vehicles during the trip.

Figure 40:
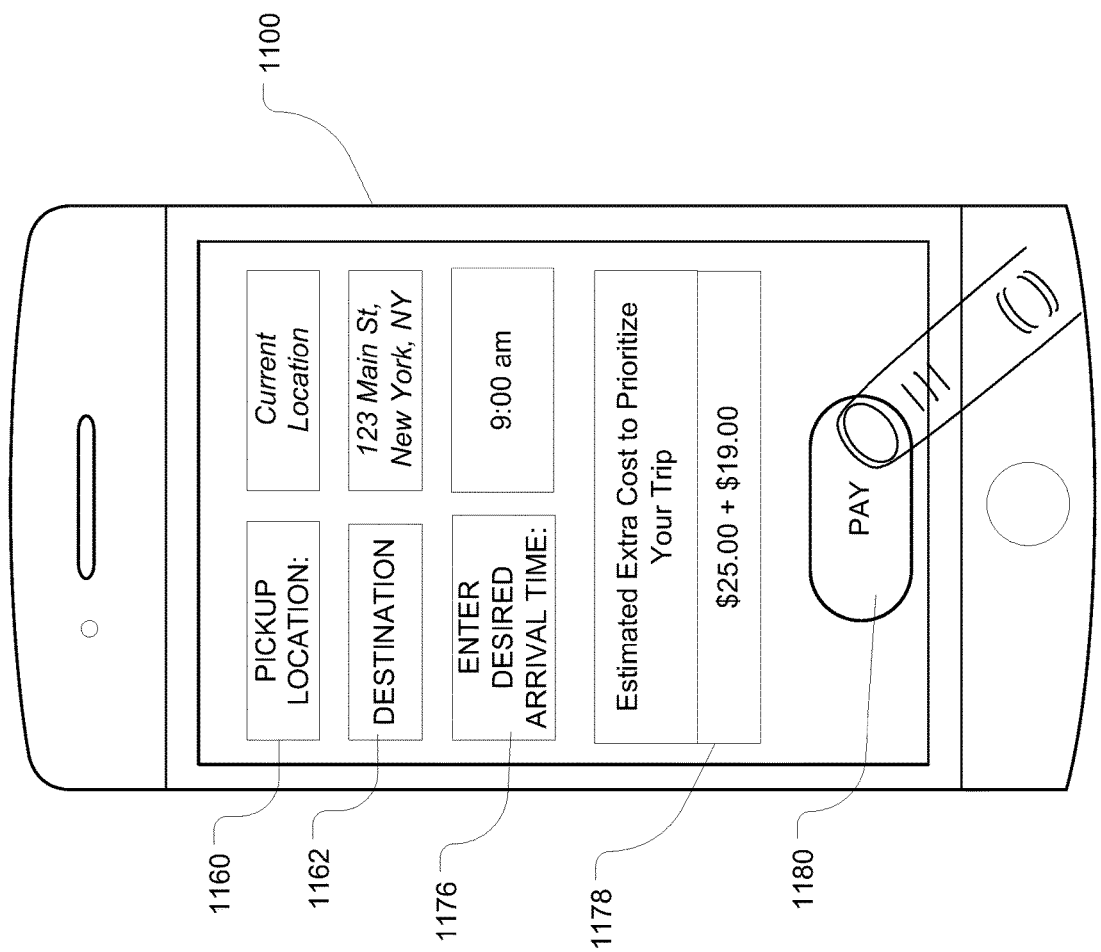
FIG. 40 depicts a mobile communication device executing a fee-for-transport application presenting on a user interface a fee payable to arrive at a destination at a user-specified time and presenting a user interface element to pay the fee.

In one implementation, as depicted in FIG. 40, the non-transitory computer-readable medium enables the user to specify a desired or necessary arrival time 1176 at the destination. For example, the user may have an appointment, meeting, flight, event, etc. for which the user must arrive on time. In this scenario, the non-transitory computer-readable medium computes and displays the total cost and/or extra cost 1178 to expedite the trip to the destination to ensure that the user will arrive at the destination on time. The user can accept to pay this cost by touching or selecting a virtual pay button (user interface element) 1180. The cost is determined by estimating how many vehicles will be encountered and how many vehicles will be offered payments for traffic prioritizations and how much these payments will total. Accordingly, the non-transitory computer-readable medium may have code that causes the mobile communication device 1100 to display on the user interface of the mobile communication device 1100 an amount payable (total cost and/or extra cost 1178) to arrive at the destination at a user-specified time, to present a user interface element 1180 to pay the amount, and to communicate this amount and the user-specified time to the self-driving vehicle 10. Optionally, the processor of the mobile communication device receives an event reminder from a calendar application on the mobile communication device, determines the travel time to the event, and then automatically recommends a prioritization level to arrive at the event on time.

The non-transitory computer-readable medium may have code that causes the mobile communication device 1100 to receive real-time traffic data and to detect a traffic jam based on the real-time traffic data. Detecting the traffic jam may be accomplished by determining that the self-driving vehicle 10 is moving at an average speed less than a predetermined threshold, e.g. less than 30%, 20%, or 10% of a speed limit. The mobile communication device 1100 can react to the detection of a traffic jam by sending a plurality of offer messages to a plurality of vehicles to pay for prioritization. The plurality of messages may be sent automatically by the device or in response to a user command.

Optionally, the offer messages are conditional offers that are conditional on acceptance by all of the plurality of vehicles. For example, if there are ten vehicles blocking the way in a traffic jam, the vehicle sends conditional offers to all ten vehicles. If all ten vehicles accept, the payments are made. If one or more of the vehicles does not accept, the conditional offers are revoked or terminated. The conditional offer may alternatively be a cascade of offers. In a cascade, the first vehicle requests priority from the second vehicle on condition that the second vehicle obtains priority from a third vehicle. If the third vehicle agrees, the second vehicle requests payments for the second and third vehicles and the second vehicle transmits the payment to the third vehicle.

In another implementation, the first mobile communication device sends the offer message directly to the second mobile communication (without being routed through the vehicles). In one example, the V2V messaging between vehicles exchanges first and second mobile communication device identifiers for the respective first and second mobile communication devices. The identifiers may be cell phone numbers, e-mail addresses, IMSI codes, etc. The first and second mobile communication devices can then exchange offers, replies and payments directly without being routed through the respective vehicles. Optionally, in response to a message from the first mobile communication device, the first vehicle can request from the second vehicle the identifier of the second mobile communication device in the second vehicle. The second mobile communication device can accept or decline to share its identifier. In another example, the locations of the mobile communication devices are shared in real-time with a central server that enables the first mobile communication devices to identify which mobile communication device is present in the nearest vehicle. The first mobile communication device sends a query with its current location to the server which replies with the identifier of the closest other mobile communication device. Optionally, the query from the first mobile communication device includes the current location and an estimate of the relative location of the second vehicle, e.g. 100 feet northeast or 100 feet further northbound along a particular road. The server can pinpoint the second vehicle, identify which mobile communication device is traveling in that vehicle, and then return the identifier to the first mobile communication device. The mobile communication devices may control how identifiers are shared. Anonymized identifiers or pseudonyms may be employed for privacy reasons. Communications (offers, replies, counteroffers, payments) may be sent via an intermediate server to protect the privacy of identifiers or other user information. In one implementation, a traffic prioritization application may execute on mobile communication devices so that users can create accounts, provide payment methods, link bank accounts for receiving payments, and then to transact (i.e. make and receive payments). The application may provide various settings and preferences to automate the offers, replies and counteroffers. The user settings and preferences may be time-based and/or location-based and/or event-based. For example, the user settings and preferences may prescribe a threshold of offers that are to be automatically accepted, e.g. any offer over $5, or any offers to be automatically rejected, e.g. any offer under $1. The application may enable the user to specify as a user preference that offers are to be automatically made at a prescribed amount during rush-hour commutes, e.g. only Monday to Friday from 8 a.m. to 9 a.m. or 5 p.m. to 6 p.m., or only when traveling to an event in a calendar.

The foregoing methods can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps.

These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A non-transitory computer-readable medium storing computer-readable instructions in code which when executed by a processor of a mobile communication device cause the mobile communication device to:
   communicatively connect to a mobile communication interface of a self-driving vehicle in which the mobile communication device is located;
   receive user input defining an offer to pay for a traffic prioritization that prioritizes the self-driving vehicle relative to a second vehicle;
   automatically generate an offer message in response to the user input;
   automatically transmit the offer message to the mobile communication interface of the self-driving vehicle for communicating the offer message to a second mobile communication device in the second vehicle;
   automatically receive a reply message from the second mobile communication device;
   automatically determine if the reply message constitutes an acceptance or rejection of the offer; and
   in response to determining that the reply message indicates the acceptance of the offer, send a payment to the second mobile communication device or to an account associated with the second mobile communication device to pay for the traffic prioritization.

2. The non-transitory computer-readable medium of claim 1 further comprising code that causes the mobile communication device to receive a confirmation message to confirm receipt of the payment.

3. The non-transitory computer-readable medium of claim 2 further comprising code that causes the mobile communication device to receive an acknowledgement message that the second vehicle will maneuver as soon as traffic regulations and traffic conditions permit to grant priority to the self-driving vehicle.

4. The non-transitory computer-readable medium of claim 1 further comprising code that causes the mobile communication device to output an alert that an estimated time of arrival at a destination will be later than originally predicted and presenting a user interface element to pay to prioritize the self-driving vehicle in traffic.

5. The non-transitory computer-readable medium of claim 1 further comprising code that causes the mobile communication device to receive a third-party request to expedite travel, the third-party request including a third-party payment to prioritize the self-driving vehicle in traffic, wherein the code is configured to automatically generate and transmit a third-party offer message using the third-party payment to the second mobile communication device.

6. A non-transitory computer-readable medium storing computer-readable instructions in code which when executed by a processor of a mobile communication device cause the mobile communication device to:
- display on a user interface of the mobile communication device a fee-for-transport interface of a fee-for-transport application executing on the mobile communication device to enable a user to summon a self-driving vehicle to transport the user from a starting point to a destination for a fee;
- receive user input from the user to define the destination, wherein the starting point is either a current location of the mobile communication device or a user-specified pickup location;
- display pricing options based on a plurality of different levels of traffic prioritization for transport to the destination from the starting point to the destination;
- receive a user-selected traffic prioritization; and
- communicate a pickup request to the self-driving vehicle, the pickup request including the user-selected traffic prioritization to enable the self-driving vehicle to automatically offer one or more payments to one or more other vehicles to obtain the user-selected traffic prioritization along the route to the destination.

7. The non-transitory computer-readable medium of claim 6 wherein the code causes the mobile communication device to display a trip report upon arrival at the destination that indicates that the self-driving vehicle has determined that a portion of the fee allocated for prioritization payments has been unused, and the portion of the fee that was unused has been refunded to an account associated with a user of the mobile communication device.

8. The non-transitory computer-readable medium of claim 6 comprising code that causes the mobile communication device to display on the user interface of the mobile communication device an amount payable to arrive at the destination at a user-specified time, to present a user interface element to pay the amount, and to communicate this amount and the user-specified time to the self-driving vehicle.

9. The non-transitory computer-readable medium of claim 6 comprising code that causes the mobile communication device to receive real-time traffic data, to detect a traffic jam based on the real-time traffic data by determining that the self-driving vehicle is moving below a speed limit, and to send a plurality of offer messages to a plurality of vehicles to pay for prioritization.

10. The non-transitory computer-readable medium of claim 9 wherein the offer messages are conditional offers that are conditional on acceptance by all of the plurality of vehicles.

11. The non-transitory computer-readable medium of claim 6 wherein the code to display the pricing options includes code to display travel times for the pricing options.

12. The non-transitory computer-readable medium of claim 6 comprising code to cause the mobile communication device to use an event stored in a calendar application on the mobile communication device to determine the travel time to the event, and then automatically recommend a prioritization level to arrive at the event on time.

13. The non-transitory computer-readable medium of claim 6 wherein the pricing options are based on historical prioritization data that include the probabilities of offers being accepted at various price points.

14. The non-transitory computer-readable medium of claim 6 comprising code that causes the mobile communication device to receive a third-party request to expedite travel, the third-party request including a third-party payment to prioritize the self-driving vehicle in traffic.

15. A non-transitory computer-readable medium storing computer-readable instructions in code which when executed by a processor of a mobile communication device cause the mobile communication device to:
- generate an emergency request for an emergency, the emergency request requesting that a self-driving vehicle be prioritized in traffic due the emergency;
- transmit the emergency request to a governmental authority emergency server to request emergency prioritization; and
- receive an emergency prioritization authorization from the governmental authority emergency server, the emergency prioritization authorization comprising a first cryptographic token to be broadcast by the self-driving vehicle to other vehicles to obtain priority in traffic and a second cryptographic token that is recognizable by law enforcement entities permitting the self-driving vehicle to exceed a speed limit due to the emergency.

16. The non-transitory computer-readable medium of claim 15 wherein the emergency request is generated in response to detecting a 911 call being made by the mobile communication device.

17. The non-transitory computer-readable medium of claim 15 wherein the emergency request is generated in response to a biometric sensor detecting the emergency, the biometric sensor being in the mobile communication device or in communication with the mobile communication device.

18. The non-transitory computer-readable medium of claim 15 comprising code that causes the mobile communication device to:
- determine an emergency destination to replace a destination originally specified by the user; and
- re-route the self-driving vehicle to the emergency destination.

19. The non-transitory computer-readable medium of claim 18 comprising code that causes the mobile communication device to:
- constrain the cryptographic token to be valid only for a new route to the emergency destination.

20. The non-transitory computer-readable medium of claim 16 comprising code that causes the mobile communication device to:
- determine an emergency destination to replace a destination originally specified by the user; and
- re-route the self-driving vehicle to the emergency destination.

* * * * *